US010346142B1

(12) United States Patent
Cavalier et al.

(10) Patent No.: US 10,346,142 B1
(45) Date of Patent: Jul. 9, 2019

(54) AUTOMATED STREAMING DATA MODEL GENERATION

(71) Applicant: SAS Institute Inc., Cary, NC (US)

(72) Inventors: Charles Michael Cavalier, Apex, NC (US); Steven William Enck, Apex, NC (US); Sarah Jeanette Gauby, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 16/217,169

(22) Filed: Dec. 12, 2018

Related U.S. Application Data

(60) Provisional application No. 62/608,681, filed on Dec. 21, 2017, provisional application No. 62/701,956, filed on Jul. 23, 2018.

(51) Int. Cl.
*G06F 9/44* (2018.01)
*G06F 8/35* (2018.01)
*G06F 8/20* (2018.01)

(52) U.S. Cl.
CPC . *G06F 8/35* (2013.01); *G06F 8/20* (2013.01)

(58) Field of Classification Search
CPC ................................. G06F 8/35; G06F 8/20
USPC ......................................................... 717/104
See application file for complete search history.

(56) References Cited

U.S. PATENT DOCUMENTS

| 7,480,640 | B1 | 1/2009 | Elad et al. |
| 7,734,775 | B2 | 6/2010 | Barnett et al. |
| 8,914,263 | B2 * | 12/2014 | Shimada ............. G06F 17/5009 703/6 |
| 9,092,802 | B1 | 7/2015 | Akella |
| 9,432,430 | B1 * | 8/2016 | Klenz ................... H04L 41/142 |
| 10,152,361 | B2 * | 12/2018 | Kolodzieski ........ G06F 9/44505 |
| 2006/0031078 | A1 * | 2/2006 | Pizzinger ............... G06Q 10/06 705/7.23 |
| 2011/0023055 | A1 | 1/2011 | Thatte et al. |
| 2011/0246528 | A1 * | 10/2011 | Hsieh ..................... H04L 67/42 707/791 |

(Continued)

OTHER PUBLICATIONS

SAS Visual Data Mining and Machine Learning 8.1 Data Mining and Machine Learning Procedures, SAS Institute Inc., Mar. 2017, pp. 118 pages.

(Continued)

*Primary Examiner* — Anna C Deng
(74) *Attorney, Agent, or Firm* — Bell & Manning, LLC

(57) ABSTRACT

A computing device automatically generates an event stream processing (ESP) model to receive and process events. A mapping dataset is created from configuration and device information that includes a measurement processing description for a measurement and a measurement identifier that uniquely identifies a sensor and a device to which the sensor is associated and describe a computational process to be performed by an ESP window. An update macro is executed with an update template to create update code to parse the measurement identifier and a measurement value from the event block object. A transpose macro is executed with a transpose template to create transpose code to perform the described computational process. An ESP model is created that includes the created update code, a source window defined to execute the created update code, the created transpose code, and a transpose window defined to execute the created transpose code.

30 Claims, 13 Drawing Sheets

(56) References Cited

U.S. PATENT DOCUMENTS

| | | | |
|---|---|---|---|
| 2012/0072455 A1* | 3/2012 | Jain | G06F 16/24524 |
| | | | 707/779 |
| 2013/0018954 A1* | 1/2013 | Cheng | G06Q 10/00 |
| | | | 709/204 |
| 2014/0032745 A1 | 1/2014 | De Armas et al. | |
| 2014/0229628 A1* | 8/2014 | Mandal | H04L 65/60 |
| | | | 709/231 |
| 2014/0280986 A1 | 9/2014 | Baulier et al. | |
| 2016/0063595 A1* | 3/2016 | Oral | G06Q 30/0631 |
| | | | 705/26.7 |
| 2018/0173477 A1* | 6/2018 | Porwal | G06F 3/1243 |
| 2019/0050277 A1 | 2/2019 | Kolodzieski et al. | |

OTHER PUBLICATIONS

SAS Event Stream Processing 5.2: Connectors and Adapters, SAS Institute Inc., Jul. 2018, pp. 1-173.

DataFlux Event Stream Processing Engine Primer, DataFlux A SAS Company, Dec. 11, 2012, pp. 24 pages.

DataFlux Event Stream Processing Engine User's Guide, DataFlux A SAS Company, Jan. 24, 2013, pp. 115 pages.

SAS® Event Stream Processing 5.2: Using SAS® Event Stream Processing Analytics, SAS Institute Inc., Sep. 2018, pp. 110 pages.

SAS® Event Stream Processing 5.2: Creating and Using Windows, SAS Institute Inc., Jul. 2018, pp. 100 pages.

SAS® Event Stream Processing 5.2: Overview, SAS Institute Inc., Aug. 2018, pp. 1-12.

SAS® Event Stream Processing 5.2: XML Language Dictionary, SAS Institute Inc., Jul. 2018, pp. 1-68.

SAS® Event Stream Processing 5.2: Using the XML Layer, SAS Institute Inc., Sep. 2016, pp. 1-52.

SAS Micro Analytic Service 2.3: Programming and Administration Guide, SAS Institute Inc., 1-56, pp. Mar. 2017.

Kreps, Jay, Putting Apache Kafka to Use: A Practical Guide to Building a Streaming Platform (Part 2), Confluent Stream Processing—io blog, Feb. 25, 2015, pp. 1-7.

Gualtieri, Mike, 15 "True" Streaming Analytics Platforms for Real-time Everything, Forrester Wave: Big Streaming Analytics, Q1, 2016, Apr. 16, 2016, pp. 1-8.

International Search Report and Written Opinion mailed in PCT Application No. PCT/US2017/062046, dated Jan. 23, 2018.

SAS Event Stream Processing 4.2: XML Language Dictionary, Sep. 2016.

Appel, Stefan et al., Modeling and execution of event stream processing in business processes, Information Systems, vol. 46, Apr. 24, 2014, pp. 140-156.

\* cited by examiner

AUTOMATED STREAMING DATA MODEL GENERATION

CROSS-REFERENCE TO RELATED APPLICATIONS

The present application claims the benefit of 35 U.S.C. § 119(e) to U.S. Provisional Patent Application No. 62/608,681, which was filed Dec. 21, 2017, and to U.S. Provisional Patent Application No. 62/701,956, which was filed Jul. 23, 2018, the entire contents of which are hereby incorporated by reference.

BACKGROUND

An increasing number of distributed applications process continuously flowing data from geographically distributed sources, perform analytics on the streamed data, and provide analysis results to entities that may also be geographically distributed. The continuously flowing data may be generated from sensor measurements that capture real-time data describing current operating characteristics of a remote device. The sensor measurements may derive from multiple different types of sensors installed at various locations (e.g., brakes, engine, steering mechanism, cooling system, passenger ventilation, power source, etc.) on a currently-moving vehicle, aircraft or watercraft, for example.

Event stream processing (ESP) can be used to analyze and understand millions of events per second, while detecting patterns of interest as they occur in real time. While processing with sub-millisecond response times for high-volume throughput, data streams can be assessed with ESP to derive insights and take appropriate actions.

ESP models are developed to perform the streaming analytics on real-time data streams, for example, as part of the Internet of Things (IoT). The ESP models may clean, transform, aggregate, calculate new variable values from, analyze, predict new variable values from, output, generate an alert on, etc. the received streamed data. Existing ESP analytics platforms merely provide the architecture to support ESP model generation to solve various analytics problems. As a result, analysts and software developers must design and develop the source code to implement the ESP model to solve each analytic problem, which requires significant development and testing time before implementation of the ESP model to solve real-world problems.

SUMMARY

In an example embodiment, a computer-readable medium is provided having stored thereon computer-readable instructions that when executed by a first computing device, cause the first computing device to automatically generate an event streaming model configured to receive and process events from a plurality of computing devices. A mapping dataset is created from predefined configuration information and predefined device information. The predefined configuration information includes a measurement processing description for a measurement. The measurement processing description describes a computational process to be performed by an event stream processing (ESP) window on one or more fields of an event block object when the event block object is received by a second computing device from a third computing device. The predefined device information includes a measurement identifier that uniquely identifies a sensor and a device to which the sensor is associated for a plurality of measurements. The measurement is one of the plurality of measurements. An update macro is executed with an update template to create update code. The update template defines a first template for the created update code and the update macro replaces an update code placeholder included in the update template with first code specific to the created mapping dataset. The created update code is configured to parse the measurement identifier and a measurement value from the event block object when the event block object is received by the second computing device. A transpose macro is executed with a transpose template to create transpose code. The transpose template defines a second template for the created transpose code and the transpose macro replaces a transpose code placeholder included in the transpose template with second code specific to the created mapping dataset. The created transpose code is configured to perform the described computational process on the parsed measurement value to define a transposed event record. An ESP model is created that includes the created update code, a source window defined to execute the created update code, the created transpose code, a transpose window defined to execute the created transpose code, connection information to connect the second computing device and the third computing device, and a connectivity definition. The connectivity definition defines a connectivity between the source window and the transpose window for processing the event block object when the event block object is received by the second computing device from the third computing device.

In another example embodiment, the first computing device is provided. The first computing device includes, but is not limited to, a processor and a computer-readable medium operably coupled to the processor. The computer-readable medium has instructions stored thereon that, when executed by the processor, cause the first computing device to automatically generate an event streaming model configured to receive and process events from a plurality of computing devices.

In yet another example embodiment, a method of automatically generating an event streaming model configured to receive and process events from a plurality of computing devices is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
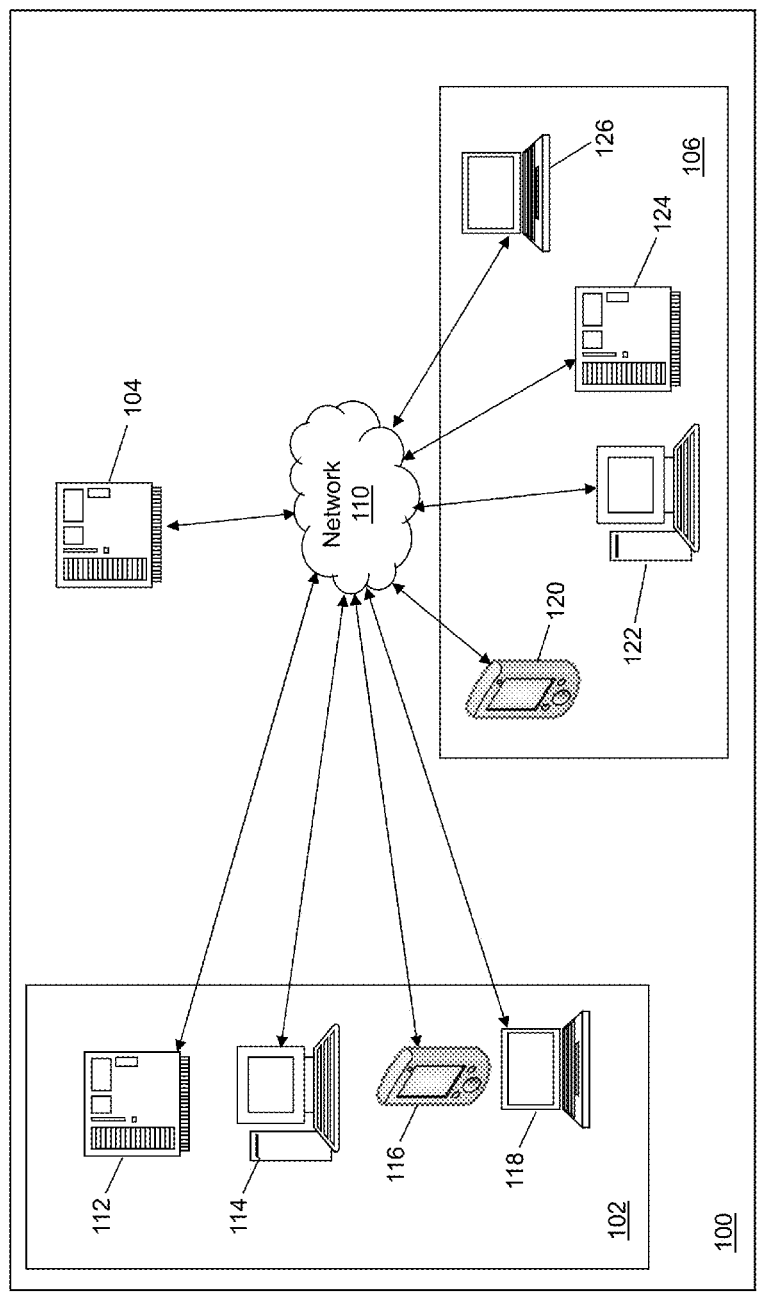
FIG. 1 depicts a block diagram of a stream processing system in accordance with an illustrative embodiment.

Referring to FIG. 1, a block diagram of a stream processing system 100 is shown in accordance with an illustrative embodiment. In an illustrative embodiment, stream processing system 100 may include an event publishing system 102, an event stream processing (ESP) device 104, an event subscribing system 106, and a network 110. Each of event publishing system 102, ESP device 104, and event subscribing system 106 may be composed of one or more discrete devices in communication through network 110.

Event publishing system 102 includes, is integrated with, and/or communicates with one or more sensors, data generation devices, data capture devices, etc. For example, a sensor may produce a sensor signal value referred to as a measurement data value representative of a measure of a physical quantity in an environment to which the sensor is associated and generate a corresponding measurement datum that typically is associated with a time that the measurement datum is generated. The environment to which the sensor is associated for monitoring may include a power grid system, a telecommunications system, a fluid (e.g., oil, gas, water, etc.) pipeline, a transportation system, an industrial device, a medical device, an appliance, a vehicle, a computing device, etc. Example sensors include a pressure sensor, a temperature sensor, a position or location sensor, a velocity sensor, an acceleration sensor, a fluid flow rate sensor, a voltage sensor, a current sensor, a frequency sensor, a phase angle sensor, a data rate sensor, a humidity sensor, an acoustic sensor, a light sensor, a motion sensor, an electromagnetic field sensor, a force sensor, a torque sensor, a load sensor, a strain sensor, a chemical property sensor, a resistance sensor, a radiation sensor, an irradiance sensor, a proximity sensor, a distance sensor, a vibration sensor, etc. that may be mounted to various devices used as part of the system. The devices themselves may include one or more sensors and/or may be connected to one or more other devices to receive a measurement datum or to send a measurement datum to another device. As another example, a data generation device may be a computing device that generates a measurement data value in response to occurrence of an event such as receipt of a sensor measurement datum. As still another example, a data capture device may be a computing device that receives a measurement data value generated by another device.

For example, a truck may be equipped with hundreds of sensors. These sensors stream all types of measurement data that are valuable to both a truck driver and a truck manufacturer. Some events require immediate reactions via edge analytics while others may be sent to and processed in the cloud where more comprehensive and detailed analysis is performed. However, the deployment of analytic tools and models in edge devices and in the cloud that meet the requirements of large scale, geographically distributed, and highly dynamic sensors is challenging.

There further may be a hierarchy associated with the hundreds or thousands of sensors that make up a system. Each measurement may be associated with a device of the system hierarchy, and devices within the system hierarchy may be linked to compute additional measurements in edge devices or in the cloud from raw measurements generated by individual sensors. The system may include one or more devices of the same and/or different type.

Event publishing system 102 publishes a measurement data value to ESP device 104 as an event object also referred to as an event. An event object is a data record stored using a predefined format that includes fields and keys. For illustration, a first field and a second field may represent an operation code (opcode) and a flag. The opcode enables update, upsert, insert, and delete of an event object. The flag indicates whether the measurement data value and/or other field data has all of the fields filled or only updated fields in the case of an update opcode. An upsert opcode updates the event object if a key field already exists; otherwise, the event object is inserted. ESP device 104 receives the event object in an event stream, processes data extracted from one or more fields of the event object, and identifies one or more computing devices of event subscribing system 106 to which the processed data is sent. In some embodiments, the processing may merely feed the raw stream to the identified one or more computing devices of event subscribing system 106. The one or more computing devices of event subscribing system 106 may store the received, processed events, present one or more of the received, processed events on a display, etc. For example, a computing device of event subscribing system 106 may be a data server.

Network 110 may include one or more networks of the same or different types. Network 110 can be any type of wired and/or wireless public or private network including a cellular network, a local area network, a wide area network such as the Internet or the World Wide Web, etc. Network 110 further may comprise sub-networks and consist of any number of communication devices.

The one or more computing devices of event publishing system 102 may include computing devices of any form factor such as a server computer 112, a desktop 114, a smart phone 116, a laptop 118, a personal digital assistant, an integrated messaging device, a tablet computer, a point of sale system, a transaction system, an Internet of Things (IoT) device, etc. Event publishing system 102 can include any number and any combination of form factors of computing devices that may be organized into subnets. The computing devices of event publishing system 102 send and receive signals through network 110 to/from another of the one or more computing devices of event publishing system 102 and/or to/from ESP device 104. The one or more computing devices of event publishing system 102 may communicate using various transmission media that may be wired and/or wireless as understood by those skilled in the art. The one or more computing devices of event publishing system 102 may be geographically dispersed from each other and/or co-located. Each computing device of the one or more computing devices of event publishing system 102 may be executing one or more event publishing application.

Figure 2:
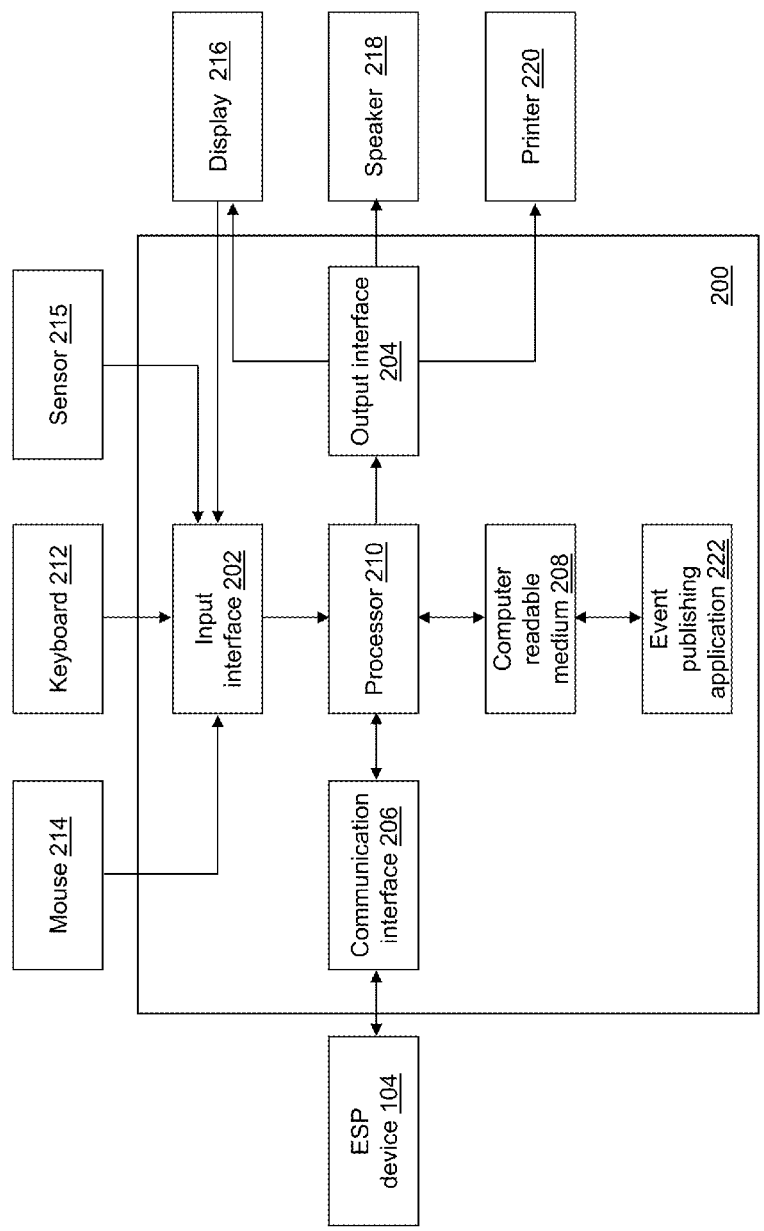
FIG. 2 depicts a block diagram of an event publishing device of an event publishing system of the stream processing system of FIG. 1 in accordance with an illustrative embodiment.

For illustration, referring to FIG. 2, a block diagram of an event publishing device 200 is shown in accordance with an example embodiment. Event publishing device 200 is an example computing device of event publishing system 102. For example, each of server computer 112, desktop 114, smart phone 116, and laptop 118 may be an instance of event publishing device 200. Event publishing device 200 may include an input interface 202, an output interface 204, a communication interface 206, a non-transitory computer-readable medium 208, a processor 210, and an event publishing application 222. Each computing device of event publishing system 102 may be executing event publishing application 222 of the same or different type.

Referring again to FIG. 1, the one or more computing devices of event subscribing system 106 may include computers of any form factor such as a smart phone 120, a desktop 122, a server computer 124, a laptop 126, a personal digital assistant, an integrated messaging device, a tablet computer, etc. Event subscribing system 106 can include any number and any combination of form factors of computing devices. The computing devices of event subscribing system 106 send and receive signals through network 110 to/from ESP device 104. The one or more computing devices of event subscribing system 106 may be geographically dispersed from each other and/or co-located. The one or more computing devices of event subscribing system 106 may communicate using various transmission media that may be wired and/or wireless as understood by those skilled in the art. Each computing device of the one or more computing devices of event subscribing system 106 may be executing one or more event subscribing application.

Figure 5:
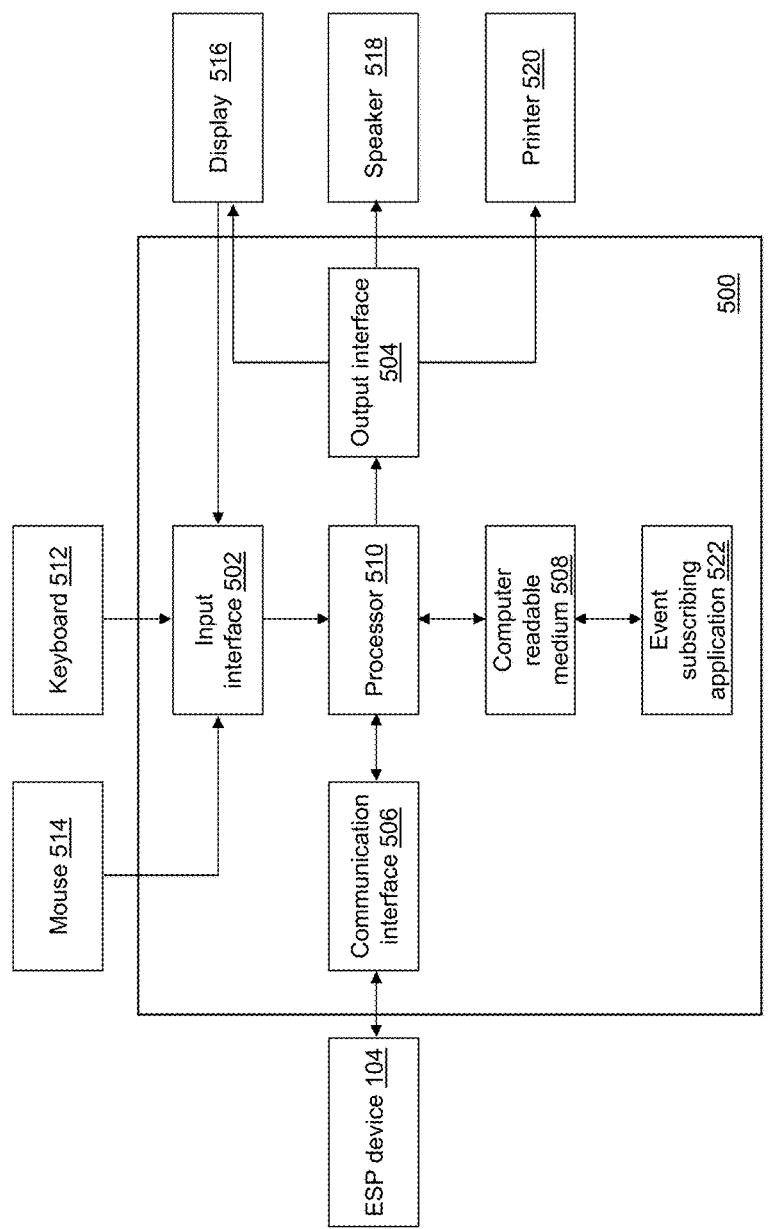
FIG. 5 depicts a block diagram of an event subscribing device of an event subscribing system of the stream processing system of FIG. 1 in accordance with an illustrative embodiment.

For illustration, referring to FIG. 5, a block diagram of an event subscribing device 500 is shown in accordance with an example embodiment. Event subscribing device 500 is an example computing device of event subscribing system 106. For example, each of smart phone 120, a desktop 122, a server computer 124, a laptop 126 may be an instance of event subscribing device 500. Event subscribing device 500 may include a second input interface 502, a second output interface 504, a second communication interface 506, a second non-transitory computer-readable medium 508, a second processor 510, and an event subscribing application 522. Each computing device of event subscribing system 106 may be executing event subscribing application 522 of the same or different type.

Referring again to FIG. 1, ESP device 104 can include any form factor of computing device. For illustration, FIG. 1 represents ESP device 104 as a server computer. In general, a server computer may include faster processors, additional processors, more disk memory, and/or more random-access memory (RAM) than a client computer and support multi-threading as understood by a person of skill in the art. ESP device 104 sends and receives signals through network 110 to/from event publishing system 102 and/or to/from event subscribing system 106. ESP device 104 may communicate using various transmission media that may be wired and/or wireless as understood by those skilled in the art. ESP device 104 may be implemented on a plurality of computing devices of the same or different type. Stream processing system 100 further may include a plurality of ESP devices, for example, configured to support failover stream processing, divided stream processing, and/or split stream processing under control of a routing stream processor.

Figure 7:
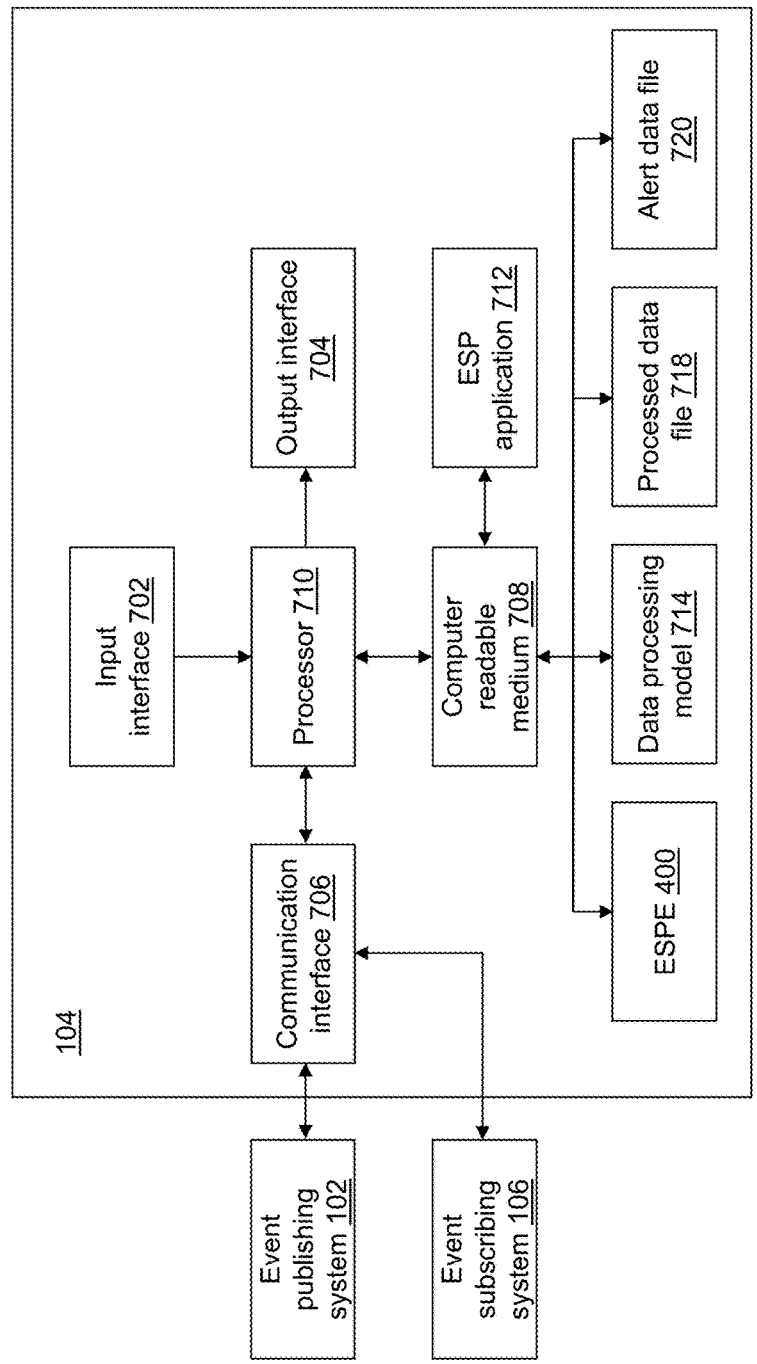
FIG. 7 depicts a block diagram of an ESP device of the stream processing system of FIG. 1 that performs data processing and/or alert processing in accordance with an illustrative embodiment.

For illustration, referring to FIG. 7, a block diagram of ESP device 104 is shown in accordance with an example embodiment. ESP device 104 may include a third input interface 702, a third output interface 704, a third communication interface 706, a third non-transitory computer-readable medium 708, a third processor 710, an ESP application 712, a data processing model 714, a processed data file 718, and an alert data file 720. Data processing model 714, processed data file 718, and alert data file 720 may be comprised of one or more files. In an alternative embodiment, processed data file 718 and alert data file 720 may be created on event subscribing device 500 and/or on another computing device of stream processing system 100.

Figure 4:
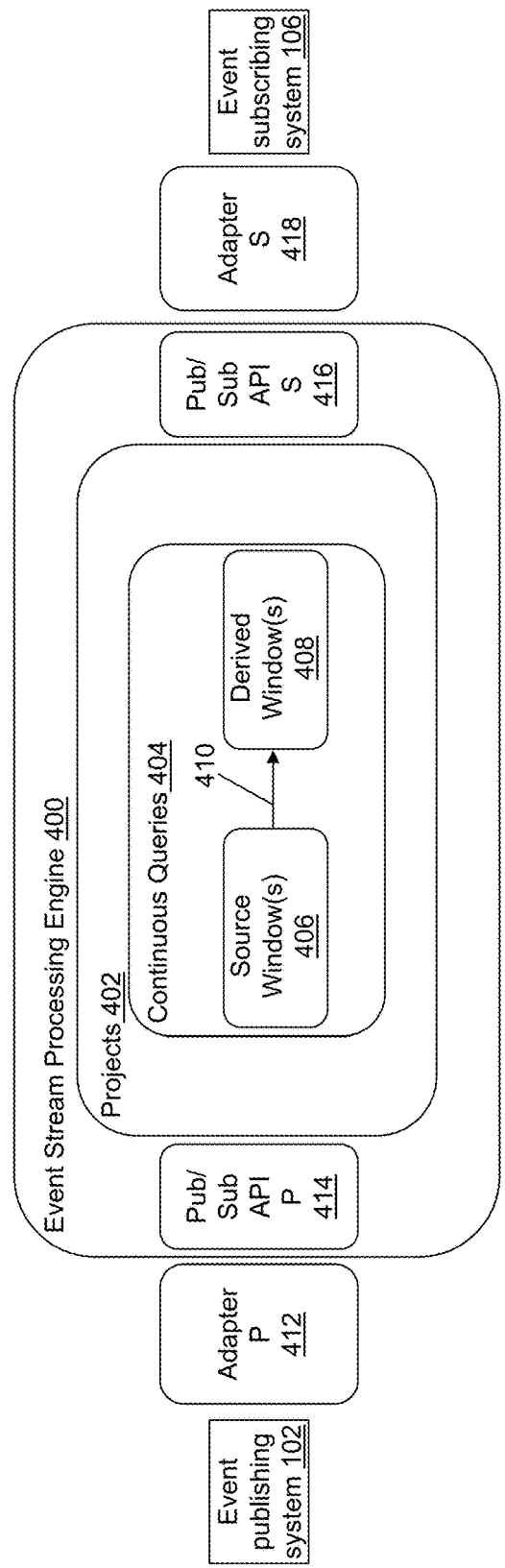
FIG. 4 depicts a block diagram of an event stream processing (ESP) engine executing on an ESP device of the stream processing system of FIG. 1 in accordance with an illustrative embodiment.

ESP device 104 executes ESP application 712 that instantiates an ESP engine (ESPE) 400 (shown referring to FIG. 4 for illustration). ESPE 400 processes data received from any event publishing device 200 and may monitor the processed data to evaluate a need to generate an alert. ESPE 400 further streams the processed data to one or more subscribing device 500. ESP application 712 reads data processing model 714 that defines how ESPE 400 generates processed data file 718 and/or alert data file 720 as a result of processing of streamed events from any event publishing device 200 by ESPE 400. Some or all of processed data file 718 and of alert data file 720 may be sent to event subscribing device 500 of event subscribing system 106 based on event subscribing application 522 and/or parameters defined in data processing model 714.

Data processing model 714 defines the methodology to be executed by ESPE 400 in processing the data streamed from event publishing system 102. For example, data processing model 714 is defined to receive the streaming events, perform data manipulation such as applying lower and upper bounds and time windowing of data included in the steamed events, perform transformations of measurement data included in the steamed events, create lag and aggregation data from the measurement data included in the steamed events, perform predictive model fitting/scoring and/or generate an alert using the measurement data included in the steamed events, the transformed measurement data, lagged measurement data, and/or aggregated measurement data, and output the measurement data included in the steamed events, the transformed measurement data, lagged measurement data, aggregated measurement data, scored measurement data, and/or alert data to various destinations such as a database stored at event subscribing device 500 or at ESP device 104 (processed data file 718/alert data file 720). Processed data file 718 includes one or more transposed analytic-ready data sets where each observation corresponds to a single device.

Referring to FIG. 2, each event publishing device 200 of event publishing system 102 may include the same or different components and combinations of components. Fewer, different, and additional components may be incorporated into event publishing device 200. Event publishing device 200 may be part of the IoT, where things (e.g., machines, devices, phones, sensors, smart meters, personal wearable devices, health monitoring devices, autonomous vehicle devices, robotic components, identification devices, environmental monitoring systems, etc.) can be connected to networks and the data from these things collected and processed within the things and/or external to the things. For example, event publishing device 200 can include one or more sensors of the same or different type, and high value analytics can be applied to identify hidden relationships and drive increased efficiencies.

Event publishing device 200 may be referred to as an edge device, and may include edge computing circuitry. Event publishing device 200 may provide a variety of stored or generated data, such as network data or data specific to the network devices themselves.

In one example application, ESP can be employed for predictive maintenance in the trucking industry, which is responsible for moving around 10.5 billion tons of freight over 279 billion miles per year. ESP can be used to predict part failures and keep trucks on the road longer. Trucks may have hundreds of sensors that collect many different types of data, for example, from oil temperatures to engine load to turbo boost. Edge devices on the trucks can allow a trucking company to weed out data that they do not need as close to the source as possible, and can facilitate action to occur on pertinent information in sub-second time frames. This way, the trucking company does not need to move all of their data through network 110 for storage in the cloud. Also, by monitoring, filtering and analyzing data at the source, the truck driver can be instantly alerted when, for example, oil temperature and turbo boost numbers spike at the same time. ESP can be used to recognize this pattern, which can trigger an alert that turbocharger service is needed, and the truck can be fixed in a nearby maintenance facility before any major damage occurs to the truck.

In addition to edge analytics performed at the individual truck level, there can be multi-phase analytics for ESP running on premises or in the cloud, where the trucking company can be enabled to analyze massive amounts of data across a fleet of trucks. Cross-entity analytics can be performed by aggregating data from all of the IoT gateways that are installed on the trucks in the fleet.

ESP can further enable the trucking company to take what it learned from historical data, train new models, update existing models, and bring new or revised models back to the edge (e.g., the truck). These operations can be performed dynamically (e.g., on the fly) and while the trucks are still on the road. The operations performed by ESP device 104 are captured in data processing model 714 that are created automatically using minimal input from a user as described further below.

As another example, a business may include a plurality of buildings each with various sensors used to monitor an environment in and around the buildings and control, for example, heating and air conditioning systems that themselves are comprised of numerous sensors.

Input interface 202 provides an interface for receiving information for entry into event publishing device 200 as understood by those skilled in the art. Input interface 202 may interface with various input technologies including, but not limited to, a keyboard 212, a mouse 214, a display 216, a track ball, a keypad, one or more buttons, etc. to allow the user to enter information into event publishing device 200 or to make selections presented in a user interface displayed on display 216. Input interface 202 further may interface with another device such as a sensor 215 to receive a measurement data value obtained by sensor 215. Input interface 202 further may interface with a plurality of sensors or other devices of the same or different type. The same interface may support both input interface 202 and output interface 204. For example, display 216 that includes a touch screen both allows user input and presents output to the user. Event publishing device 200 may have one or more input interfaces that use the same or a different input interface technology. The input interface technology further may be accessible by event publishing device 200 through communication interface 206.

Output interface 204 provides an interface for outputting information for review by a user of event publishing device 200 or for storage to an internal or external device of event publishing device 200. For example, output interface 204 may interface with various output technologies including, but not limited to, display 216, a speaker 218, a printer 220, etc. Event publishing device 200 may have one or more output interfaces that use the same or a different interface technology. The output interface technology further may be accessible by event publishing device 200 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. Event publishing device 200 may have one or more communication interfaces that use the same or a different communication interface technology. For example, event publishing device 200 may support communication using an Ethernet port, a Bluetooth antenna, a telephone jack, a USB port, etc. Data and messages may be transferred between event publishing device 200 and ESP device 104 using communication interface 206.

Computer-readable medium 208 is a non-transitory electronic holding place or storage for information, for example, so the information can be accessed by processor 210 as understood by those skilled in the art. Computer-readable medium 208 can include, but is not limited to, any type of RAM, any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Event publishing device 200 may have one or more computer-readable media that use the same or a different memory media technology. For example, computer-readable medium 208 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Event publishing device 200 also may have one or more drives that support the loading of a memory media such as a CD or DVD, an external hard drive, etc. One or more external hard drives further may be connected to event publishing device 200 using communication interface 106.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming languages, scripting languages, assembly languages, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. Event publishing device 200 may include a plurality of processors that use the same or a different processing technology.

Event publishing application 222 performs operations associated with generating, capturing, and/or receiving a measurement data value and publishing the measurement data value in an event stream to ESP device 104. The operations may be implemented using hardware, firmware, software, or any combination of these methods. Referring to the example embodiment of FIG. 2, event publishing application 222 is implemented in software (comprised of computer-readable and/or computer-executable instructions) stored in computer-readable medium 208 and accessible by processor 210 for execution of the instructions that embody the operations of event publishing application 222. Event publishing application 222 may be written one or more programming languages, scripting languages, assembly languages, etc.

Event publishing application 222 may be implemented as a Web application. For example, event publishing application 222 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a URL that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Figure 3:
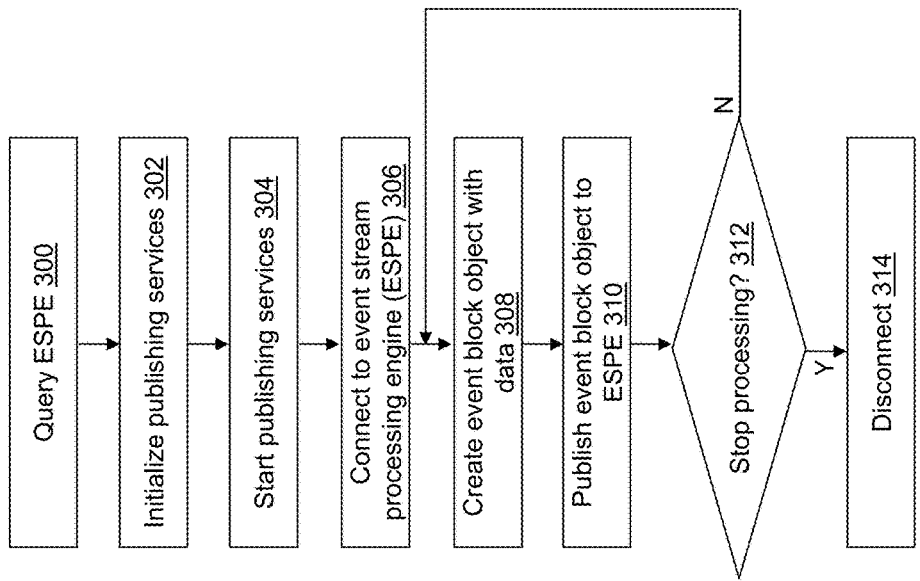
FIG. 3 depicts a flow diagram illustrating examples of operations performed by the event publishing device of FIG. 2 in accordance with an illustrative embodiment.

Referring to FIG. 3, example operations associated with event publishing application 222 are described. Additional, fewer, or different operations may be performed depending on the embodiment. The order of presentation of the operations of FIG. 3 is not intended to be limiting. A user can interact with one or more user interface windows presented to the user in a display under control of event publishing application 222 independently or through a browser application in an order selectable by the user. Although some of the operational flows are presented in sequence, the various operations may be performed in various repetitions, concurrently, and/or in other orders than those that are illustrated. For example, a user may execute event publishing application 222, which causes presentation of a first user interface window, which may include a plurality of menus and selectors such as drop-down menus, buttons, text boxes, hyperlinks, etc. associated with event publishing application 222 as understood by a person of skill in the art. As further understood by a person of skill in the art, various operations may be performed in parallel, for example, using a plurality of threads or a plurality of computing devices such as a grid or a cloud of computing devices.

In an operation 100, ESPE 400 is queried, for example, to discover projects 402, continuous queries 404, windows 406, 408, window schema, and window edges currently running in ESPE 400. For example, referring to FIG. 4, the components of ESPE 400 are shown in accordance with an illustrative embodiment. ESPE 400 may include one or more projects 402. A project may be described as a second-level container in an engine model managed by ESPE 400 where a thread pool size for the project may be defined by a user. A value of one for the thread pool size indicates that writes are single-threaded. Each project of the one or more projects 402 may include one or more continuous queries 404 that contain data flows, which are data transformations of or computations from incoming event streams.

The engine container is the top-level container in a model that manages the resources of the one or more projects 402. In an illustrative embodiment, for example, there is a single ESPE 400 for each instance of an ESP model executed. For illustration, data processing model 714 defines a first ESP model that instantiates first ESPE 400a. An ESP model specifies how input event streams from publishers are transformed and analyzed into meaningful event streams consumed by subscribers.

Each ESPE 400 has a unique engine name. Additionally, the one or more projects 402 may each have unique project names, and each query may have a unique continuous query name and begin with a uniquely named source window of the one or more source windows 406. Each ESPE 400 may or may not be persistent. Each ESPE 400 is a unique process so the projects/queries/windows need not be uniquely named as between two distinct ESPE 400 that may be executing on ESP device 104. They are distinguished by the unique input streams received on ESPE-specific transmission control protocol (TCP)/internet protocol (IP) connections.

Projects 402 run in a dedicated thread pool whose size is defined as a project attribute. A port can also be specified so that projects 402 can be spread across network interfaces for throughput scalability. Using a pool of threads in a project enables ESPE 400 to use multiple processor cores for more efficient parallel processing.

Continuous query modeling involves defining directed graphs of windows for event stream manipulation and transformation. A window in the context of event stream manipulation and transformation is a processing node in an event stream processing model. A window in a continuous query can perform aggregations, various computations, pattern-matching, scoring, alerting, and other operations on data flowing through the window. A continuous query may be described as a directed graph of source, relational, pattern matching, and procedural windows. The one or more source windows 406 and the one or more derived windows 408 represent continuously executing queries that generate updates to a query result set as new event blocks stream through ESPE 400. A directed graph, for example, is a set of nodes connected by edges, where the edges have a direction associated with them. The one or more source windows 406 are typically connected to one or more of the one or more derived windows 408. One or more of the one or more derived windows 408 can also be connected to another of the one or more derived windows 408. Windows are connected by edges 410 with a defined direction. Connectors publish or subscribe event streams to and from ESPE 400 and are in-process to ESPE 400.

A publish/subscribe (pub/sub) API P 414 can be used to publish event streams into a source window of ESPE 400. Similarly, a pub/sub API S 416 can be used to subscribe to an event stream window either from the same machine or from another machine on network 110.

An adapter is a stand-alone executable program that can be networked and that can be included to interact with ESPE 400. For example, an adapter P 412 uses pub/sub API P 414 to publish event streams to source windows 406 of ESPE 400 from event publishing system 102. An adapter S 418 uses pub/sub API S 416 to subscribe to event streams from any window (the one or more source windows 406 or the one or more derived windows 408) of ESPE 400 and to publish them to event subscribing system 106.

An event object may be described as a packet of data accessible as a collection of fields, with at least one of the fields defined as a key or unique identifier (ID). The event object may be an individual record of an event stream and is a fundamental building block of ESP. An event object includes metadata and field data. The event object may be created using a variety of formats including binary, alphanumeric, XML, etc. Each event object may include one or more fields designated as a primary ID for the event so ESPE 400 can support the opcodes for events including insert, update, upsert, and delete. As a result, events entering a source window of the one or more source windows 406 may be indicated as insert (I), update (U), delete (D), or upsert (P). The event object metadata includes the opcode indicating if the event represents an insert, update, delete, or upsert, a set of flags indicating whether the event object is a normal, partial-update, or a retention-generated event from retention policy management, and a plurality of timestamps. For example, the plurality of timestamps may indicate a sensor data generation time, a data receipt time by event publishing device 200, a data transmit time by event publishing device 200, a data receipt time by first ESPE 400a, etc.

An event block object may be described as a grouping or package of one or more event objects. An event stream may be described as a flow of event block objects. A continuous query of the one or more continuous queries 404 transforms the incoming event stream made up of streaming event block objects published into ESPE 400 into one or more outgoing event streams using the one or more source windows 406 and the one or more derived windows 408 that define the data flow modeling.

The one or more source windows 406 are at the top of the directed graph and have no windows feeding into them. Event streams are published into the one or more source windows 406, and from there, the event streams are directed to the next connected window(s) as defined by the directed graph. The one or more derived windows 408 are all instantiated windows that are not source windows and that have other windows streaming events into them. The one or more derived windows 408 perform computations or transformations on the incoming event streams. The one or more derived windows 408 transform event streams based on the window type (that is operators such as join, filter, compute, aggregate, copy, pattern match, procedural, union, etc.) and window settings. As event streams are published into ESPE 400, they are continuously queried, and the resulting sets of derived windows in these queries are continuously updated. The one or more derived windows 408 transform events into zero or more new events that are based on the properties of each derived window. After new events are computed by the one or more derived windows 408, they flow farther down the directed graph to a next level of connected derived windows, where new events are potentially computed.

Referring again to FIG. 3, the engine name and host:port to ESPE 400 may be provided as an input to the query and a list of strings may be returned with the names of the projects 402, of the continuous queries 404, of the windows 406, 408, of the window schema, and/or of the window edges of currently running projects of ESPE 400. The host is associated with a host name or Internet Protocol (IP) address of ESP device 104. The port is the port number provided when a publish/subscribe (pub/sub) capability is initialized by ESPE 400. The engine name is the name of ESPE 400. The engine name of ESPE 400 and host:port to ESP device 104 may be read from a storage location on computer-readable medium 208, may be provided on a command line, or otherwise input to or defined by event publishing application 222 as understood by a person of skill in the art.

In an operation 302, publishing services are initialized.

In an operation 304, the initialized publishing services are started, which may create a publishing client for the instantiated event publishing application 222. The publishing client performs the various pub/sub activities for the instantiated event publishing application 222. For example, a string representation of a URL to ESPE 400 is passed to a "Start" function. For example, the URL may include the host:port designation of ESPE 400 executing on ESP device 104, a project of the projects 402, a continuous query of the continuous queries 404, and a window of the source windows 406. The "Start" function may validate and retain the connection parameters for a specific publishing client connection and return a pointer to the publishing client. For illustration, the URL may be formatted as "dfESP://<host>:<port>/<project name>/<continuous query name>/<source window name>". If event publishing application 222 is publishing to more than one source window of ESPE 400, the initialized publishing services may be started to each source window using the associated names (project name, continuous query name, source window name).

Pub/sub is a message-oriented interaction paradigm based on indirect addressing. Subscribers (e.g., event subscribing device 500) specify their interest in receiving information from ESPE 400 by subscribing to specific classes of events, while information sources (event publishing device 200) publish events to ESPE 400 without directly addressing the data recipients (subscribers). Stream processing system 100 includes ESPE 400 that receives events from event publishing application 222 executing on each event publishing device 200 of event publishing system 102 and that publishes processed events to event subscribing system 106 based on subscriptions by each event subscribing device 500.

In an operation 306, a connection is made between event publishing application 222 and ESPE 400 for each source window of the source windows 406 to which any measurement data value is published. To make the connection, the pointer to the created publishing client may be passed to a "Connect" function. If event publishing application 222 is publishing to more than one source window of ESPE 400, a connection may be made to each started window using the pointer returned for the respective "Start" function call.

In an operation 308, an event block object is created by event publishing application 222 that includes a measurement data value. The measurement data value may have been received, captured, generated, etc., for example, through communication interface 206 or input interface 202 or by processor 210 of event publishing device 200. The measurement data value may be processed before inclusion in the event block object, for example, to change a unit of measure, convert to a different reference system, etc. The event block object may include a plurality of measurement data values measured at different times and/or by different devices.

In an operation 310, the created event block object is published to ESPE 400, for example, using the pointer returned for the respective "Start" function call to the appropriate source window. Event publishing application 222 passes the created event block object to the created publishing client, where the unique ID field in the event block object has been set by event publishing application 222 possibly after being requested from the created publishing client. In an illustrative embodiment, event publishing application 222 may wait to begin publishing until a "Ready" callback has been received from the created publishing client. The event block object is injected into the source window, continuous query, and project associated with the started publishing client.

In an operation 312, a determination is made concerning whether or not processing is stopped. If processing is not stopped, processing continues in operation 308 to continue creating and publishing event block objects that include measurement data values. If processing is stopped, processing continues in an operation 314.

In operation 314, the connection made between event publishing application 222 and ESPE 400 through the created publishing client is disconnected, and each started publishing client is stopped.

Referring to FIG. 5, fewer, different, and additional components may be incorporated into event subscribing device 500. Each event subscribing device 500 of event subscribing system 106 may include the same or different components or combination of components.

Second input interface 502 provides the same or similar functionality as that described with reference to input interface 202 of event publishing device 200 though referring to event subscribing device 500. Second output interface 504 provides the same or similar functionality as that described with reference to output interface 204 of event publishing device 200 though referring to event subscribing device 500. Second communication interface 506 provides the same or similar functionality as that described with reference to communication interface 206 of event publishing device 200 though referring to event subscribing device 500. Data and messages may be transferred between event subscribing device 500 and ESP device 104 using second communication interface 506. Second computer-readable medium 508 provides the same or similar functionality as that described with reference to computer-readable medium 208 of event publishing device 200 though referring to event subscribing device 500. Second processor 510 provides the same or similar functionality as that described with reference to processor 210 of event publishing device 200 though referring to event subscribing device 500.

Figure 6:
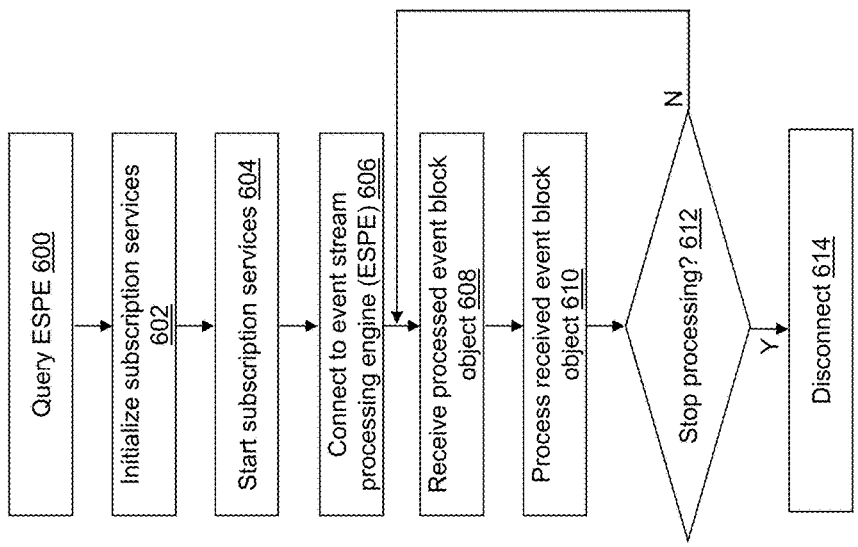
FIG. 6 depicts a flow diagram illustrating examples of operations performed by the event subscribing device of FIG. 5 in accordance with an illustrative embodiment.

Referring to FIG. 6, example operations associated with event subscribing application 512 are described. Additional, fewer, or different operations may be performed depending on the embodiment. The order of presentation of the operations of FIG. 6 is not intended to be limiting.

Event subscribing application 512 performs operations associated with receiving a processed event stream from ESP device 104. Event subscribing application 512 may perform further analysis of the received, processed event stream, may store the received, processed event stream, may issue an alert or alarm based on values in the received, processed event stream, may present values in the received, processed event stream on a second display 516, a second speaker 518, a second printer 520, etc. The operations may be implemented using hardware, firmware, software, or any combination of these methods.

Referring to the example embodiment of FIG. 5, event subscribing application 512 is implemented in software (comprised of computer-readable and/or computer-executable instructions) stored in second computer-readable medium 508 and accessible by second processor 510 for execution of the instructions that embody the operations of event subscribing application 512. Event subscribing application 512 may be written using one or more programming languages, assembly languages, scripting languages, etc. Event subscribing application 512 may be implemented as a Web application.

Similar to operation 300, in an operation 600, ESPE 400 is queried, for example, to discover names of projects 402, of continuous queries 404, of windows 406,608, of window schema, and of window edges currently running in ESPE 400. The host name of the device executing ESPE 400, the engine name of ESPE 400, and the port number opened by ESPE 400 are provided as an input to the query and a list of strings may be returned with the names to the projects 402, continuous queries 404, windows 406,608, window schema, and/or window edges.

In an operation 602, subscription services are initialized.

In an operation 604, the initialized subscription services are started, which may create a subscribing client on behalf of event subscribing application 512 at event subscribing device 500. The subscribing client performs the various pub/sub activities for event subscribing application 512. For example, a URL to ESPE 400 may be passed to a "Start" function. The "Start" function may validate and retain the connection parameters for a specific subscribing client connection and return a pointer to the subscribing client. For illustration, the URL may be formatted as "dfESP://<host>:<port>/<project name>/<continuous query name>/<window name>", where window name indicates a name of a source window or a derived window from which event subscribing application 512 receives a processed event object.

In an operation 606, a connection may be made between event subscribing application 512 executing on event subscribing device 500 and ESPE 400 through the created subscribing client. To make the connection, the pointer to the created subscribing client may be passed to a "Connect" function and a mostly non-busy wait loop created to wait for receipt of event block objects.

In an operation 608, an event block object is received by event subscribing application 512 executing on event subscribing device 500.

In an operation 610, the received event block object is processed based on the operational functionality provided by event subscribing application 512. For example, event subscribing application 512 may extract data from the received event block object and store the extracted data in a database. In addition, or in the alternative, event subscribing application 512 may extract data from the received event block object and send the extracted data to a system control operator display system, an automatic control system, a notification device, an analytic device, etc. In addition, or in the alternative, event subscribing application 512 may extract data from the received event block object and send the extracted data to a post-incident analysis device to further analyze the data. Event subscribing application 512 may perform any number of different types of actions as a result of extracting data from the received event block object. The action may involve presenting information on second display 516 or second printer 520, presenting information using second speaker 518, storing data in second computer-readable medium 522, sending information to another device using second communication interface 506, etc. A user may further interact with presented information using a second mouse 514 and/or a second keyboard 512.

In an operation 612, a determination is made concerning whether or not processing is stopped. If processing is not stopped, processing continues in operation 608 to continue receiving and processing event block objects. If processing is stopped, processing continues in an operation 614.

In operation 614, the connection made between event subscribing application 512 and ESPE 400 through the subscribing client is disconnected, and the subscribing client is stopped.

Referring to FIG. 7, fewer, different, or additional components may be incorporated into ESP device 104. ESP device 104 receives event block objects that include one or more measurement data values from event publishing system 102. Before receiving event block objects, ESPE 400 may be instantiated and executing on ESP device 104. Though not shown, third computer-readable medium 708 may provide an electronic storage medium for the received event block objects as well as values associated with intermediate processing of the event block objects.

Third input interface 702 provides the same or similar functionality as that described with reference to input interface 202 of event publishing device 200 though referring to ESP device 104. Third output interface 704 provides the same or similar functionality as that described with reference to output interface 204 of event publishing device 200 though referring to ESP device 104. Third communication interface 706 provides the same or similar functionality as that described with reference to communication interface 206 of event publishing device 200 though referring to ESP device 104. Data and messages may be transferred between ESP device 104 and event publishing system 102 and/or event subscribing system 106 using third communication interface 706. Third computer-readable medium 708 provides the same or similar functionality as that described with reference to computer-readable medium 208 of event publishing device 200 though referring to ESP device 104. Third processor 710 provides the same or similar functionality as that described with reference to processor 210 of event publishing device 200 though referring to ESP device 104.

ESP application 712 performs operations associated with coordinating event stream flow between event publishing system 102 and event subscribing system 106. The operations may be implemented using hardware, firmware, software, or any combination of these methods. Referring to the example embodiment of FIG. 7, ESP application 712 is implemented in software (comprised of computer-readable and/or computer-executable instructions) stored in third computer-readable medium 708 and accessible by third processor 710 for execution of the instructions that embody the operations of ESP application 712. ESP application 712 may be written using one or more programming languages, assembly languages, scripting languages, etc. ESP application 712 may be implemented as a Web application.

ESP application 712 may be developed, for example, using a modeling application programming interface (API) that provides a set of classes with member functions. As an example, the SAS® ESP Engine developed and provided by SAS Institute Inc. of Cary, N.C., USA provides a modeling API that provides a set of classes with member functions. These functions enable ESP application 712 to instantiate ESPE 400 possibly with a dedicated thread pool into its own process space. For illustration, ESP application 712 may use an XML Layer defined for SAS® ESP. The XML Layer enables definition of ESPE 400 using data processing model 714. ESP application 712 parses an XML ESP model and uses the structured model definition to instantiate ESPE 400 to perform the defined query processing.

Data processing model 714 may be designed to perform real-time analytics on streams of events from event publishing system 102 and to provide the results to event subscribing system 106. Illustrative use cases for ESP include, but are not limited to, sensor data monitoring and management, fraud detection and prevention, cyber security analytics, operational systems monitoring and management, capital markets trading systems, etc. Data processing model 714 may be written using one or more programming languages, scripting languages, assembly languages, markup languages, etc. For illustration, data processing model 714 is written using XML and a basic syntax for an XML model defined in data processing model 714 for instantiation in ESPE 400 is shown below where "+" indicates one or more.

```
<project name="" pubsub="" threads="">
    <mas-modules>
        +<mas-module language="" func-names="" module="">
            <code>
                <![CDATA[
                    module code
                ]]>[
            </code>
        </mas-module>
    </mas-modules>
    <contqueries>
        +<contquery name="" index="">
            <windows>
                +<window-type name=""> </window-type>
            </windows>
            <edges>
                +<edge source="" target="" role="">
                </edge>
            </edges>
        </contquery>
    </contqueries>
</project>
```

The project definition is defined between the project start and end tags and defines a project of the one or more projects 402 by identifying code modules and a list of one or more continuous queries 404 of the project. The project start tag may include a project "name" attribute, a "pubsub" mode attribute, a "thread" attribute, etc. The name attribute defines a name for the project. The pubsub mode attribute options may include "none", "auto", and "manual". When "auto" or "manual is specified, the project start tag may include a "pubsub" port number attribute that specifies the port number for the project. The thread attribute defines a thread pool size. For illustration, <project name="qa_realtime" pubsub="auto" threads="20"> may be specified for a project in data processing model 714 where qa_realtime is the project name value, auto is the pubsub mode attribute value, and twenty is the thread attribute value. The project definition further may include a mas-modules definition defined between the mas-modules start and end tags and a continuous query definition defined between the contqueries start and end tags.

The mas-modules start and end tags are a container for a list of zero or more code modules that are published, for example, to a microanalytic service for execution such as the SAS® Micro Analytic Service software provided by SAS Institute Inc. of Cary, N.C., USA. The microanalytic service may be a memory-resident, program execution service that is designed to run inside ESPE 400. Each code module included between the mas-modules start and end tags defines a named block of code that may include one or more functions, methods, or packages such as a predictive model.

A code module definition is included within each pair of mas-module start and end tags. The mas-module start tag may include a "language" attribute, a "func-names" attribute, a "module" attribute, etc. The language attribute defines a language in which the block of code is written. The language options may include "c", "ds2", "py", etc. where c indicates the C programming language, ds2 indicates the datastep 2 (ds2) programming language provided by SAS Institute Inc. of Cary, N.C., USA, and py indicates the python programming language though additional or fewer language options may be supported. The SAS® Micro Analytic Service executes inside an ESP procedural or calculate window enabling continuous queries to process events with analytics and custom logic that is written, for example, in C, DS2, or Python. The func-names attribute defines a name for the function included in the module that is used as a reference as described later. The module attribute defines a name for the module.

For illustration, <mas-module language="ds2" func-names="updateValue" module="P001_measurement"> may be specified for a code block in data processing model 714 where ds2 is the language attribute value, updateValue is the func-names attribute value that defines the function name, and P001_measurement is the module attribute value that defined the module name. The module code itself may be included between the tags <code><![CDATA[module code]]>[</code>. Instead, of including the module code itself, a name of a file that contains the module code may be included between <code-file><filename>[</code-file>.

The contqueries start and end tags are a container for a list of one or more continuous query elements of the one or more continuous queries 404. A continuous query of the one or more continuous queries 404 of project 402 is included within each pair of contquery start and end tags and includes windows 406, 408 and edges. The contquery start tag may include a "name" attribute, an "index" attribute, etc. The name attribute defines a name for the continuous query. The index attribute options may include pi_RBTREE, pi_HASH, pi_CL_HASH, pi_FW_HASH, pi_LN_HASH, pi_EMPTY, etc., where pi_RBTREE represents a red-black tree index, pi_HASH represents a hash index, pi_CL_HASH represents a closed hash index, pi_FW_HASH represents a forward hash index, pi_LN_HASH represents a linked hash index, pi_EMPTY represents a stateless window, etc. If specified, the index attribute defines a default index type for all windows in the continuous query that do not explicitly specify an index type. The continuous query definition further may include a windows definition defined between the windows start and end tags and a window connectivity definition defined between the edges start and end tags.

The windows start and end tags are a container of one or more window-type elements. A window of the windows 406, 408 is defined within each pair of window-type start and end tags. Illustrative window-type elements may include "aggregate", "calculate", "compute", "copy", "counter", "filter", "functional", "geofence", "join", "notification", "pattern", "procedural", "source", "textCategory", "textContext", "textSentiment", "union", "train", "score", etc. For illustration, the following XML may specify window type elements:

<windows>
    <window-source name="firstsourcewindowname" . . .
       </window-source>
    <window-source name="secondsourcewindowname" . . .
       </window-source>
    <window-join name="joinedInput" . . . </window-join>
    <window-union name="unionedInput" . . . </window-union>
    <window-procedural
       name="firstproceduralwindowname" . . . </window-union>
    </windows> that include a first source window of the source window type, a second source window of the source window type, a first join window of the join window type, a first union window of the union window type, and a first procedural window of the procedural window type.

Each window-type start tag may include a "name" attribute, an "index" attribute, a "collapse-updates" attribute, a "produces-only-inserts" attribute, an "insert-only" attribute, an "autogen-key" attribute, an "output-insert-only" attribute, etc. The name attribute defines a name for the window. The index attribute options may include pi_RBTREE, pi_HASH, pi_CL_HASH, pi_FW_HASH, pi_LN_HASH, pi_EMPTY, etc., where pi_RBTREE represents a red-black tree index, pi_HASH represents a hash index, pi_CL_HASH represents a closed hash index, pi_FW_HASH represents a forward hash index, pi_LN_HASH represents a linked hash index, pi_EMPTY represents a stateless window, etc. The collapse-updates attribute indicates true when multiple update blocks are collapsed into a single update block. The produces-only-inserts attribute indicates true when the window always produces inserts. The inserts-only attribute is used for a source window type and indicates true when the source window only accepts event objects that include the insert opcode. The autogen-key attribute indicates true when keys are automatically generated by the window. The output-insert-only attribute indicates true when the window only outputs inserts.

A schema definition, an executable module definition, and a connectors definition may be included between each pair of window-type start and end tags as illustrated below:

<schema>
      <fields>
        <field name=" " type=" " key=" ">
      </fields>
    </schema>
    <mas-map>
      <window-map module=" " function=" " revision=" "
         source=" ">
    </mas-map>
    <connectors>
      <connector name=" " class=" ">
        <properties>
          <property name=" "> </property>
        </properties>
      </connector>
    </connectors>

The schema definition is defined between the schema start and end tags and includes a fields definition defined between the fields start and end tags. The fields start and end tags are a container of one or more field tags that define the inputs to the source window. Each field tag may include a "name" attribute, a "type" attribute, a "key" attribute, etc. The name attribute defines a name for the field. The type attribute defines a data type for the field. The key attribute indicates true when the field is used as a key by the window. For illustration, the following provides a schema definition for an illustrative window:

<schema>
      <fields>
        <field name="key" type="double" key="true">
        <field name="key2" type="double" key="true">
        <field name="_deviceGuid_" type="string">
        <field name="_customerGuid_" type="string">
        <field name="_locationGuid_" type="string">
        <field name="_locationGuid_" type="string">
        <field name="_msr_dttm_" type="double">

```
<field name="_msr_date_" type="double">
<field name="_value_" type="string">
<field name="_record_type_" type="string">
</fields>
</schema>
```
that includes ten fields. In an alternative embodiment, a pair of schema-string start and end tags may be used instead to define the schema. The continuous query definition further may include a windows definition defined between the windows start and end tags and a window connectivity definition defined between the edges start and end tags.

The executable module definition is defined between the mas-map start and end tags and includes one or more window-map tags that each bind a function to a module defined using a mas-module tag. Each window-map tag may include a "module" attribute, a "revision" attribute, a "source" attribute, a "function" attribute, etc. The model attribute value of the mas-map tag matches a module attribute value of a mas-module tag. The function attribute value of the mas-map tag matches a function attribute value of the mas-module tag. The revision attribute value defines a revision number of the mas module to use. The source attribute value defines a name of the input window for which the function is a handler. For illustration, the following provides a mas-map definition for an illustrative window:

```
<mas-map>
  <window-map module="P100_ahu_transpose" function=
    "runMain" revision="0" source="ahu_add_trigger"/>
</mas-map>
```
where a module attribute having the value P100_ahu_transpose and a function attribute having the value runMain are defined by a mas-module tag. Revision zero of the mas module is used and a name attribute having the value ahu_add_trigger is defined by a window-type tag.

The connectors definition is defined between the connectors start and end tags and includes one or more connector definitions for the window where each connector definition is defined between a pair of connector start and end tags. The connector definition defines a connector or an adapter to stream data into or out of the window. Connectors and adapters may use the publish/subscribe API to interface with a variety of communication fabrics, drivers, and clients. Connectors are C++ classes that are instantiated in the same process space as ESPE 400; whereas, adapters are stand-alone executable files possibly built from connector classes.

Each connector start tag may include a "class" attribute, a "name" attribute, etc. The class attribute specifies a connector type of the data source of event publishing system 102 or the data recipient of event subscribing system 106 depending on whether the connector is used to input data to the window or output data from the window. For example, the class attribute may indicate one of "fs", "db", "mq", "project", "smtp", sol", tdata", "tibrv", "tva", "rmq", "adapter"' to indicate which type of connector is used for the connector definition. For illustration, "fs" indicates the data source is a file-socket, "db" indicates the data source is a database, "mq" indicates the data source is an IBM® Web-Spheres MQ, "project" indicates the data source is an ESP project, "smtp" indicates the data source is a simple mail transport server, "sol" indicates the data source is a Solace Systems message broker, "tdata" indicates the data source is a TeraData high performance database, "tibrv" indicates the data source is a Tibco Rendezvous message bus, and "tva" indicates the data source is a Tervela messaging fabric, "rmq" indicates the data source is a RabbitMQ message broker, "adapter" indicates the data source is an adapter. A fewer or a greater number of connector types may be used.

The provided options are merely for illustration. The name attribute defines a name for the connector. For illustration, the following provides two different connector definitions for an illustrative window:

```
<connectors>
  <connector name="csv_connector_1" class="fs">
    <properties>
      <property name="type"><pub></property>
      <property name="fsname"><filename></property>
      <property name="fstype"><csv></property>
      <property name="blocksize"><2048></property>
      <property name="growinginputfile"><true></prop-
        erty>
    </properties>
  </connector>
</connectors>
<connectors>
  <connector                          class='adapter'
    name='ahu_copy_scoredata_to_cas'>
    <properties>
      <property name='command'>commandline</prop-
        erty>
      <property name="type">sub</property>
      <property name="url">url</property>
    </properties>
  </connector>
</connectors>
```
where different properties may be included between the properties start and end tags depending on the type of connector defined by the class attribute.

For example, for the connector having class='fs', a property having name='type', a property having name='fsname', a property having name='fstype', a property having name='blocksize', a property having name=' growinginputfile', etc. may be defined for the connector The property attribute value for name='type' indicates whether the connector type is publish (pub) or subscribe (sub). The property attribute value for name='fsname' indicates whether the data source is a file or a socket. For example, the value for the property attribute for name='fsname' in the form of "host:port" indicates the data source is a socket. Otherwise, it is a file, and the filename is specified. The property attribute value for name='fstype' indicates a file format type of the filename when the value for the property attribute for name='fsname' indicates the data source is a file and may be selected, for example, from "binary", "csv", "xml", "json", "syslog", "hdat", "cef", etc. where "binary" indicates a binary formatted event, "csv" indicates a comma delimited data event, "xml" indicates an XML formatted event, "json" indicates an JavaScript object notation (JSON) formatted event, "syslog" indicates a system log event, "hdat" indicates an objective analysis package data event, "cef" indicates a common event formatted event. A fewer or a greater number of file-socket types may be used. The provided options are merely for illustration. The property attribute value for name='blocksize' defines a number of events to include in a published event block object received. The property attribute value for name='growinginputfile' indicates whether reading from a growing input file is enabled. When enabled, the connector reads indefinitely from the input file until the connector is stopped or the server drops the connection.

For example, for the connector having class='adapter', a property having name='type', a property having name= 'command', a property having name='url', etc. may be defined for the connector. The property attribute value for name='type' indicates whether the connector type is publish (pub) or subscribe (sub). The property attribute value for name='command' defines the command and options that are used to run the adapter from the command line. An illustrative command may be defined as "adapterlocation-k sub-H "insert_server.insert_port"-t "ahu"-n "^$@MY-USERID@$^"-l info-m public". The url attribute value for name='url' defines the URL for the adapter connection.

For illustration, the following is a description of illustrative window types that may be defined using the window-type tag:

- A "source" type window specifies a source window of a continuous query. Event streams enter continuous queries by being published or injected into a source window.
- A "compute" type window defines a compute window, which enables a one-to-one transformation of input events into output events through the computational manipulation of the input event stream fields.
- A "copy" type window makes a copy of a parent window, which can be useful to set new event state retention policies. Retention policies can be set in source and copy windows, and events may be deleted when a windows retention policy is exceeded.
- An "aggregate" type window is similar to a compute window in that non-key fields are computed. An aggregate window uses a key field or fields for a group-by condition. Unique key field combinations form their own group within the aggregate window such that events with the same key combination are part of the same group.
- A "counter" type window counts events streaming through to monitor a number and a rate at events are being processed.
- A "filter" type window specifies a window with a registered Boolean filter function or expression that determines which input events are allowed into the filter window.
- A "geofence" type window specifies a virtual perimeter for a real-world geographic area to generate a geofence as a radius around a specific location or a set of specific boundaries used to determine whether the location of an event stream is inside or close to an area of interest.
- A "functional" type window specifies different types of functions to manipulate or transform the data in events. Fields in a functional window can be hierarchical, which can be useful for applications such as web analytics.
- A "join" type window takes two input windows and a join type. A join window supports equijoins that are one to many, many to one, or many to many. Both inner and outer joins may be supported.
- A "notification" type window sends notifications through email, text, or multimedia message. Any number of delivery channels can be specified to send the notifications. A notification window uses the same underlying language and functions as the functional window.
- A "pattern" type window enables the detection of events of interest. A pattern defined in this window type is an expression that logically connects declared events of interest. For example, to define a "pattern" window, events of interest are defined and connected using operators such as "AND", "OR", "FBY", "NOT", "NOTOCCUR", and "IS". The operators can accept optional temporal conditions.
- A "procedural" or "calculate" type window enables specification of an arbitrary number of input windows and input-handler functions for each input window (that is, event stream) and executes the associated code using the data streamed into the window and outputs an event with any computed values.
- A "score" window accepts model events to make predictions for incoming data events and generates score data.
- A "textCategory" window enables categorization of a text field in incoming events. The text field could generate zero or more categories with scores.
- A "textContext" window enables abstraction of classified terms from an unstructured string field. This window type can be used to analyze a string field from an event"s input to find classified terms. Events generated from those terms can be analyzed by other window types. For example, a pattern window could follow a "textContext" window to look for tweet patterns of interest.
- A "textSentiment" window determines a sentiment of text in a specified incoming text field and a probability of its occurrence. A sentiment value is "positive," "neutral," or "negative." The probability is a value between 0 and 1.
- A "train" window receives data events and publishes model events to a score window. It uses the incoming data to develop and adjust a learning model in real time. The incoming data should contain both the outcome to be predicted and related variables.
- A "union" window specifies a simple join that merges one or more streams with the same schema.

For illustration, the following describes inputs that may be defined to characterize a procedural window type named "fpb_scoring":

```
<window-procedural name="fpb_scoring" index="pi_EMPTY" produces-only-inserts="true" collapse-updates="true">
  <schema>
    <fields>
      <field name="key" type="double" key="true"/>
      <field name="key2" type="double" key="true"/>
      <field name="key3" type="double" key="true"/>
      <field name="deviceGuid" type="string"/>
      <field name="customerGuid" type="string"/>
      <field name="locationGuid" type="string"/>
      <field name="deviceType" type="string"/>
      <field name="deviceValue" type="string"/>
      <field name="level_1" type="string"/>
      <field name="level_2" type="string"/>
      <field name="level_3" type="string"/>
      <field name="level_4" type="string"/>
    </fields>
  </schema>
  <mas-map>
    <window-map module="smc_fpb" revision="0"
      source="fpb_transpose" function="score_fpb"/>
  </mas-map>
  <connectors>
    <connector class='adapter'
      name='fpb_copy_scoredata_to_cas'>
      <properties>
        <property name='command'> command line
        </property>
        <property name='type'>sub</property>
        <property name='url'>url</property>
      </properties>
    </connector>
  </connectors>
</window-procedural>
```

The window connectivity definition is defined between the edges start and end tags and includes one or more edge definitions for the continuous query where each edge definition is defined by a pair of edge start and end tags. The window connectivity definition define the connectivity between windows of the continuous query where each edge defined between the edges start and end tags specifies a connectivity between two windows to define the directed graph flow of ESPE 400. Each edge tag may include a "source" name attribute, a "target" name attribute, and a "role" attribute. Each source name attribute value and target name attribute value define a name that matches a window-type name attribute value. The target name attribute value may define one or more names separated by a space. The role attribute defines a role of the edge. The role attribute options may include "data", "model", "request", "left", "right", "position", "geometry", etc. Edge roles "data", "model", and "request" may be used for edges that connect streaming analytics windows. Edge roles "left" and "right" may be used to define left and right inputs to a Join window. Edge roles "position" and "geometry" identify the type of data streaming from source windows that connect to a Geofence window as either position data events or geometry data events. For illustration, the following XML defines three continuous query flows:

```
<edges>
<edge source="union_data_sources" target="rename"/>
<edge source="rename" target="ahu_subset"/>
<edge source="ahu_subset" target="ahu_add_trigger"/>
<edge source="ahu_add_trigger" target="ahu_ transpose"/>
<edge source="ahu_transpose" target="ahu_scoring"/>
<edge source="ahu_scoring" target="ahu_alerting"/>
<edge source="rename" target="fpb_subset"/>
<edge source="fpb_subset" target="fpb_add_trigger"/>
<edge source="fpb_add_trigger" target="fpb_ transpose"/>
<edge source="fpb_transpose" target="fpb_scoring"/>
<edge source="fpb_scoring" target="fpb_alerting"/>
<edge source="rename" target="xyz_subset"/>
<edge source="fpb_subset" target="xyz_add_trigger"/>
<edge source="xyz_add_trigger" target="xyz_ transpose"/>
<edge source="xyz_transpose" target="xyz_scoring"/>
<edge source="xyz_scoring" target="xyz_alerting"/>
</edges>
```

Execution of ESP application 712 may be triggered using a command line command that may include zero or more command line parameters. Tokens may be included in the ESP model definition that are defined in the environment defined for ESP application 712 or by the zero or more command line parameters. For example, tokens may be indicated using all capital letters and enclosed in "@" signs.

Figure 8:
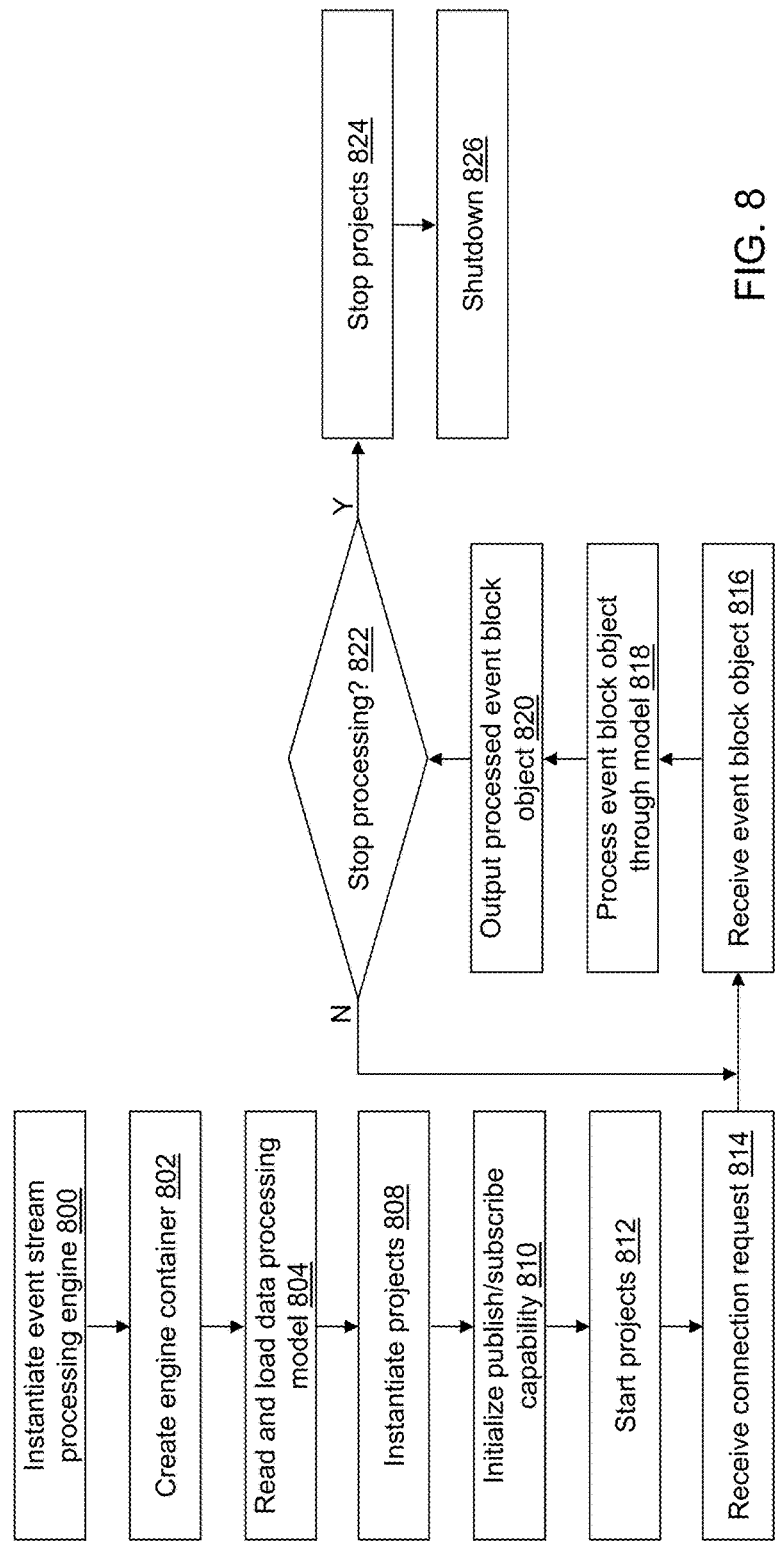
FIG. 8 depicts a flow diagram illustrating examples of operations performed by the ESP device of FIG. 7 in accordance with an illustrative embodiment.

Referring to FIG. 8, example operations associated with ESP application 712 are described. ESP application 712 defines how incoming event streams from event publishing system 102 are transformed into meaningful outgoing event streams consumed by event subscribing system 106. Additional, fewer, or different operations may be performed depending on the embodiment. The order of presentation of the operations of FIG. 8 is not intended to be limiting In an operation 800, ESPE 400 is instantiated at ESP device 104.

In an operation 802, the engine container is created. For illustration, ESPE 400 may be instantiated using a function call that specifies the engine container as a manager for an ESP model. The function call may include the engine name for ESPE 400. Data processing model 714 includes a definition of an ESP model to execute using ESPE 400. For illustration, data processing model 714 may be an XML file that is parsed and may include a program referenced for execution in a derived window 406, 408 by the parsed XML from data processing model 714.

Figure 9:
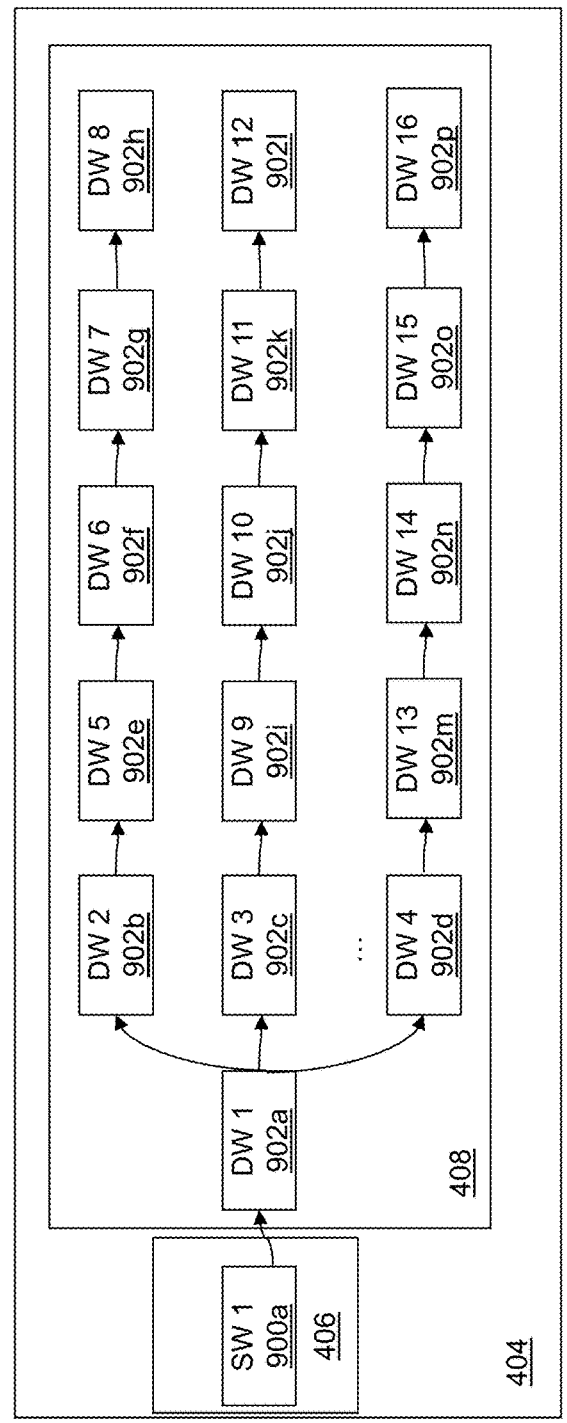
FIG. 9 depicts a directed graph of windows for event stream manipulation and transformation performed by the ESP device of FIG. 7 in accordance with an illustrative embodiment.

Referring to FIG. 9, a graphical representation of a continuous query 404 that could be defined in data processing model 714 is shown in accordance with an illustrative embodiment. The graphical representation indicates that the source windows 406 include a source window (SW) 1 900a into which data is published using adapter P 412, pub/sub API P 414, connectors, etc. based on ESP application 712 and/or data read from data processing model 714. SW 1 900a provides input to a derived window (DW) 1 902a. DW 1 902a provides input to a DW 2 902b, a DW 3 902c, and a DW 4 902d. DW 2 902b provides input to a DW 5 902e that provides input to a DW 6 902f that provides input to a DW 7 902g that provides to a DW 8 902h. DW 3 902c provides input to a DW 9 902i that provides input to a DW 10 902j that provides input to a DW 11 902k that provides to a DW 12 902l. DW 4 902d provides input to a DW 13 902m that provides input to a DW 14 902n that provides input to a DW 15 902o that provides to a DW 16 902p. For illustration, the following XML defines the connectivity between the windows where SW 1 900a is named "union_data_sources", DW 1 902a is named "rename", DW 2 902b is named "ahu_subset", DW 3 902b is named "fpb_subset", DW 4 902d is named "xyz_subset", DW 5 902e is named "ahu_add_trigger", DW 6 902f is named "ahu_transpose", DW 7 902g is named "ahu_scoring", DW 8 902h is named "ahu_alerting", DW 9 902i is named "fpb_add_trigger", DW 10 902j is named "fpb_transpose", DW 11 902k is named "fpb_scoring", DW 12 902l is named "fpb_alerting", DW 13 902m is named "xyz_add_trigger", DW 14 902n is named "xyz_transpose", DW 15 902o is named "xyz_scoring", and DW 16 902p is named "xyz_alerting":

```
<edges>
<edge source="union_data_sources" target="rename"/>
<edge source="rename" target="ahu_subset"/>
<edge source="ahu_subset" target="ahu_add_trigger"/>
<edge source="ahu_add_trigger" target="ahu_ transpose"/>
<edge source="ahu_transpose" target="ahu_scoring"/>
<edge source="ahu_scoring" target="ahu_alerting"/>
<edge source="rename" target="fpb_subset"/>
<edge source="fpb_subset" target="fpb_add_trigger"/>
<edge source="fpb_add_trigger" target="fpb_ transpose"/>
<edge source="fpb_transpose" target="fpb_scoring"/>
<edge source="fpb_scoring" target="fpb_alerting"/>
<edge source="rename" target="xyz_subset"/>
<edge source="fpb_subset" target="xyz_add_trigger"/>
<edge source="xyz_add_trigger" target="xyz_ transpose"/>
<edge source="xyz_transpose" target="xyz_scoring"/>
<edge source="xyz_scoring" target="xyz_alerting"/>
</edges>
```

Referring again to FIG. 8, in an operation 808, the one or more projects 402 defined by data processing model 714 are instantiated by ESPE 400. Instantiating the one or more projects 402 also instantiates the one or more continuous queries 404, the one or more source windows 406, and the one or more derived windows 408 defined from data processing model 714. The one or more continuous queries 404 may be instantiated with a dedicated thread pool or pools that generate updates as new event block objects stream through ESPE 400.

In an operation 804, data processing model 714 is read and loaded. ESP application 712 understands the syntax of data processing model 714 that is, for example, an XML model and translates it to something ESPE 400 understands.

In an operation 808, the one or more projects 402 defined in data processing model 714 are instantiated based on the read and loaded data processing model 714.

In an operation 810, the pub/sub capability is initialized for data processing model 714. In an illustrative embodiment, the pub/sub capability is initialized for each project of the one or more projects 402 defined by data processing model 714.

In an operation 812, the one or more projects 402 defined in data processing model 714 are started. For example, one or more connectors, adapter P 412, adapter S 418, etc. may be created to receive or to send event block objects to/from windows as defined in data processing model 714.

In an operation 814, a connection request is received from event publishing device 200 of event publishing system 102 for a source window of the windows-source type (as defined in data processing model 714) of ESPE 400 to which data will be published. A connection request may also be received from event subscribing device 500 of event subscribing system 106 to a source or derived window of ESPE 400 from which event block objects will be received by event subscribing device 500.

In an operation 816, an event block object is received by ESPE 400 through adapter P 412, pub/sub API P 414, connectors, etc. from event publishing device 200. An event block object containing one or more event objects is injected into a source window of the one or more source windows 406 defined in data processing model 714.

In an operation 818, the received event block object is processed through the one or more continuous queries 404 as defined in data processing model 714.

In an operation 820, the processed event block object is routed to event subscribing system 106 based on subscriptions to the windows of data processing model 714. Subscribing devices can correlate a group of subscribed event block objects back to a group of published event block objects by comparing the unique ID of the event block object that a publisher, such as event publishing device 200, attached to the event block object with the event block ID received by a subscribing device, such as event subscribing device 500. The received event block objects further may be stored, for example, in a RAM or cache type memory of third computer-readable medium 708.

In an operation 822, a determination is made concerning whether or not processing is stopped. If processing is not stopped, processing continues in operation 816 to continue receiving the one or more event streams containing event block objects from event publishing system 102. If processing is stopped, processing continues in an operation 824.

In operation 824, the started engines/projects/connectors are stopped

In an operation 826, ESPE 400 is shutdown.

Figure 10:
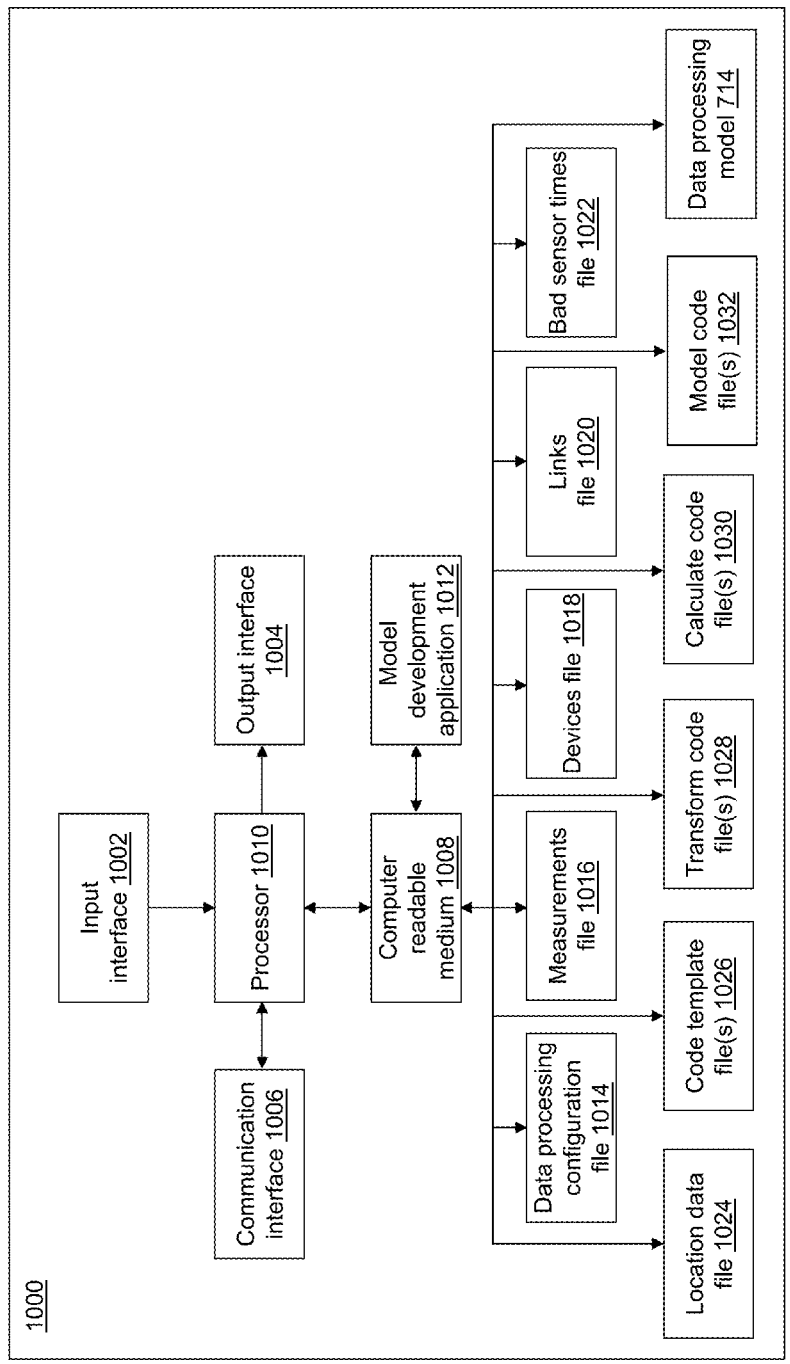
FIG. 10 depicts a block diagram of a data processing model development device in accordance with an illustrative embodiment.

For illustration, referring to FIG. 10, a block diagram of a data model developer device 1000 is shown in accordance with an example embodiment. Data model developer device 1000 creates data processing model 714 that may include one or more files.

Data model developer device 1000 may include a fourth input interface 1002, a fourth output interface 1004, a fourth communication interface 1006, a fourth computer-readable medium 1008, a fourth processor 1010, a model development application 1012, a data processing configuration file 1014, a measurements file 1016, a devices file 1018, a links file 1020, a bad sensor times file 1022, a location data file 1024, code template files 1026, transform code files 1028, calculate code files 1030, model code files 1032, and data processing model 714. Data processing configuration file 1014, measurements file 1016, devices file 1018, links file 1020, bad sensor times file 1022, location data file 1024, code template files 1026, transform code files 1028, calculate code files 1030, and model code files 1032 may be integrated into one or more files. Transform code files 1028, calculate code files 1030, and model code files 1032 may be comprised of zero or more files.

Referring to FIG. 10, fewer, different, and additional components may be incorporated into data model developer device 1000. Fourth input interface 1002 provides the same or similar functionality as that described with reference to input interface 202 of event publishing device 200 though referring to data model developer device 1000. Fourth output interface 1004 provides the same or similar functionality as that described with reference to output interface 204 of event publishing device 200 though referring to data model developer device 1000. Fourth communication interface 1006 provides the same or similar functionality as that described with reference to communication interface 206 of event publishing device 200 though referring to data model developer device 1000. Data and messages may be transferred to/from data model developer device 1000 using fourth communication interface 1006. Fourth computer-readable medium 1008 provides the same or similar functionality as that described with reference to computer-readable medium 208 of event publishing device 200 though referring to data model developer device 1000. Fourth processor 1010 provides the same or similar functionality as that described with reference to processor 210 of event publishing device 200 though referring to data model developer device 1000.

Model development application 1012 performs operations associated with creating data processing model 714 based on information read from data processing configuration file 1014, measurements file 1016, devices file 1018, links file 1020, bad sensor times file 1022, location data file 1024, code template files 1026, transform code files 1028, calculate code files 1030, and/or model code files 1032. The operations may be implemented using hardware, firmware, software, or any combination of these methods. Referring to the example embodiment of FIG. 10, model development application 1012 is implemented in software (comprised of computer-readable and/or computer-executable instructions) stored in fourth computer-readable medium 1008 and accessible by fourth processor 1010 for execution of the instructions that embody the operations of model development application 1012. Model development application 1012 may be written using one or more programming languages, assembly languages, scripting languages, etc. Model development application 1012, for example, may be implemented as a Web application.

Figure 11:
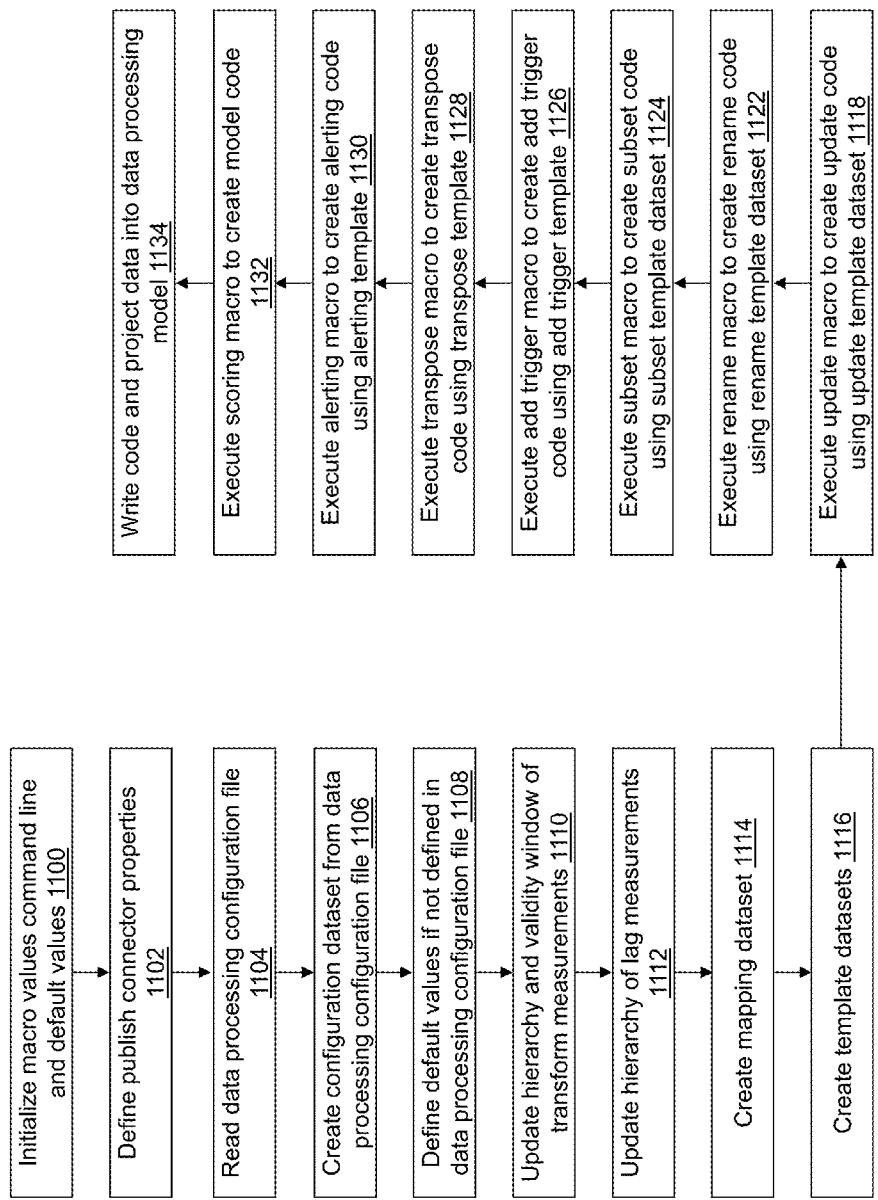
FIG. 11 depicts a flow diagram illustrating examples of operations performed by the data processing model development device of FIG. 10 in accordance with an illustrative embodiment.

Referring to FIG. 11, example operations associated with model development application 1012 are described. Additional, fewer, or different operations may be performed depending on the embodiment. The order of presentation of the operations of FIG. 11 is not intended to be limiting. For illustration, the following macro command may be executed to trigger execution of model development application 1012:

```
%buildEspProject (
    myprojectname              =qa,
    myprojectxmllist           =qa,
    mycustomerGuid             = insert_customer_GUID,
    subsetLocation             ='ALL',
    subsetModarea              ='ALL',
    subsetFirstDTTM            =,
    subsetLastDTTM             =,
    myweatherinterval          =900,
    myhistoryinterval_realtime =900,
    myoutputinterval_realtime  =900,
    myhistoryinterval_historical =900,
    myoutputinterval _historical =900,
    myweatherkey               =insert_weather_key,
    myportnumber0              =,
    myportnumber2              =,
    rawpts_only                =N,
    connectorclass             =mqtt,
    smcconnector               =N,
    run_scoring_yn             =Y,
    xml_only                   =Y);
``` where the value defined for myprojectname defines a name for data processing configuration file 1014, the value defined for myprojectxmllist defines a list of XML files to use, the value defined for mycustomerGuid defines a globally unique identifier (ID) (GUID) associated with a customer defined in data processing configuration file 1014, the value defined for subsetLocation includes a list of one or more locations that may indicate 'ALL' to use all of the location included in location data file 1024, the value defined for subsetModarea includes a list of one or more modeling areas that may indicate 'ALL' to use all of the modeling areas included in data processing configuration file 1014, the value defined for subsetFirstDTTM defines a starting date range to process, the value defined for subsetLastDTTM defines an ending date range to process, the value defined for myweatherinterval defines how often real-time weather data is queried, the value defined for myhistoryinterval_realtime defines how often a current measurement is added to a real time history, the value defined for myoutputinterval_realtime defines how often measurement data is output to a real time history, the value defined for myhistoryinterval_historical defines how often a current measurement is added to a historical history, the value defined for myoutputinterval_historical defines how often measurement data is output to a historical history, the value defined for myweatherkey defines a world weather online weather key, the value defined for myportnumber0 defines a primary HTTP administration port for an ESP server that executes data processing model 714, the value defined for myportnumber2 defines a primary pub/sub port for the ESP server that executes data processing model 714, the value defined for rawpts_only indicates yes when data processing configuration file 1014 only receives a raw feed of sensor measurements, the value defined for connectorclass defines a connector class for the source of the raw feed of sensor measurements, the value defined for smcconnector defines a connector when the source of the raw feed of sensor measurements is a Brady data pumper, the value defined for run_scoring_yn indicates yes when model code included in model code files 1032 is used, the value defined for xml_only indicates yes when code template files 1026, transform code files 1028, calculate code files 1030, and/or model code files 1032 are included in data processing model 714.

The parameter values may be provided on a command line to execute model development application 1012 or in the macro that is executed. Additional or fewer parameters may be defined in alternative embodiments. For example, file locations may use default locations using a standardized directory structure or the file location may be an input provided on the command line to execute model development application 1012, in the macro that is executed, or read from a known file and file location that provides default parameter values.

In an operation 1100, macro values used by model development application 1012 are initialized, for example, from the values provided to execute model development application 1012, using default values read from a default input file, and/or defined by the code of model development application 1012.

In an operation 1102, publish connector properties are defined. The publish connector properties may be read from a default publish connector file, from the values provided to execute model development application 1012, and/or defined by the code of model development application 1012. Illustrative publish connector properties include a host IP address, a client ID, a message type, a user ID, a password, a port number, a secure sockets layer (ssl) indicator, a location/filename of an ssl certificate if the ssl indicator indicates true, etc.

In an operation 1104, data processing configuration file 1014 is read. The location and filename for data processing configuration file 1014 may be defined from the myprojectname parameter or otherwise provided as an input to model development application 1012. Data processing configuration file 1014 defines what datasets should be created, what sensor measurements are included in each dataset, what additional measurements are created, and what analytic models are included to make predictions based on measurements received from and/or computed on the data that will be streamed. In an illustrative embodiment, data processing configuration file 1014 is an XML file though one or more files having various formats may be used in alternative embodiments. The basic structure of the XML schema for data processing configuration file 1014 is shown below for illustration.

```
<?xml version="1.0" encoding="UTF-8"?>
<espModel customerGuid="insert-id-for-customer">
    <modelLocation locationGuid="insert-id-for-location-
    to-subset-or-ALL">
        <modelArea modelAreaId="insert-device-type-for-final-dataset"
        defaultHierarchy="insert-default-hierarchy">
            <labels>
                <level labelDeviceType="" labelLevel="">1</level>
            </labels>
            <modelMeasurements>
                <!-- RAW MEASUREMENTS -->
                <!-- TRANSFORM MEASUREMENTS -->
                <!-- LAG MEASUREMENTS -->
                <!-- AGGREGATION MEASUREMENTS -->
                <!-- CALCULATION MEASUREMENTS -->
            </modelMeasurements>
            <analyticalModels>
                <!-- ANALYTICAL MODELS -->
            </analyticalModels>
        </modelArea>
    </modelLocation>
</espModel>
```

The ESP model definition used to create data processing model 714 is defined between the espModel start and end tags. The customerGuid attribute included on the espModel start tag defines a unique customer ID for the ESP model. The ESP model definition includes a location definition. The location definition defines one or more locations to be processed by data processing model 714. Each location definition is defined between a pair of modelLocation start and end tags. The modelLocation start tag may include a locationGuid attribute that includes a list of one or more unique location IDs defined in location data file 1024 or the indicator "ALL" to indicate that all of the locations defined in location data file 1024 are to be output to the same dataset and to be visualized in the same reports as opposed to separate datasets for any location specified in the list of one or more locations.

The location definition further may include a model area definition that defines one or more modeling areas of each location to be processed by data processing model 714 where each modeling area is defined between a pair of modelArea start and end tags. Output datasets created when ESPE 400 is executed with data processing model 714 created from data processing configuration file 1014 contain variables that are at the same device level. The model area definition allows specification of what device level dataset to output. This output dataset will have the same name as the device level to which all the fields are related.

The modelArea start tag may include a "modelAreaId" attribute and a "defaultHierarchy" attribute. The modelAreaId attribute is defined for a device type of interest and is used as a name of an output dataset that will be created when ESPE 400 is executed with data processing model 714 created from data processing configuration file 1014. The modelAreaId attribute value matches a device type included in devices file 1018. A separate output dataset is created for each modeling area defined between the modelLocation start and end tags. The defaultHierarchy attribute defines a default hierarchy to be used for the modeling area and matches a hierarchy name included in links file 1020 and associated with the modelAreaId attribute value. A hierarchy name defined by the defaultHierarchy attribute value indicates a main hierarchy from which the levels and connections will be determined by model development application 1012.

Each model area definition may include a labels definition, a measurements definition, and an analytic models definition. The labels definition provides a context for a device identified using the default hierarchy defined in links file 1020 and includes zero or more level definitions defined between level start and end tags. Each level start tag may include a "labelDeviceType" attribute and a "labelLevel" attribute. The labelDeviceType attribute value defines a device type that matches a device type in devices file 1018 for the associated label level in the hierarchy defined by the defaultHierarchy attribute value. The labelLevel attribute value defines a label to be used in output for the matching device type in devices file 1018. A label level value is defined between the level start and end tags and is a numerical value indicating a level for the matching device type in devices file 1018. In an illustrative embodiment, there may be up to four levels though a greater or a fewer number of levels may be defined in alternative embodiments.

Each level describes a different level of the hierarchy defined by the defaultHierarchy attribute value. The labels definition is used to define a parent-child relationship for a user interface of event subscribing application 522. The customer defined by the customerGuid attribute value and the location defined by the locationGuid attribute may be used to define additional levels. The number of levels that will be filled when ESPE 400 is executed with data processing model 714 is dependent on the number of levels in the hierarchy. If the hierarchy is at the top level (e.g., a location level that is a building), all of the levels may be empty. Otherwise, the levels follow a parent-child relationship defined using links file 1020 for the hierarchy. As an example, from devices file 1018, it is determined that, in the air hierarchy, a child of the location level (e.g., bldg) is the "hru" level, which is a parent of the "ahu" level. At the lowest level defined, the "labelDeviceType" attribute value has the same device type as the value associated with the modelAreaId attribute value.

The XML provided below shows an illustrative labels definition.

```
<espModel customerGuid="insert_customer_GUID">
    <modelLocation locationGuid="ALL">
        <modelArea modelAreaId="ahu" defaultHierarchy="air">
            <labels>
                <level labelDeviceType="hru" labelLevel="Heat Recovery Unit">1</level>
                <level labelDeviceType="ahu" labelLevel="Air Handler Unit">2</level>
                <level labelDeviceType="" labelLevel="">3</level>
                <level labelDeviceType="" labelLevel="">4</level>
            </labels>
```

The espModel included in data processing configuration file 1014 is selected based on the customerGuid attribute value matching the value defined using the mycustomerGuid parameter at input. Because the customer is treated as a device type, devices file 1018 includes a unique device ID that matches the value "insert_customer_GUID" defined using the customerGuid attribute.

Multiple model areas can be defined resulting in multiple output datasets. For illustration, the XML below indicates that two output datasets will be created when ESPE 400 is executed with data processing model 714 created from data processing configuration file 1014. Each record of a first dataset named "ahu" contains fields related to an individual air handler at a given date/time. Each record of a second dataset named "fpb" contains fields related to an individual fan powered box at a given date/time.

```
<espModel customerGuid="SAS">
<!--CUSTOMER:SAS-->
<modelLocation locationGuid="SAS+C">
<!--LOCATION: BUILDING C-->
<modelArea modelAreaId="ahu" defaultHierarchy="air">
    <!--MODEL AREA: Air Handler-->
</modelArea>
<modelArea modelAreaId="fpb" defaultHierarchy="air">
    <!--MODEL AREA: Fan Powered Box-->
</modelArea>
</modelLocation>
</espModel>
```

The measurements definition defines one or more measurements that are tracked and created when data processing model 714 is executed using ESPE 400 and are defined between the "modelMeasurements" start and end tags of a modeling area definition. There are five kinds of measurements: raw measurements (the sensor measurements included in the published event stream), transform measurements, lag measurements, aggregate measurements, and calculated measurements. Each type is defined by zero or more measurement start and end tags except the raw measurements that includes one or more measurement start and end tags. For illustration, the XML below defines an illustrative measurement of each type:

```
<measurement
measurementType="raw"
deviceType=" "
measurementId=" "
measurementIdLabel=" "
validityWindow=" ">
</measurement>
<measurement
measurementType="transform"
deviceType=" "
measurementId=" "
measurementIdLabel=" "
validityWindow=" ">
</measurement>
<measurement
measurementType="lag"
deviceType=" "
measurementId=" "
measurementIdLabel=" "
validityWindow=" ">
</measurement>
<measurement
measurementType="aggregation"
deviceType=" "
measurementId=" "
measurementIdLabel=" "
validityWindow=" ">
</measurement>
<measurement
measurementType="calculation"
deviceType=" "
measurementId=" "
measurementIdLabel=" "
validityWindow=" ">
</measurement>
```

The measurement start tag includes a "measurementType" attribute that is selected from "raw" to indicate a raw measurement, "transform" to indicate a transform measurement, "lag" to indicate a lag measurement, "aggregation" to indicate a transform measurement, and "calculation" to indicate a transform measurement. The measurements of each type are grouped together in data processing configuration file 1014 in the order specified for simplicity of review though this is not required.

All of the measurement types share the same basic measurement information, but each has additional attributes to accommodate the processing necessary for that specific measurement type. For example, there are nine common attributes for all measurement types. The XML schema below illustrates the definition of the nine common attributes for all measurement types

```
<measurement
measurementType="raw|transform|lag|aggregation|calculation"
deviceType="insert-device-type-of-raw-measurement"
measurementId="insert-raw-measurement-id"
measurementIdLabel="insert-measurement-label-for-visualizations"
measurementDataType="double|char"
<!--beginning of optional attributes within the measurements tag-->
retainForScoring="true|false"
retainForAlerting="true|false"
acceptableMin="insert-minimum-acceptable-value"
acceptableMax="insert-maximum-acceptable-value"
<!--end of optional attributes within the measurements tag-->
```

A measurement type is defined using the measurementType attribute value, a device type is defined using the deviceType attribute value, a measurement ID is defined using the measurementId attribute value, a measurement ID label is defined using the measurementIdLabel attribute value, and a measurement data type is defined using the measurementDataType attribute value. When not defined by the measurement tag, default values may be used automatically. For example, the measurementDataType attribute value may default to double if not defined by the measurement tag. Measurements used in any transformation, lag, aggregation, or calculation are defined in the raw measurements section. A calculation measurement may be defined from raw, transformation, lag, and/or aggregation measurements or other calculation measurements.

If the measurement type selected is raw, the device type matches a unique device type included in devices file 1018. Otherwise, the device type matches a value defined using the modeling area ID defined within the associated modelArea start and end tags. The measurement ID describes the associated measurement. If the measurement type selected is raw, the measurement ID matches a measurement ID in measurements file 1016. The measurement ID label provides a description of the sensor measurement that can be displayed in visualization tools. The measurement data type defines a data type of the associated measurement. For example, the measurement data type may be defined as a double data type or a character data type though additional data types may also be selectable.

A measurement type may further be defined using the optional attributes retainForScoring, retainForAlerting, acceptableMin, and acceptableMax. The retainForScoring attribute value defines a retain for scoring flag that indicates whether the measurement will be included in a scored output dataset. The retainForScoring attribute value may default to true. The retainForAlerting attribute value indicates whether the measurement will be included in an alert output dataset. The retainForAlerting attribute value may default to true. The acceptableMin attribute value defines a minimum acceptable value. If the value of the measurement is less than the minimum acceptable value, it is set to the minimum acceptable value. The acceptableMax attribute value defines a maximum acceptable value. If the value of the measurement is greater than the maximum acceptable value, it is set to the maximum acceptable value.

The first type of measurement is the raw measurement type. The XML schema below defines one or more raw sensor measurements used to monitor the device defined by the modelAreaId attribute value.

```
<!--RAW MEASUREMENTS-->
<measurement measurementType="raw"
deviceType="insert-device-type-of-raw-measurement"
measurementId="insert-raw-measurement-id"
measurementIdLabel="insert-measurement-label-for-visualizations"
measurementDataType="double|char"
```

```
<!--beginning of optional attributes within the measure-
    ments tag-->
acceptableMin="insert-minimum-acceptable-value"
acceptableMax="insert-maximum-acceptable-value"
retainForScoring="true|false"
retainForAlerting="true|false"
validityWindow="insert-last-acceptable-timeperiod-for-
    value"
<!--end of optional attributes within the measurements
    tag-->
>
<historicalMeasurementCount>
    insert-number-of-time-periods
</historicalMeasurementCount>
</measurement>
```

The validityWindow attribute of the measurement defines an additional optional attribute for a raw measurement type. The value associated with the validityWindow attribute defines a number of seconds for which a value remains valid. The validityWindow attribute value is used to make sure old values are not retained for the measurement if the sensor goes down or the communication with the sensor is inactive. After the number of seconds specified, ESPE 400 sets the measurement to missing if another sensor reading is not received.

The raw measurement type further includes a historical time period definition defined between the historicalMeasurementCount start and end tags that defines a number of historical periods of the raw measurement to maintain for a lag or a temporal aggregation. The historicalMeasurementCount tag is not an attribute of the measurement tag like the other options for raw measurements. The historicalMeasurementCount tag is a separate tag that occurs within the measurement tag, but outside the initial call. The historicalMeasurementCount tag determines how far back historical data for the measurement is maintained in memory by ESPE 400 to support the calculation of a lag or a temporal aggregation. Typically, this number coordinates with how long a lag the measurement has. If the lag is a lag of one time period, the value defined for the historicalMeasurementCount tag is one to signify that one historical time period of the raw measurement value is kept. One time period is not necessarily one second or one minute. The time period is the frequency with which ESPE 400 outputs measurements. If the output frequency is set to every 15 minutes (900 seconds), the historicalMeasurementCount defined as one time period retains 15 minutes of measurement data for the measurement variable.

The XML below provides four illustrative raw measurements.

```
<!--RAW MEASUREMENTS-->
<measurement measurementType="raw"
deviceType="bldg"
measurementId="wth_tempf"
measurementIdLabel="Temperature (F)"
measurementDataType="double"
validityWindow="3600"
></measurement>
<measurement measurementType="raw"
deviceType="bldg"
measurementId="wth_windspeedkmph"
measurementIdLabel="Windspeed (kmph)"
measurementDataType="double"
></measurement>
<measurement measurementDataType="raw"
deviceType="ahu"
measurementId="ahu_sply_fan_kw"
measurementIdLabel="Supply Fan KW"
measurementDataType="double"
acceptableMin="0"
validityWindow="3600"
>
<historicalMeasurementCount>1</historicalMeasurementCount>
</measurement>
<measurement measurementDataType="raw"
deviceType="ahu"
measurementId="ahu_zohum_act"
measurementIdLabel="Zone Humidity"
measurementDataType="double"
validityWindow="900"
<historicalMeasurementCount>8</historicalMeasurementCount>
></measurement>
<measurement measurementDataType="raw"
deviceType="ahu"
measurementId="ahu_occ_act"
measurementIdLabel="Occupancy"
measurementDataType="double"
validityWindow="7200"
></measurement>
<measurement measurementDataType="raw"
deviceType="fpb"
measurementId="fpb_occ_act"
measurementIdLabel="Supply Fan KW"
measurementDataType="double"
retainForScoring="false"
></measurement>
```

The deviceType values for raw measurements do not need to match the deviceType attribute value defined for the modelAreaId attribute. If the deviceType of a measurement is at a lower level in the hierarchy or in a different hierarchy than the deviceType attribute value defined for the modelAreaId attribute, the measurement will be aggregated in the aggregation measurement section. Once the aggregation has been performed, the original raw measurements may no longer be needed. Thus, in this case, the attribute retainForScoring may be set to "false". For example, for "deviceType="fpb"" above, fpb is lower on the air hierarchy than ahu, which can be determined from links file 1020. The measurements will no longer be retained after being used for an aggregation. On the other hand, if the deviceType attribute value of the measurement is at a higher level in the hierarchy than the deviceType attribute value defined for the modelAreaId attribute, no additional information is required. The value of the raw measurement will be repeated for every relevant device as seen above for "deviceType="bldg"". Bldg is at the location level of the air hierarchy, and thus, is higher in the hierarchy than the ahu device type. The value of the raw measurement will be repeated for every relevant device, but no additional information is required. If a deviceType is the same as the deviceType attribute value defined for the modelAreaId attribute, no additional information is required.

As seen above for "deviceType="ahu"", if the supply fan returned a negative number, the value is reset to zero by ESPE 400. After one hour, if another supply fan measurement is not received by ESPE 400, the measurement will be set to missing.

The second type of measurement is the transform measurement. The XML schema below lists zero or more transform measurements that are each generated based on a single raw measurement.

```
<!--TRANSFORM MEASUREMENTS-->
<measurement measurementType="transform"
    deviceType="insert-device-type-of-transform-measurement"
measurementId="insert-transform-measurement-id"
measurementIdLabel="insert-measurement-label-for-visualization"
measurementDataType="double|char"
<!--beginning of optional attributes within the measurements tag-->
acceptableMin="insert-minimum-acceptable-value"
acceptableMax="insert-maximum-acceptable-value"
retainForScoring="true|false"
retainForAlerting="true|false"
<!--end of optional attributes within the measurements tag-->
>
    <transformTargetMeasurementId>
        insert-transform-measurement-id
    <\transformTargetMeasurementId>
</measurement>
```

The transform measurement type further includes a transform measurement ID definition defined between the transformTargetMeasurementId start and end tags that defines the measurement ID for the raw measurement on which the transformed measurement is performed. The value associated with the transformTargetMeasurementId tag indicates a raw measurement defined in data processing configuration file 1014 in the raw measurements section. Each transform measurement has an associated transform code file included in transform code files 1026 that contains the code to create the transform measurement. The file is named using the value associated with the transformTargetMeasurementId tag. Transform code files 1028 may be comprised of zero or more code files.

A transform can be any type of calculation on one value. It can contain algebraic expressions, trigonometric expressions, etc. The XML below provides an example of three transform measurements.

```
<!--TRANSFORM MEASUREMENTS-->
<measurement
measurementType="transform"
deviceType="ahu"
measurementId="ahu_fan_active"
measurementIdLabel="Supply Fan Active"
measurementDataType="char"
validityWindow="7200">
    <transformTargetMeasurementId>
        ahu_sply_fan_kw
    </transformTargetMeasurementId>
</measurement>
<measurement
measurementType="transform"
deviceType="ahu"
measurementId="ahu_sply_fan_kwh"
measurementIdLabel="Supply Fan KWH"
measurementDataType="double"
acceptableMin="0">
    <transformTargetMeasurementId>
        ahu_sply_fan_kw
    </transformTargetMeasurementId>
</measurement>
<measurement
measurementType="transform"
deviceType="ahu"
measurementId="ahu_occ_active"
measurementIdLabel="Occupancy Active"
measurementDataType="char">
    <transformTargetMeasurementId>
        ahu_occ_act
    </transformTargetMeasurementId>
</measurement>
```

A code file named "ahu_fan_active", a code file named "ahu_sply_fan_kwh", and a code file named "ahu_occ_active" include the code to perform each transform, respectively, and that are included in transform code files 1028. The template below is used in each transform code file.

```
/*********/
*VARNAME:    insert_transform_measurement_measurementId;
*VARTYPE: NUM/8|CHR/insert_length;
*REQUIRED MEASUREMENTS: insert_measurement_required_for_tranform;
/*********/
/*BEGIN CODE*/
    insert_logic_to_define_transform
/*END CODE*/
```

The "Varname" value matches the name of the file and the value defined by the associated measurementId attribute for the transform measurement. The "Vartype" value defines the data type and length of the transformed measurement. The data type can be either NUM or CHR. The length of the NUM is 8, but the length of the CHR can vary. Other data types and lengths may be used in alternative embodiments. The "Required Measurements" value defines a single measurement ID for the raw measurement that matches the value defined by the associated transformTargetMeasurementId attribute for the transform measurement. The code to accomplish the transformation replaces the "insert_logic_to_define_transform".

For example, the ahu_fan_active code file included in transform code files 1028 is shown below for illustration.

```
/*********/
*VARNAME: AHU_FAN_ACTIVE;
*VARTYPE: NUM/8,
*REQUIRED MEASUREMENTS: ahu_sply_fan_kw;
/*********/
/*BEGIN CODE*/
    if measurementDoubleValue gt 0 then
        transformMeasurementCharValue=1;
    else
        transformMeasurementCharValue=0;
/*END CODE*/
```

For example, the ahu_sply_fan_kwh code file included in transform code files 1028 is shown below for further illustration.

```
/*********/
*VARNAME: AHU_SPLY_FAN_KWH;
*VARTYPE: NUM/8,
*REQUIRED MEASUREMENTS: ahu_sply_fan_kw;
/*********/
/*BEGIN CODE*/
    transformMeasurementDoubleValue=measurementDoubleValue/4;
/*END CODE*/
```

For example, the ahu_occ_active code file included in transform code files 1028 is shown below for further illustration.

```
/*********/
*VARNAME: AHU_OCC_ACTIVE;
*VARTYPE: CHR/5,
*REQUIRED MEASUREMENTS: AHU_OCC_ACT;
/*********/
/*BEGIN CODE*/
    if measurementDoubleValue=1 then
``` transformMeasurementCharValue='true';
else
transformMeasurementCharValue='false';
/*END CODE*/

Neither of the measurementId attribute value or the transformTargetMeasurementId attribute value is included in the code. The transform differentiates the output measurement from the input measurement. The input data type is that defined for the raw measurement associated with the transformTargetMeasurementId attribute value. The output data type is the measurementDataType attribute value defined for the transform measurement.

The transform measurement allows the user to transform a measurement into a new format that can be used in lags, aggregations, and calculations. For example, unit conversions or measurement data type conversions may be performed before computing the lag or aggregate values. New measurements that use multiple inputs may be created after the transform, lag, and/or aggregation using a calculation measurement.

The third type of measurement is the lag measurement. The XML schema below lists lag measurements that are generated based on a single raw or transformed measurement.

```
<!--LAG MEASUREMENTS-->
<measurement
measurementType="lag"
deviceType="insert-device-type-of-lag-measurement"
measurementId="insert-lag-measurement-id"
measurementIdLabel="insert-lag-measurement-label-for-visualization"
measurementDataType="double|char"
<!--beginning of optional attributes within the measurements tag-->
acceptableMin="insert-minimum-acceptable-value"
acceptableMax="insert-maximum-acceptable-value"
retainForScoring="true|false"
retainForAlerting="true|false"
<!--end of optional attributes within the measurements tag-->
>
<lagTargetMeasurementId>
    insert-measurement-id
</lagTargetMeasurementId>
<lagValueIndex>
    insert-number-of-time-periods-of-lag
</lagValueIndex>
</measurement>
```

The lag measurement type further includes a lag measurement ID definition defined between the lagTargetMeasurementId start and end tags that defines the measurement ID for the raw measurement or the transform measurement on which the lag measurement is performed. The value associated with the lagTargetMeasurementId tag indicates a raw measurement or a transform measurement defined in data processing configuration file 1014 in the raw measurements section or the transform measurements section, respectively.

The lag measurement type further includes a lag value index definition defined between the lagValueIndex start and end tags that defines a number of time periods for the lag. The value associated with lagValueIndex tag is less than or equal to the historicalMeasurementCount attribute value defined for the measurementId attribute associated with the lagTargetMeasurementId. The XML below provides an example of a lag measurement definition.

```
<!--LAG MEASUREMENTS-->
<measurement
measurementType="lag"
deviceType="ahu"
measurementId="lag_ahu_zohum_act"
measurementIdLabel="Zone Humidity-One Period Lag"
measurementDataType="double"
validityWindow="7200"
>
<lagTargetMeasurementId>
    ahu_zohum_act
</lagTargetMeasurementId>
<lagValueIndex>1</lagValueIndex>
</measurement>
<measurement
measurementType="lag"
deviceType="ahu"
measurementId="lag_sply_fan_kwh"
measurementIdLabel="Supply Fan KWH-One Period Lag"
measurementDataType="double"
>
<lagTargetMeasurementId>
    ahu_sply_fan_kwh
</lagTargetMeasurementId>
<lagValueIndex>1</lagValueIndex>
</measurement>
```

The lag measurement definition may be similar to the associated raw or transform measurement definition. For example, the deviceType and the measurementDataType may be the same for the lag as it is for the raw measurement definition or the transform measurement definition. The measurementId is given the same name of the associated raw measurement or the associated transform measurement definition prepended with "lag_" though other naming conventions may be used.

The fourth type of measurement is the aggregation measurement. The XML schema below describes aggregation measurements.

```
<!--AGGREGATION MEASUREMENTS-->
<measurement measurementType="aggregation"
deviceType="insert-device-type-of-lag-measurement"
measurementId="insert-lag-measurement-id"
measurementIdLabel="insert-lag-measurement-label-for-visualization"
measurementDataType="double|char"
<!--beginning of optional attributes within the measurements tag-->
acceptableMin="insert-minimum-acceptable-value"
acceptableMax="insert-maximum-acceptable-value"
retainForScoring="true|false"
retainForAlerting="true|false"
<!--end of optional attributes within the measurements tag-->
>
<aggregationDefinition
    aggregationType="relational|temporal">
    <aggregationTargetMeasurementId>
        insert-measurement-id
    </aggregationTargetMeasurementId>
    <aggregationFunction>
        avg|max|min|sum
    </aggregationFunction>
    <!--Additional options dependent on relational vs temporal-->
</aggregationDefinition>
</measurement>
```

The aggregation measurement type further includes an aggregation definition defined between aggregationDefinition start and end tags. The aggregation definition includes an "aggregationType" attribute, aggregationTargetMeasurementId start and end tags, and aggregationTargetMeasurementId start and end tags. The aggregationType attribute defines what type of aggregation is performed. The value associated with the aggregationType attribute may be either relational or temporal. A relational aggregation performs an aggregation on one measurement across like devices that have the same device type defined in devices file 1018. A temporal aggregation performs an aggregation on one measurement across a specified period of time.

Each type of aggregation requires a different set of attributes. Two of these attributes are common to both aggregation types. An aggregation measurement ID definition defined between the aggregationTargetMeasurementId start and end tags defines the measurement ID for the raw, transformed, or lagged measurement on which the aggregation measurement is performed. The value associated with the aggregationTargetMeasurementId tags indicates a raw, transformed, or lagged measurement defined in data processing configuration file 1014 in the raw measurements section, the transform measurements section, or the lag measurements section, respectively.

An aggregation function definition defined between the aggregationFunction start and end tags defines a mathematical type of aggregation to perform and may be selected from "avg" to compute an average of the defined measurement, "max" to compute a maximum value of the defined measurement, "min" to compute a minimum value of the defined measurement, and "sum" to compute a sum value of the defined measurement on which the aggregation will be performed though other mathematical types of aggregation may be defined in alternative embodiments.

A temporal aggregation maintains a specified number of time periods of data of the defined measurement. The XML schema below further defines a temporal aggregation.

```
<aggregationDefinition
aggregationType="temporal">
<aggregationTargetMeasurementId>
    insert-measurement-id
</aggregationTargetMeasurementId>
<aggregation Function>
    avg|max|min|sum
</aggregationFunction>
<!--beginning of temporal attributes-->
<aggregationValues
    temporalAggregationMethod="leading|trailing|list|range">
    <!--Additional options dependent temporalAggregationMethod-->
</aggregationValues>
<!--end of temporal attributes-->
</aggregationDefinition>
```

For temporal aggregations, an aggregation values definition is defined between the aggregationValues start and end tags. The aggregation values definition defines which values of the defined measurement are used in the temporal aggregation computation. The "temporalAggregationMethod" attribute defined between the aggregationValues start and end tags defines the method for selecting the values. The value for the temporalAggregationMethod attribute may be selected from leading, trailing, a list, or a range though other methods may be defined. The value "leading" defines an aggregation over a certain number of time periods just prior to and including a most recent time period. The value "trailing" defines an aggregation over a certain number of time periods starting with the oldest time period maintained. The value "list" defines a list of time periods over which to aggregate the defined measurement. The value "range" defines a range of time periods over which to aggregate the defined measurement.

The first two types of temporal aggregation, leading and trailing aggregation, have the same the XML schema as shown below.

```
<!--beginning of temporal attributes-->
<aggregationValues
temporalAggregationMethod="leading|trailing">
<aggregationIndexCount>
    insert-number-of-time-periods-to-index
</aggregationIndexCount>
</aggregationValues>
<!--end of temporal attributes-->
```

As a result, when the value for the temporalAggregationMethod attribute is selected as leading or trailing, an aggregation time period count is defined between the aggregationIndexCount start and end tags. The value defined for the aggregationIndexCount tags defines a number of time periods over which to perform the temporal aggregation. For example, for a leading temporal aggregation with the value associated with the aggregationIndexCount tags defined as "4", the four most recent time periods of data will be aggregated including the most recent time period of data. For a trailing temporal aggregation with the value associated with the aggregationIndexCount tag defined as "4", the four oldest time periods of data that have been maintained will be aggregated. If the output frequency is set to every 15 minutes, the data maintained over four time periods is an hour's worth of data. A leading temporal aggregation selects the most recent four time periods, and a trailing temporal aggregation selects the oldest four time periods.

The range type of temporal aggregation has the XML schema shown below.

```
<!--beginning of temporal attributes-->
<aggregationValues
temporalAggregationMethod="range">
<aggregationStartIndex>
    insert-time-period-to-start-index
</aggregationStartIndex>
<aggregationStopIndex>
    insert-time-period-to-stop-index
</aggregationStopIndex </aggregationValues>
<!--end of temporal attributes-->
```

As a result, when the value for the temporalAggregationMethod attribute is selected as range, an aggregation start period is defined between the aggregationStartIndex start and end tags, and an aggregation stop period is defined between the aggregationStopIndex start and end tags. The value defined for the aggregationStartIndex tags defines a start time period and the value defined for the aggregationStopindex tags defines a stop time period over which to perform the temporal aggregation.

The list type of temporal aggregation has the XML schema shown below.

```
<!--beginning of temporal attributes-->
<aggregationValues
temporalAggregationMethod="list">
<aggregationPointIndex>
    insert-time-period-to-be-included-in-aggregation
</aggregationPointIndex>
<!--end of temporal attributes-->
```

When the value for the temporalAggregationMethod attribute is selected as list, a time period list is defined by specifying each time period to use between a pair of aggregationPointIndex start and end tags. One or more aggregationPointIndex start and end tags may be defined to define a list of time periods. The value of each pair of aggregationPointIndex tags defines a time period to include in the aggregation. For example, the XML below selects the first, fifth, and ninth time periods to include in the aggregation for the raw measurement.

```
<!--beginning of temporal attributes-->
<aggregationValues
temporalAggregationMethod="list">
<aggregationPointIndex>1</aggregationPointIndex>
<aggregationPointIndex>5</aggregationPointIndex>
<aggregationPointIndex>9</aggregationPointIndex>
</aggregationValues>
<!--end of temporal attributes-->
```

All four types of temporal aggregation require the target measurement to maintain as many or more historical time periods than used by the temporal aggregation measurement as defined using the historicalMeasurementCount attribute for each defined measurement.

The XML below provides an example of temporal aggregation.

```
<measurement
    measurementType="aggregation"
    deviceType="ahu"
    measurementId="ahu_zohum_act_trl8"
    measurementIdLabel=" Average Zone Humidity - Trailing 8
    Periods"
    measurementDataType="double"
>
    <aggregationDefinition aggregationType="temporal">
        <aggregationTargetMeasurementId>
            ahu_zohum_act
        </aggregationTargetMeasurementId>
        <aggregationValues
            temporalAggregationMethod=" trailing" >
            <aggregationIndexCount>
                8
            </aggregationIndexCount>
        </aggregationValues>
        <aggregationFunction>avg</aggregationFunction>
    </aggregationDefinition>
</measurement>
```

The XML schema below defines a relational aggregation.
```
<aggregationDefinition
aggregationType="relational">
<aggregationTargetMeasurementId>
    insert-measurement-id
</aggregationTargetMeasurementId>
<aggregation Function>
    avg|max|min|sum
</aggregationFunction>
<!--beginning of relational attributes-->
<relationshipHeight>
    degree-of-separation-between-measurement-and-target
</relationshipHeight>
<aggregationHierarchy>
    hierarchy-across-which-aggregation-should-occur
</aggregationHierarchy>
<inclusive>
    true|false
</inclusive>
<!--end of relational attributes-->
</aggregationDefinition>
```

For relational aggregations, a degree of separation between the aggregated measurement and the measurement defined between the aggregationTargetMeasurementId start and end tags is defined between the relationshipHeight start and end tags. A value of one defined between the relationshipHeight start and end tags indicates the same level, which means that the device types are equal for the aggregated measurement and the defined measurement as defined in devices file 1018. Otherwise, the value defined between the relationshipHeight start and end tags is a difference between the level of the aggregated measurement and the level of the defined measurement. For example, assuming the device type of the aggregated measurement is "ahu" and the device type of the defined measurement is "fpb", when "ahu" is a parent of "fpb", the relationshipHeight is −1. In contrast, assuming the device type of the aggregated measurement is "ahu" and the device type of the defined measurement is "fpb", when "ahu" is a child of "fpb", the relationshipHeight is 1.

For relational aggregations, a hierarchy across which the aggregation is performed is defined between the aggregationHierarchy start and end tags. The hierarchy across which the aggregation is performed is defined in links file 1020. The defined hierarchy is used to determine the relationship height. If not specified between the aggregationHierarchy start and end tags, the hierarchy used is the default hierarchy defined by the defaultHierarchy attribute defined as part of the modelArea start tag.

For relational aggregations, an inclusive flag is defined between the inclusive start and end tags. The inclusive flag is used when the value of the degree of separation is one. When the value of the inclusive flag is true, the defined measurement is included in the aggregation. When the value of the inclusive flag is false, the defined measurement is not included in the aggregation.

An illustrative relational aggregation aggregates a defined measurement up a number of levels of the default hierarchy. The XML below provides an example of an illustrative relational aggregation.

```
<measurement
measurementType="aggregation"
deviceType="ahu"
measurementId="avg_fpb_occ_act"
measurementIdLabel="Occupancy (based on VAVs)"
>
    <aggregationDefinition
        aggregationType="relational">
        <aggregationTargetMeasurementId>
            fpb_occ_act
        </aggregationTargetMeasurementId>
        <aggregationFunction>avg</aggregationFunction>
        <!--beginning of relational attributes-->
        <relationshipHeight>-1</relationshipHeight>
        <!--end of relational attributes-->
    </aggregationDefinition>
</measurement>
```

When no aggregationHierarchy tags are included, the value defined for the default Hierarchy attribute defined by the modelArea start tag is used. The degree of separation is −1; therefore, ESPE 400 will summarize the fpb_occ_act measurement from a child level ("fpb") to a parent level ("ahu"), whose relationship is defined based on the hierarchies described in links file 1020 described further below. The relationship is based on the distance between the device types defined for the measurement from which the aggregation is computed and the aggregated measurement.

Figure 12:
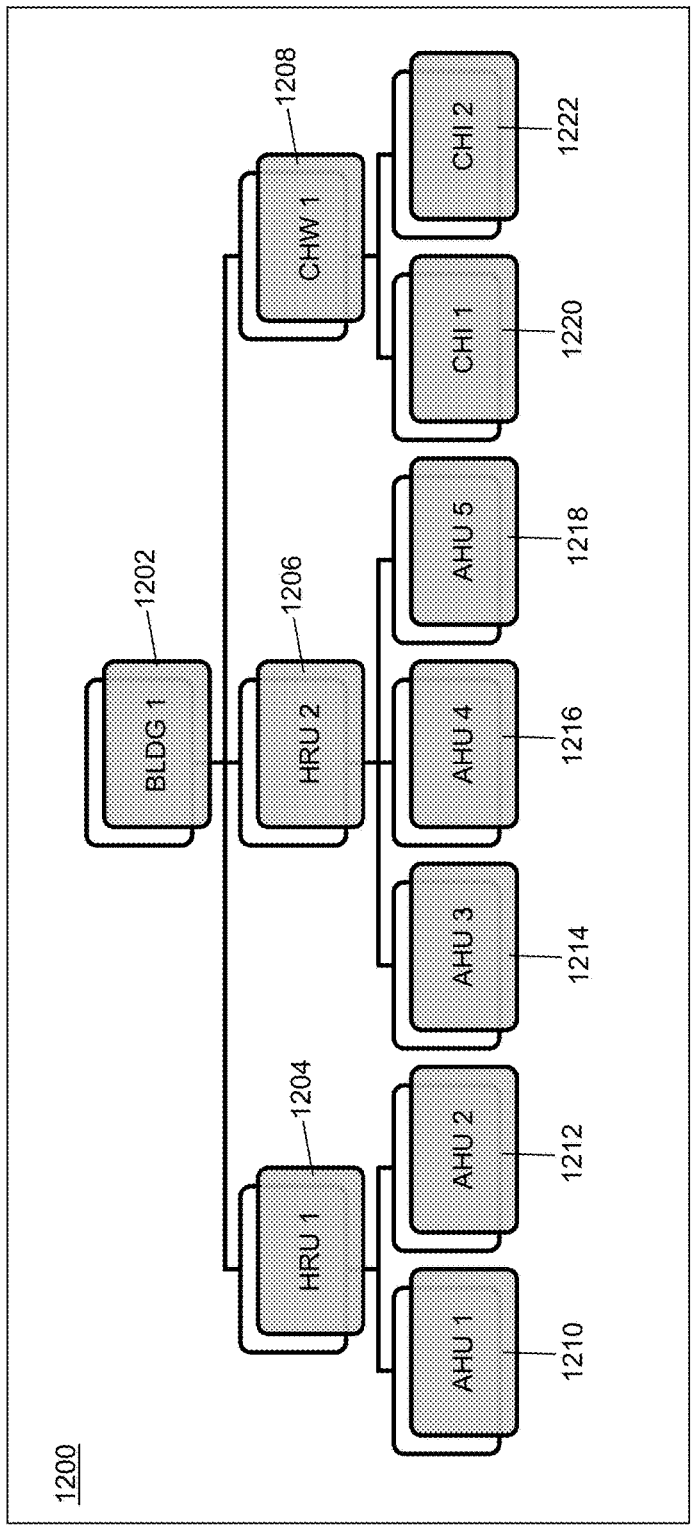
FIG. 12 depicts a system device hierarchy in accordance with an illustrative embodiment.

For illustration, FIG. 12 shows a graphical representation of linked devices that can be described in links file 1020 for a first hierarchy 1200. First hierarchy 1200 includes a root parent 1202, for example, having the device type "bldg" and the unique device ID "bldg 1". Root parent 1202 has a first child device 1204, a second child device 1206, and a third child device 1208. First child device 1204 has a first child device 1210 and a second child device 1212. Second child device 1206 has a first child device 1214, a second child device 1216, and a third child device 1218. Third child device 1208 has a first child device 1220 and a second child device 1222. For illustration, Table I below provides links file 1020 entries for first hierarchy 1200.

TABLE I

| Hierarchy name | Parent device type | Parent unique device ID | Child device type | Child unique device ID |
|---|---|---|---|---|
| bldg | bldg | bldg1 | hru | hru1 |
| bldg | bldg | bldg1 | hru | hru2 |
| bldg | bldg | bldg1 | chw | chw1 |
| bldg | hru | hru1 | ahu | ahu1 |
| bldg | hru | hru1 | ahu | ahu2 |
| bldg | hru | hru2 | ahu | ahu3 |
| bldg | hru | hru2 | ahu | ahu4 |
| bldg | hru | hru2 | ahu | ahu5 |
| bldg | chw | chw1 | chi | chi1 |
| bldg | chw | chw1 | chi | chi1 |

In an alternative embodiment, first hierarchy 1200 could be divided into a plurality of hierarchies based on the parent-child relationships defined in links file 1020. For example, first hierarchy 1200 could include two hierarchies that share a common device, bldg.

As shown in FIG. 12, the air handlers (ahu) are children of the heat recovery units (hru) meaning that ahu is one level below hru. Therefore, if a defined measurement having the device type "ahu" were to be relationally aggregated to the hru device type level, the degree of separation would be −1. The air handlers are also two levels below the building (bldg) device type level. Therefore, if an ahu measurement were to be aggregated to the bldg level, the degree of separation would be −2. These two examples result in negative relationship heights because a lower level is being aggregated to a higher level.

When aggregating across the hierarchy, the degree of separation is positive. The degree of separation signifies both how far up the hierarchy to walk and how far to walk back down to aggregate. A positive number represents how many levels up the hierarchy the aggregation should occur meaning that it summarizes all of the devices the same number of levels down. The XML below provides an example of a positive degree of separation.

```
<measurement
measurementType="aggregation"
deviceType="ahu"
measurementId="avg_ahu_sply_fan_kwh_excl"
measurementIdLabel="Avg Supply Fan kW-Exclusive"
>
   <aggregationDefinition aggregationType="relational">
      <aggregationTargetMeasurementId>
         ahu_sply_fan_kwh
      </aggregationTargetMeasurementId>
      <aggregationFunction>avg</aggregationFunction>
      <!--beginning of relational attributes-->
      <relationshipHeight>1</relationshipHeight>
      <inclusive>false</inclusive>
      <!--end of relational attributes-->
   </aggregationDefinition>
</measurement>
```

Referring again FIG. 12, the aggregation will walk one level up the air hierarchy (the default hierarchy in this case) to the hru level and summarize the air handlers below it. If AHU 1 (first child device 1210 of first child device 1204 of root parent 1202) is the device of interest, the aggregation will walk up to HRU 1 (first child device 1204 of root parent 1202) and average the ahu_sply_fan_kwh"s of AHU 2 (second child device 1212 of first child device 1204 of root parent 1202) because it is one level below HRU 1 in the air hierarchy. AHU 1 is not included in the average because the inclusive flag is set to false meaning that the device of interest is not included in the average computation. If AHU 3 is the device of interest, the first example will return the average of the ahu_sply_fan_kwh"s of AHU 4 (second child device 1216 of second child device 1206 of root parent 1202) and AHU 5 (third child device 1218 of second child device 1206 of root parent 1202) as they are one level below HRU 2 (second child device 1206 of root parent 1202), which is one level above AHU 3. AHU 3 is not included in the average because the inclusive flag is set to false meaning that the device of interest is not included in the average computation. The aggregated measurement, avg_ahu_sply_fan_kwh_excl, will have the same device type as the device of interest, one of the AHU"s in this example.

When the value defined for the relationshipHeight tags is positive, the aggregation is across measurements that are on the same level as the device type of the aggregated measurement. Use of a negative value for the relationshipHeight tags may be a more efficient use of computer processing time by aggregating a higher level and letting that value repeat for all devices.

The fifth type of measurement is the calculation measurement. The XML schema below describes calculation measurements.

```
<!--CALCULATION MEASUREMENTS-->
<measurement
measurementType="calculation"
deviceType="insert-device-type-of-calculation-measurement"
measurementId="insert-calculation-measurement-id"
measurementIdLabel="insert-measurement-label-for-visualization"
measurementDataType="double|char"
<!beginning of optional attributes within the measurements tag>
acceptableMin="insert-minimum-acceptable-value"
acceptableMax="insert-maximum-acceptable-value"
retain="true|false"
retainForScoring="true|false"
retainForAlerting="true|false"
ruleAlertType="insert-alert-type"
ruleAlertSubtype="insert-alert-subtype"
ruleAlertOutputThreshold="insert-alert-threshold"
ruleAlertPlusDesc="insert-alert-plus-description"
ruleAlertMinusDesc="insert-alert-minus-description"
<!end of optional attributes within the measurements tag>
>
   <calculationOrder>insert-position-in-order</calculationOrder>
</measurement>
```

Additional computed measurements can be calculated using the "calculation" measurement type using existing raw, transform, lag, aggregate, and/or calculation measurements. The calculation measurement further includes six additional attributes defined between the measurement start and end tags. The retain attribute value defines a retain flag that indicates whether the calculation is retained in memory for a subsequent calculation measurement computation. A calculation measurement can be used to apply a business rule or alert using the ruleAlert . . . attributes. The "ruleAlertType" attribute defines an alert type used to group together similar types of alerts. The "ruleAlertSubtype" attribute defines an alert subtype that is a more specific alert type used to group more specific types of alerts together. The "ruleAlertOutputThreshold" attribute defines a number of consecutive time periods that the computed calculation measurement value is either "+" or "−". After the number of consecutive time periods has elapsed with the same value of either "+" or "−", the associated alert message is created. The "ruleAlertPlusDesc" attribute defines an alert message when the value computed for the calculation measurement is "+". The "ruleAlertMinusDesc" attribute defines an alert message when the value computed for the calculation measurement is "−".

A calculation order is defined between the calculationOrder start and end tags. The calculation order value defines an order in which the calculated measurements is performed. The calculation order supports creation of measurements that are dependent on other calculated measurements. If a calculated measurement is dependent on a previous calculated measurement, that calculated measurement should have a calculation order value greater than the previous calculated measurement. No two calculation measurements can have the same position in the calculation order.

A calculate code file named by the value defined for the measurementId attribute is included in calculate code files 1030 that contains the code to create the calculation measurement. The template below is used for each calculate code file of the calculate code files 1030.

```
/*********/
*VARNAME:    insert_calculated_measurement_measurementId;
*VARTYPE: NUM/8|CHR/insert_length;
*REQUIRED MEASUREMENTS: insert_measurement_required_for_calculation;
/*********/
/*BEGIN CODE*/
    insert_logic_to_define_calculation
/*END CODE*/
```

The "Varname" value matches the name of the file and the value defined by the associated measurementId attribute for the calculation measurement. The "Vartype" value defines the data type and length of the calculation measurement. The data type can either be NUM or CHR. The length of the NUM is 8, but the length of the CHR can vary and is specified by the insert_length value. Other data types and lengths may be used in alternative embodiments. The "Required Measurements" value defines the measurements that are used to calculate the calculation measurement. When there are multiple required measurements, the measurementId of each required measurement is included in a list separated by spaces. The code to accomplish the calculation replaces "insert_logic_to_define_calculation".

The XML below provides example calculation measurements.

```
<!--CALCULATION MEASUREMENTS-->
<measurement
measurementType="calculation"
deviceType="ahu"
measurementId="ahu_type"
measurementIdLabel="Air Handler Type"
measurementDataType="char"
retainForAlerting="true"
>
<calculationOrder>1</calculationOrder>
</measurement>
<measurement
measurementType="calculation"
deviceType="ahu"
measurementId="weekday"
measurementIdLabel="Weekday Indicator"
measurementDataType="double"
>
<calculationOrder>2</calculationOrder>
</measurement>
<measurement
measurementType="calculation"
deviceType="ahu"
measurementId="holiday"
measurementIdLabel="Holiday Indicator"
measurementDataType="double"
>
<calculationOrder>3</calculationOrder>
</measurement>
<measurement
measurementType="calculation"
deviceType="ahu"
measurementId="workhours"
measurementIdLabel="Workhours Indicator"
measurementDataType="double"
>
<calculationOrder>4</calculationOrder>
</measurement>
<measurement
measurementType="calculation"
deviceType="ahu"
measurementId="ahu_std_cmftalert"
measurementIdLabel="Outside Standard of Comfort Alert"
measurementDataType="char"
ruleAlertType="Comfort"
ruleAlertSubtype="Outside Standard of Comfort"
ruleAlertOutputThreshold="8"
ruleAlertPlusDesc="Avg zone temp setpoint has been outside standard of comfort for 2 hours"
ruleAlertMinusDesc="Avg zone temp setpoint has been outside standard of comfort for 2 hours"
>
<calculationOrder>5</calculationOrder>
</measurement>
```

The first example calculation measurement determines an air handler type and is performed first. A code file named "ahu_type" is included in calculate code files 1030. An illustrative code file named "ahu_type" is shown below to determine the air handler type.

```
/*********/
* VARNAME    : AHU_TYPE;
* VARTYPE    : CHR/15;
* REQUIRED MEASUREMENTS : ;
/*********/
/* BEGIN CODE */
if locationGuid='first_location_GUID_inserted' then do;
    if level_2 in ('AH_1C' 'AH_1D' 'AH_1F' 'AH_G' 'AH_GA' 'AH_GB' 'AH_GG') then
        ahu_type = 'Single Zone';
    else
        ahu_type = 'Multi Zone';
    end;
else if locationGuid='second_location_GUID_inserted' then do;
    ahu_type = 'Multi Zone';
    end;
```

-continued

```
  else do;
    ahu_type='Unknown';
  end;
/* END CODE */
```

The first example calculation measurement can be performed anywhere in the calculation order as long as it is before any calculation measurement that uses the ahu-type value because it does not require any measurement value. Instead, it uses attribute values defined for the locationGuid and the second level of the labels definition defined as level_2. The value defined by the measurementId attribute is defined in the calculation code.

The second example calculation creates a Holiday Indicator, which is a basic indicator for whether or not the day is a holiday. The Holiday Indicator is created using the date, which already exists in the event stream automatically as part of the event object. Therefore, it can be listed in any position in the calculation order. In this example, it is second in the calculation order.

The third example calculation creates a Weekday Indicator, which is a basic indicator for whether or not the day is a weekday. The Weekday Indicator is created using the date, which again already exists in the event stream. Therefore, it can be listed in any position in the calculation order. In this example, it is third in the calculation order.

The fourth example calculation measurement creates a Workhours Indicator, which is a basic indicator of whether or not the time period is during work hours. To determine this characteristic, whether or not the date is a weekday and/or holiday is determined first. Therefore, creation of the Weekday Indicator is dependent on both the weekday calculation and the holiday calculation and has a position later in the calculation order than both the weekday calculation and the holiday calculation. In this example, it is fourth in the calculation order.

A code file named "workhours" is included in calculate code files 1030. An illustrative code file named "workhours" is shown below to create a "workhours" calculation measurement from the "weekday" and "holiday" measurements that already exist because they were defined as having a lower calculation order value.

```
/*********/
*VARNAME: workhours;
*VARTYPE: NUM/8,
*REQUIRED MEASUREMENTS: weekday holiday;
/*********/
/*BEGIN CODE*/
  workhours=0;
  if (weekday=1 and holiday=0) and (hour(timepart(msr_dttm)) ge 6 and hour(timepart(msr_dttm)) le 18) then workhours=1;
/*END CODE*/
```

In the example, the "workhours" measurement has a binary value, which is classified as a numeric in the vartype. Calculate code files 1030, which may refer to one or more calculate code files will includes a file named "workhours" that includes the recited code. The variable msr_dttm is a date time variable value that is automatically created for an event by ESPE 400.

The fifth example calculation measurement creates a comfort alert. A code file named "ahu_std_cmfrt_alert" is included in calculate code files 1030. An illustrative code file named "ahu_std_cmfrt_alert" is shown below to create a comfort alert.

```
/*********/
* VARNAME    : AHU_STD_CMFRT_ALERT;
* VARTYPE    : CHR/1;
* REQUIRED POINTS : ahu_occ_act_modified avg_fpb_zot_act
  avg_fpb_zot_sp_act workhours;
/*********/
/* BEGIN CODE */
ahu_std_cmfrt_alert=' ';
if missing(avg_fpb_zot_act) then do;
  if missing(ahu_occ_act_modified) then do;
    if ahu_occ_act_modified=1 then do;
      if avg_fpb_zot_sp_act lt 71 then ahu_std_cmfrt_alert='-';
      else if avg_fpb_zot_sp_act gt 75 then ahu_std_cmfrt_alert='+';
      else ahu_std_cmfrt_alert='';
    end;
    else if ahu_occ_act_modified=0 then do;
      if avg_fpb_zot_sp_act lt 62 then ahu_std_cmfrt_alert ='-';
      else if avg_fpb_zot_sp_act gt 83 then ahu_std_cmfrt_alert ='+';
      else ahu_std_cmfrt_alert='';
    end;
  end;
  else if workhours=1 then do;
    if avg_fpb_zot_sp_act lt 71 then ahu_std_cmfrt_alert='-';
    else if avg_fpb_zot_sp_act gt 75 then ahu_std_cmfrt_alert='+';
    else ahu_std_cmfrt_alert='';
  end;
  else if workhours=0 then do;
    if avg_fpb_zot_sp_act lt 62 then ahu_std_cmfrt_alert ='-';
    else if avg_fpb_zot_sp_act gt 83 then ahu_std_cmfrt_alert ='+';
    else ahu_std_cmfrt_alert='';
  end;
  else ahu_std_cmfrt_alert='';
end;
/* END CODE */
```

In the example, the "ahu_std_cmfrt_alert" calculation measurement is a single character value that indicates "−", "+", or " ". Computation of the "ahu_std_cmfrt_alert" calculation measurement requires existing measurements for ahu_occ_act_modified, avg_fpb_zot_act, and avg_fpb_zot_sp_act that have been defined between a previous pair of measurement start and end tags.

Analytic models are defined between the "analyticalModels" start and end tags and include information about any analytic model and the score code associated with the analytic model included in model code files 1032. Each measurement can be associated with a variable that is created to store the associated measurement values when ESPE 400 is executing on streamed data.

Zero or more analytic models may be defined within the analyticalModels start and end tags. The XML schema below describes parameters used to define an illustrative analytic model.

```
<!--ANALYTIC MODELS-->
<analyticalModels>
<analyticalModel
   analyticalModelMethodology="insert_model_methodology"
   analyticalModelType="insert_model_type"
   modelOutputMeasurementId=
      "insert_output_id_for_measurement"
   modelOutputMeasurementIdLabel=
      "insert_label_for_measurement"
   analyticalModelName="insert_name_for_model"
>
<!--ANALYTIC MODEL MEASUREMENTS INFORMATION-->
<!--ANALYTIC MODEL TYPE INFORMATION-->
  <!--ANALYTIC MODEL ALERTS INFORMATION-->
</analyticalModel>
</analyticalModels>
```

Each analytic model definition is defined between a pair of analyticalModel start and end tags. Each analytic model definition includes an "analyticalModelMethodology" attribute, an "analyticalModelType" attribute, n "modelOutputMeasurementId" attribute, a "modelOutputMeasurementIdLabel" attribute, and an "analyticalModelName" attribute associated with the analyticalModel start tag. The value of the analyticalModelMethodology attribute defines a methodology. For example, the value of the analyticalModelMethodology attribute may be selected from "predictive", "forecast", "classification", "optimize", etc. The value of the analyticalModelType attribute defines an analytic model type that may be selectable based on the model methodology. For example, for a predictive model methodology, the value of the analyticalModelType attribute may be selected from "NNET", "Gradient Boost", "Decision Tree", "Random Forest", etc. NNET may refer to a neural network model type. Gradient Boost may refer to a gradient boosting model type. Decision Tree may refer to a decision tree model type. Random Forest may refer to a random forest model type.

The value of the modelOutputMeasurementId attribute defines a measurementId for the model outputs. The value defined for the modelOutputMeasurementId attribute may be the same as a measurementId of a target variable of the analytic model. Specifying different modelOutputMeasurementId's allows specification of two different models for the same target variable for different analytical models by defining two different model code files. Prefixes for predictions (P_), standard error (S_), etc. will be prepended to the value of the modelOutputMeasurementId attribute.

The value of the modelOutputMeasurementIdLabel attribute defines a label for the output measurement that can be used in visualization tools to provide more readable information. "Prediction" or other identifier will automatically be added to the labels when processed through ESPE 400. The value of the analyticModelName attribute defines a name to differentiate models with the same target measurementId's.

The XML below defines an illustrative neural network analytic model.

```
<!--ANALYTIC MODELS
<analyticalModels>
<analyticalModel
    analyticalModelMethodology="predictive"
    analyticalModelType="NNET"
    modelOutputMeasurementId="ahu_sply_fan_kw"
    modelOutputMeasurementIdLabel="Supply Fan kW"
    analyticalModelName="ahu_sply_fan_kw"
>
<!--ANALYTIC MODEL MEASUREMENTS INFORMATION-->
<!--ANALYTIC MODEL STRUCTURE INFORMATION-->
<!--ANALYTIC MODEL ALERTS INFORMATION-->
</analyticalModel>
</analyticalModels>
```

The values defined for the analyticalModelName attribute and the value defined for the modelOutputMeasurementId attribute can be either the same or different. If there is only one model for a target variable, these may be the same as the target measurementId. The values for the modelOutputMeasurementId attribute help differentiate the names of the model outputs.

Each analytic model definition further includes a measurements definition that includes information about the target and input variables that are used by the model. The XML schema below defines the analytic model measurements definition defined between the analyticalModelMeasurements start and end tags.

```
<!--ANALYTIC MODEL MEASUREMENTS INFORMATION-->
<analyticalModelMeasurements>
<analyticalModelMeasurement
    modelMeasurementRole="target|input"
    modelMeasurementType="interval|nominal">
    insert_measurementId
</analyticalModelMeasurement>
</analyticalModelMeasurements>
```

One or more pairs of analyticalModelMeasurement start and end tags are defined for the measurements definition of the analytic model. There is no limit to the number of measurements that can be used in a model. Each analyticalModelMeasurement start tag includes a modelMeasurementRole attribute and a modelMeasurementType attribute. The modelMeasurementRole attribute is either target or input and describes the role of the measurement in the analytic model. A target is a dependent variable of the model. An input is an independent variable of the model. The modelMeasurementType attribute is either interval or nominal and describes a data type of the measurement, which can be either interval (numeric) or nominal (categorical). Each analyticalModelMeasurement also includes a measurementId attribute defined between each pair of analyticalModelMeasurement start and end tags. The value defined for the measurementId attribute matches a measurementId attribute of a measurement defined between a pair of measurement start and end tags. Any type of measurement may be referenced. The XML below defines a model with three variables (measurements).

```
<!--ANALYTIC MODEL MEASUREMENTS INFORMATION-->
<analyticalModelMeasurements>
<analyticalModelMeasurement
    modelMeasurementRole="target"
    modelMeasurementType="interval"
>
    ahu_sply_fan_kw
</analyticalModelMeasurement>
    modelMeasurementRole="input"
    modelMeasurementType="interval"
>
    wth_tempf
</analyticalModelMeasurement>
    modelMeasurementRole="input"
    modelMeasurementType="nominal"
>
    workhours
</analyticalModelMeasurement>
</analyticalModelMeasurements>
```

The first measurement is the target variable, ahu_sply_fan_kw, of type interval that is a raw measurement. The second measurement is an input variable, wth_tempf, of type interval that is a raw measurement. The third measurement is an input variable, workhours, of type nominal that is a calculation measurement. As defined above, the workhours calculation measurement is binary. As a result, the workhours calculation measurement could be used as either a nominal or an interval measurement type. The modelMeasurementType attribute provides flexibility in defining each variable as appropriate for the analytic model.

Each analytic model definition further includes an analytic model structure definition that includes information about the structure of the model such as the number of hidden layers in a neural network. The analytic model structure definition includes different tags based on the value of the analyticalModelType tag. For illustration, the XML schema below defines the analytic model structure definition defined between the neuralNetworkModel start and end tags because a neural network analytic model type was selected.

```
<!--ANALYTIC MODEL STRUCTURE INFORMATION-->
  <neuralNetworkModel nnetArchitecture="mlp direct">
    <neuralNetworkHiddenLayers>
      <neuralNetworkHiddenLayer
        hiddenDeviceCount="insert_number_of_devices">
        insert_sequential_layer_number
      </neuralNetworkHiddenLayer>
    </neuralNetworkHiddenLayers>
  </neuralNetworkModel>
```

The "nnetArchitecture" attribute of the neuralNetworkModel start tag describes the architecture of the neural network and may be selected as mlp direct, mlp, or glim though other alternatives may be defined. For illustration, the neural network model may be implemented using the NNET Procedure implemented using SAS® Visual Data Mining and Machine Learning Procedures developed and provided by SAS Institute Inc. of Cary, N.C., USA. The attributes and options to define for the analytic model may be based on those described for the NNET Procedure. Similarly, other types of analytic model attributes may be based on corresponding procedures defined in SAS® Visual Data Mining and Machine Learning Procedures such as the FOREST Procedure for implementation of a random forest analytic model, the GRADBOOST Procedure for implementation of a gradient boosting analytic model, etc.

For the neural network, each hidden layer used by the analytic model is defined between a pair of neuralNetworkHiddenLayers start and end tags. There is no limit to the number of hidden layers. Each pair of neuralNetworkHiddenLayers start and end tags includes a pair of neuralNetworkHiddenLayer start and end tags. The "hiddenDeviceCount" attribute is associated with the neuralNetworkHiddenLayer start tag and defines a number of devices used by the hidden layer. A layer number, which should increase sequentially, is defined between the neuralNetworkHiddenLayer start and end tags.

The XML below describes two hidden layers of a neural network analytic model.

```
<!--ANALYTIC MODEL STRUCTURE INFORMATION-->
  <neuralNetworkModel nnetArchitecture="mlp direct">
    <neuralNetworkHiddenLayers>
      <neuralNetworkHiddenLayer hiddenDeviceCount="10">
        1</neuralNetworkHiddenLayer>
      <neuralNetworkHiddenLayer hiddenDeviceCount="15">
        2</neuralNetworkHiddenLayer>
    </neuralNetworkHiddenLayers>
  </neuralNetworkModel>
```

Each analytic model definition further includes an analytic model alerts definition that includes information about alerts generated by the model. The XML schema below defines the analytic model alerts definition defined between the neuralNetworkModel start and end tags because a neural network analytic model type was selected.

```
<!--ANALYTIC MODEL STRUCTURE INFORMATION-->
  <analyticalModelAlerts>
    <analyticalModelAlert
      modelAlertType="type_of_model_alert"
      modelAlertSubType="subtype_of_model_alert"
      modelAlertLimitType="limit_type_of_model_alert"
    >
      <analyticalModelAlertValue
        modelAlertValueType="low|high|consecutive">
        insert_distance_until_error
      </analyticalModelAlertValue>
    </analyticalModelAlert>
  </analyticalModelAlerts>
```

Each of one or more alert definitions is defined between a pair of analyticalModelAlert start and end tags. There is no limit to the number of alert definitions. The "modelAlertType" attribute of the analyticalModelAlert start tag defines an alert type used to group together similar types of alerts. The "modelAlertSubType" attribute of the analyticalModelAlert start tag defines an alert subtype that is a more specific alert type used to group more specific types of alerts together. The "modelAlertLimitType" attribute of the analyticalModelAlert start tag defines the metric used to test the limits. For illustration the value of the "modelAlertLimitType" attribute may be "SE" to indicate standard error though other metrics may be specified.

Each pair of analyticalModelAlert start and end tags includes one or more pairs of analyticalModelAlertValue start and end tags that define when the alert is triggered and an alert value defined between the pair of analyticalModelAlert start and end tags. The alert value is a number at which an alert may occur and can refer to a distance (i.e. 2 standard deviations away) or a number of time periods (i.e. 4 consecutive time periods). The "modelAlertValueType" attribute is associated with the analyticalModelAlertValue start tag and defines a type of alert trigger that may be selected from "low", "high", or "consecutive" though other types of alert trigger may be specified. Low or high indicates a direction on which the alert should occur. Low and high refer to the lower and upper bounds, where the bound is based on the alert value. Consecutive refers to the number of consecutive time periods the model prediction is out of bounds (defined by low and high) before the alert will be thrown. Low and/or high must be defined to use consecutive. The combination of the one or more alert triggers is used to determine when an alert is triggered.

The XML below describes an illustrative alert definition.

```
<analyticalModelAlerts>
  <analyticalModelAlert
    modelAlertType="Energy Use"
    modelAlertSubType="Supply Fan"
    modelAlertLimitType="SE"
  >
    <analyticalModelAlertValue
      modelAlertValueType="low">
      2
    </analyticalModelAlertValue>
    <analyticalModelAlertValue
      modelAlertValueType="high">
      2
    </analyticalModelAlertValue>
    <analyticalModelAlertValue
      modelAlertValueType="consecutive">
      4
    </analyticalModelAlertValue>
  </analyticalModelAlert>
</analyticalModelAlerts>
```

Since both low and high have modelAlertValue's of two, the lower and upper bound are both two standard errors away. However, a consecutive modelAlertValueType is also indicated. Therefore, the prediction has to be more than 2 standard errors away from the actual value for four consecutive time periods before an alert is triggered based on the illustrative alert definition.

In an operation 1106, a configuration dataset is created from the values read from data processing configuration file 1014. The configuration dataset organizes the provided data into tables for access when creating data processing model 714. For example, the configuration dataset is created by joining the XML configuration information into a single source table. Subsequent processing can query the configuration dataset for specific information.

In an operation 1108, default values are defined for values for which a value is required but was not defined from data processing configuration file 1014.

In an operation 1110, hierarchy and validity window information is updated for transform measurements assuming that the transformed measurements have the same hierarchy and validity window as the associated raw measurement, if defined.

In an operation 1112, hierarchy information is updated for lag measurements assuming that the lagged measurements have the same hierarchy as the associated raw measurement or the associated transformed measurement, if defined.

Figure 13:
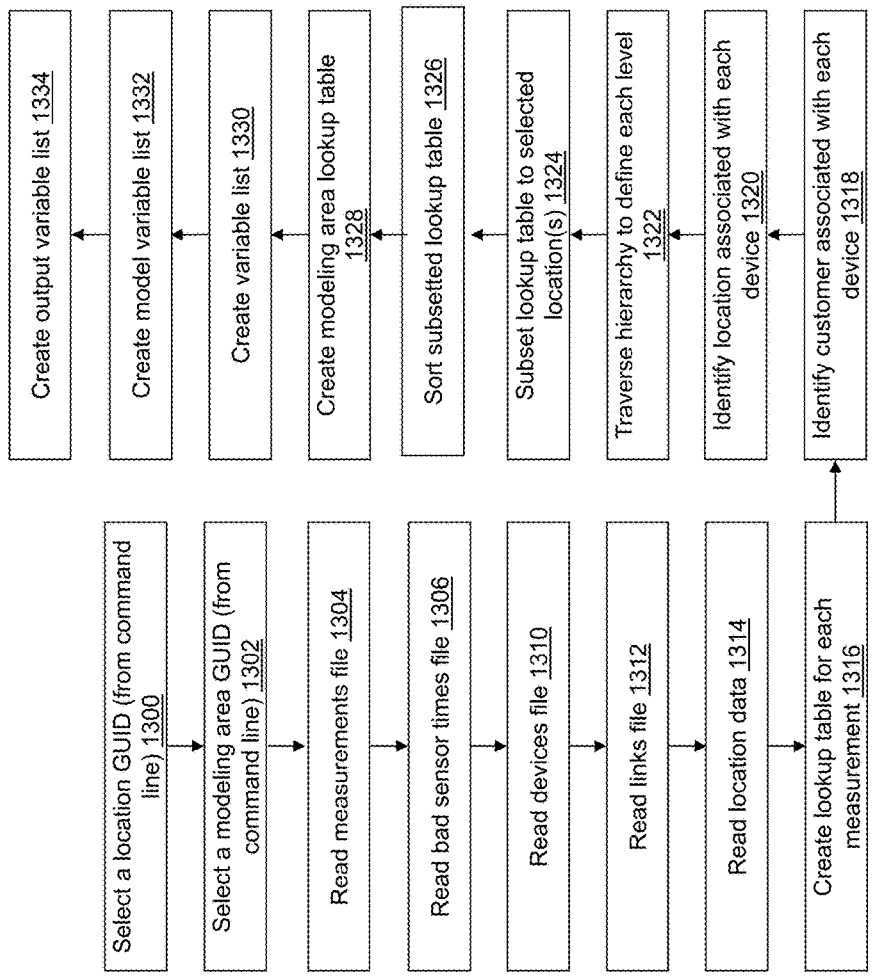
FIG. 13 depicts a flow diagram illustrating additional examples of operations performed by the data processing model development device of FIG. 10 in accordance with an illustrative embodiment.

In an operation 1114, a mapping dataset is created. For illustration, referring to FIG. 13, example operations associated with creating the mapping dataset are described. Additional, fewer, or different operations may be performed depending on the embodiment. The order of presentation of the operations of FIG. 13 is not intended to be limiting.

In an operation 1300, a location GUID is selected from the one or more location definitions defined in data processing configuration file 1014.

In an operation 1302, a modeling area GUID is selected from the one or more modeling areas defined for the selected location GUID in data processing configuration file 1014.

In an operation 1304, measurements file 1016 is read. For illustration, each row in measurements file 1016 defines a unique sensor measurement and device to which it belongs. For illustration, each row includes a unique device ID, a measurement ID, and a measurement label. For example, the unique device ID may identify a device type and its location. In some cases, only the measurement ID will be received in an event record by ESPE 400 when data processing model 714 is used while in others both the measurement ID and the unique device ID will be received in an event record. If only the measurement ID will be received, the measurement ID contains information that uniquely identifies the measurement as associated with both a device and a sensor measurement. Whether both the measurement type and the device type or the measurement type are received may be defined at the measurement level such that some entries of measurements file 1016 will include a unique device ID and a measurement ID while others include a device ID and a unique measurement ID.

The unique measurement ID is used as a key to lookup measurement information about the device and the measurement when only the measurement ID will be received. When both the measurement ID and the unique device ID will be received, both are used as a combined key to lookup measurement information about the device. The measurement ID may not be unique, but the combination of the unique device ID and the measurement ID together is unique.

The measurement label may be a character string that describes the measurement. Preferably, the measurement label is defined consistently across all devices. For example, an air handler fan speed should not be described in different ways such as by ahu_fan_spd, by ahu_fan_speed, and by ahufnspd in measurements file 1016. If so, model development application 1012 will not recognize that these all reference the same type of measurement. The air handler fan speed should instead be consistently represented such as using ahu_fan_spd for the measurement label. Automated systems can be used to define the measurement ID and the device ID to uniquely identify a measurement of a device either using one or both values. For example, the measurement ID and the device ID to uniquely identify a sensor measurement of a device.

In an operation 1306, bad sensor times file 1022 is read. For illustration, each row in bad sensor times file 1022 defines a unique device ID, a measurement ID, a useable start date, and a useable stop date. Each row in bad sensor times file 1022 defines start and/or end dates during which each listed sensor measurement is considered useable. Validity times file 1022 may be used when a sensor is only useable for a period of time. One or both of the useable start date and the useable stop date may be defined for zero or more raw measurements uniquely identified using the unique device ID and the measurement ID. When no useable start date is defined, the useable stop date defines the date after which the raw measurement become unusable in the event stream. When no useable stop date is defined, the useable start date defines the date on which the raw measurement become useable in the event stream. Otherwise, the useable start date and the useable stop date define the time window within which the raw measurement is useable in the event stream. For raw measurements not identified in bad sensor times file 1022, the raw measurement is considered to always be useable from the event stream. Times could be specified in addition to dates. The useable times may be used to exclude measurement readings when sensors are known to be inoperative, producing incorrect readings, being replaced, gone bad, need recalibration, etc.

In an operation 1310, devices file 1018 is read. For illustration, each row in devices file 1018 defines a device. Devices file 1018 defines information about the device using a device type, the unique device ID, and a device label. The device type is an abbreviation for the device type such as ahu for an air handler unit. Each unique device ID included in devices file 1018 will match a unique device ID included in measurements file 1016. The device label is a ready-for-display device ID. The device type should be the same across like devices because it is used to group devices and add context to the devices both with labels and links to other devices.

In an operation 1312, links file 1020 is read. For illustration, each row in links file 1020 defines how devices are connected. Links file 1020 defines a series of parent-child relationships. From measurements file 1016, information about all of the sensors that exist in a system is described. From devices file 1018, information about all of the devices that exist in the system is described. Links file 1020 describes how the devices that include sensors that generate measurements are related to one another so that information from the system as a whole can be determined as discussed further below.

Links file 1020 includes a hierarchy name, a parent device type, a parent unique device ID, a child device type, and a child unique device ID. The system may include a plurality of hierarchies of devices. The hierarchy name is a description of the associated hierarchy. For example, in an environmental system there may be an air hierarchy, a power hierarchy, a physical hierarchy, etc. Respective hierarchy names could be "air", "power" and "physical". The parent device type and the parent unique device ID match the device type and the unique device ID of a first device in devices file 1018. The child device type and the child unique device ID match the device type and the unique device ID of a second device in devices file 1018. The first device is the parent and the second device is the child to form a parent-child relationship between the first device and the second device.

Each record included in links file 1020 contains a unique combination of first and second devices. Each first (parent) device can have one or more second (child) devices in the same or different hierarchies. Additionally, each second (child) device can have one or more first (parent) devices in different hierarchies. Each second (child) device has a single first (parent) device when included in the same hierarchy.

In an operation 1314, location data file 1024 may be read. For illustration, each row in location data file 1024 defines a customer GUID, a location GUID, a latitude, and a longitude. The latitude and the longitude define the geographic location of each location defined in data processing configuration file 1014, for example, for use in defining characteristics such as a local temperature, a local humidity, etc. using the geographic location.

In an operation 1316, a lookup table may be created for each measurement defined in measurements file 1016 that also includes the associated information from devices file 1018, links file 1020, and bad sensor times file 1022.

In an operation 1318, a customer GUID associated with each device type may be identified and added to the created lookup table using the created configuration dataset.

In an operation 1320, a location GUID associated with each device type may be identified and added to the created lookup table where "ALL" is replaced with the actual locations that exist for the customer GUID using the created configuration dataset.

In an operation 1322, the hierarchy may be traversed to define each level defined between the labels start and end tags of data processing configuration file 1014 using the created configuration dataset.

In an operation 1324, the created lookup table may be divided into subsets based on the location(s) selected in data processing configuration file 1014.

In an operation 1326, the subsetted lookup table may be sorted by the customer GUID, the location GUID, the device type, and the measurement ID.

In an operation 1328, a modeling area lookup table may be created using the created configuration dataset and added to the lookup table.

In an operation 1330, a variable list that includes each raw, transform, lag, aggregation, and calculation measurement may be created. A plurality of variable lists may be created. For example, a list of raw measurements may be included in a raw variable list, a list of transform measurements may be included in a transform variable list, a list of lag measurements may be included in a lag variable list, a list of aggregation measurements may be included in an aggregation variable list, a list of calculation measurements may be included in a calculation variable list, a list of alert measurements that include the value for the retainForAlerting attribute as true may be included in an alert variable list, etc. The variable list(s) may be indexed by modeling area ID.

In an operation 1332, a model variable list that includes each raw, transform, lag, aggregation, and calculation measurement used by a respective analytic model and the respective analytic model output may be created for each analytic model. The model variable measurements that include the value for the retainForScoring attribute as true may be included in the model variable list. A plurality of model variable lists may be created. For example, a model variable list may be created for each analytic model defined in the created configuration dataset from data processing configuration file 1014. Additionally or in the alternative, a model alert variable list may be created for each analytic model that includes alerting as defined in the created configuration dataset from data processing configuration file 1014. The model variable list(s) may be indexed by modeling area ID.

In an operation 1334, an output variable may be created. The output variable list may include each variable from the other created lists. A plurality of output variable lists may be created. For example, an output variable list may be created for each analytic model defined in the created configuration dataset from data processing configuration file 1014. The output variable list(s) may be indexed by modeling area ID.

The mapping dataset includes the subsetted lookup table, the modeling area lookup table, the variable list(s), the model variable list(s), and the output variable list(s), etc. The mapping dataset joins information from data processing configuration file 1014, measurements file 1016, devices file 1018, links file 1020, bad sensor times file 1022, location data file 1024 into a source table so that subsequent processing can query the mapping dataset for specific information.

Referring again to FIG. 11, in an operation 1116, a templates dataset is created by reading code template files 1026 into memory to define a rename template dataset, a subset template dataset, an add trigger template dataset, a transpose template dataset, an alerting template dataset, a measurement template dataset, a device template dataset, a hierarchical data store template dataset, an update template dataset, etc.

In an operation 1118, an update macro is executed to create update code using the update template dataset included in the templates dataset. The update macro includes update macro code to execute with the created configuration dataset and the created mapping dataset to define internal macros defined in the update template dataset. Execution of the update macro creates update code included as code or as a reference to a code file between mas-module start and end tags in data processing model 714 for execution in a derived window having the procedural type by ESPE 400 as described further below. The update template dataset defines code, for example, written as a DS2 package with one or more methods, that is configured to process raw event stream data by parsing out the measurement ID and value and to create additional elements like a date, a time, and a null device GUID for use downstream when the raw measurements are received in the event stream when data processing model 714 is used to define ESPE 400 execution. For example, the update template dataset includes a macro ^$@TIMESUBSET@$^. When the update macro is executed, it replaces the macro ^$@TIMESUBSET@$^ with a value defined by subsetFirstDTTM and subsetLastDTTM, if any. The text "^$@TIMESUBSET@$^" acts as a placeholder that is replaced by the update macro with information from the mapping dataset. For illustration, subsetFirstDTTM and subsetLastDTTM were defined on the command line though the values could be defined in various manners such as from data processing configuration file 1014. The values defined for subsetFirstDTTM and subsetLastDTTM may be used to define a time window that data processing model 714 processes data. The created update code is associated with a source window that receives an event and creates and sends a record to a rename procedural window as described further below. A plurality of sources of streaming data may be defined using a plurality of update macros and a plurality of update template datasets. The plurality of data sources may be unioned together for subsequent processing. For illustration, additional source data may include weather data.

In an operation 1122, a rename macro is executed to create rename code using a rename template dataset included in the templates dataset. The rename macro includes rename macro code to execute with the created configuration dataset and the created mapping dataset to define internal macros defined in the rename template dataset. Execution of the rename macro creates rename code included as code or as a reference to a code file between mas-module start and end tags in data processing model 714 for execution in a derived window having the procedural type by ESPE 400 as described further below. The rename template dataset defines code, for example, written as a DS2 package with one or more methods, that is configured to look up relevant information such as the device ID and a standardized measurement name from the mapping dataset created from measurements file 1016, to add the relevant information to the incoming streaming data elements that only contain the measurement ID and a timestamp value when each measurement is received in the event stream when data processing model 714 is used to define ESPE 400 execution. The timestamp value may include a date value and a time value that may be combined into a single datetime value from which the date value and the time value can be extracted.

As described previously, the unique measurement ID is used as a key to lookup measurement information about the device and the measurement when only the measurement ID is received. For those measurements, the device ID and the standardized measurement name are added to the incoming streaming data elements. As described previously, when both the measurement ID and the unique device ID are received, both are used as a combined key to lookup measurement information about the device. The measurement ID may not be unique, but the combination of the unique device ID and the measurement ID together is unique. The measurement information is added for all raw measurements defined in the data processing configuration file 1014 for all modeling areas and locations. As a result, rename template dataset, for example, includes a macro ˆ$@MYRVARDCL@$ˆ. When the rename macro is executed, it replaces the macro ˆ$@MYRVARDCL@$ˆ with the raw variable list created as part of the mapping dataset. The created rename code creates and sends a record to a subset procedural window as described further below.

The rename template dataset also includes code for ESPE 400 to check for invalid values based on the bad sensor time entries read from bad sensor times file 1022. As a result, the rename template dataset, for example, includes a macro ˆ$@MYSUBSETDT@$ˆ. When the rename macro is executed, it replaces the macro ˆ$@MYSUBSETDT@$ˆ with the variable list created as part of the mapping dataset that includes variables with bad sensor times read from bad sensor times file 1022.

For illustration, the created rename code (referred to as package rename_pts) includes an initialization method (referred to as "init") and a rename measurements method (referred to as "renamePoints") defined from the rename template dataset. An illustrative initialization method is provided below where a "_measurementGuid_=" to "points.add( );" is created for each measurement defined by the macro ˆ$@MYRVARDCL@$ˆ:
  method ink);
  points=_new_ hash(10,");
  points. multidata('yes');
  points.defineKey('_measurementGuid_');
  points.defineData('_measurementGuid_');
  points.defineData('_deviceGuid_');
  points.defineData('_customerGuid_');
  points.defineData('_locationGuid_');
  points.defineData('_deviceType_');
  points.defineData('_deviceValue_');
  points.defineData('_measurementId_');
  points.defineData('arrayVal');
  points.defineDone( );
  _measurementGuid_='SAS/C/wth_humidity'; _deviceGuid_= 'SAS+C';
  _customerGuid_='customer_GUID_inserted';
  _locationGuid_='location_GUID_inserted';
  _deviceType_='bldg';
  _deviceValue_='device_value_inserted';
  _measurementId_='wth_humidity'; arrayVal=1; points.add( );

. . .
end;
An illustrative rename measurements method is provided below:
  method renamePoints(
  bigint keyraw,
  char(50) measurementGuid,
  char(250) deviceGuid,
  double msr_date,
  double msr_time,
  char(50) value,
  in_out double key,
  in_out double key2[ˆ$@ARRAYVAL@$ˆ],
  in_out double msr_dttm,
  in_out varchar customerGuid[ˆ$@ARRAYVAL@$ˆ],
  in_out varchar_deviceGuid[ˆ$@ARRAYVAL@$ˆ],
  in_out varchar locationGuid[ˆ$@ARRAYVAL@$ˆ],
  in_out varchar measurementId[ˆ$@ARRAYVAL@$ˆ],
  in_out varchar deviceType[ˆ$@ARRAYVAL@$ˆ],
  in_out varchar deviceValue[ˆ$@ARRAYVAL@$ˆ],
  in_out varchar_value[ˆ$@ARRAYVAL@$ˆ],
  in_out varchar_outOpcodeArray[ˆ$@ARRAYVAL@$ˆ]
  );

. . .
/*CHECK FOR INVALID VALUES FROM SPECIFIED DATE RANGES*/
  end;
In general, the rename measurements method will be used in a "rename" window to add the "in_out" variables above to the measurement GUID to provide context. The ARRAYVAL placeholder is calculated by the rename macro and is used to define an array output because a single measurement GUID coming from the event stream may be used multiple times as different measurements. As one measurement GUID arrives at the rename window, an output event is created for each. The value for the ARRAYVAL placeholder is a maximum number of times a single source measurement GUID will be used as an output measurement's ID considering all of the measurements.

In an operation 1124, a subset macro is executed to create subset code using a subset template dataset included in the templates dataset. A distinct subset template dataset is created for each modeling area defined in data processing configuration file 1014. To create unique package names, a macro is used to name the package in the form "package ˆ$@MYDEVTYPE@$ˆ_subset", where the value for each modelAreaId replaces the macro ˆ$@MYDEVTYPE@$ˆ.

The subset macro includes subset macro code to execute with the created configuration dataset and the created mapping dataset to define internal macros defined in the subset template dataset for each modeling area. Execution of the subset macro creates subset code included as code or as a reference to a code file between mas-module start and end tags in data processing model 714 for execution in a derived window having the procedural type by ESPE 400 as described further below. The subset template dataset defines code, for example, written as a DS2 package with one or more methods, that is configured to subset the incoming raw measurements received from a "rename" window to the raw measurements needed for a specific modeling area and to apply the upper and lower limits defined by the acceptableMax attribute value and/or the acceptableMin attribute value, if any, defined for each raw measurement when data processing model 714 is used to define ESPE 400 execution. As a result, the subset template dataset includes a macro ˆ$@MYSUBSETLIST@$ˆ. When the processing macro is executed, it replaces the macro ˆ$@MYSUBSETLIST@$ˆ with the variable list created as part of the mapping dataset that includes measurements associated with each modeling area and the values defined for the acceptableMax attribute value and/or the acceptableMin attribute value. The created subset code creates and sends a record to an add trigger procedural window as described further below.

For illustration, the created subset code includes an initialization method (referred to as "init") and a subset measurements method (referred to as "subsetPoints") defined from the subset template dataset. An illustrative initialization method is provided below where a "_customerGuid_=" to "measurementSubset.add( )" is created for each measurement defined by the macro ˆ$@MYSUBSETLIST@$ˆ:

```
method init( );
    measurementSubset=_new_ hash(8,'');
    measurementSubset.multidata('no');
    measurementSubset.defineKey('_customerGuid_');
    measurementSubset.defineKey('_locationGuid_');
    measurementSubset.defineKey('_deviceType_');
    measurementSubset.defineKey('_measurementId_');
    measurementSubset.defineData('_lowerLimit_');
    measurementSubset.defineData('_upperLimit_');
    measurementSubset.defineDone( );
    _customerGuid_='customer_GUID_inserted';
    _locationGuid_='location_GUID_inserted';
    _deviceType_='ahu';
    _measurementId_='ahu_area_htg';
    _lowerLimit_=.;
    _upperLimit_=.;
    measurementSubset.add( );
    _customerGuid_='customer_GUID_inserted';
    _locationGuid_='location_GUID_inserted';
    _deviceType_='ahu';
    _measurementId_='ahu_sply_fan_kw';
    _lowerLimit_=0.000000;
    _upperLimit_=.;
    measurementSubset.add( );
    _customerGuid_='customer_GUID_inserted';
    _locationGuid_='location_GUID_inserted';
    _deviceType_='ahu';
    _measurementId_='ahu_sply_fan_spd';
    _lowerLimit_=0.000000;
    _upperLimit_=100.000000;
    measurementSubset.add( );
    . . .
end;
```

An illustrative subset measurements method is provided below:

```
method subsetPoints(
    double msr_dttm,
    double msr_date,
    double msr_time,
    varchar(50) customerGuid,
    varchar(50) locationGuid,
    varchar(250) _deviceGuid,
    varchar(75) deviceType,
    varchar(75) deviceValue,
    varchar(50) measurementId,
    varchar(50) _value,
    in_out double _msr_dttm_,
    in_out double _msr_date_,
    in_out double _msr_time_,
    in_out varchar _customerGuid_,
    in_out varchar _locationGuid_,
    in_out varchar _deviceGuid_,
    in_out varchar _deviceType_,
    in_out varchar _measurementId_,
    in_out varchar _deviceValue_,
    in_out varchar _value_,
    in_out varchar _record_type_,
    in_out varchar _outOpcode
);
. . .
rc = measurementSubset.find( );
if rc = 0 then do;
    if ˆmissing(_lowerLimit_) then do;
        _valueDouble_ = putn(_value,16.6);
        if _valueDouble_ < _lowerLimit_ then
            _valueDouble_ = _lowerLimit_;
            _value_ = strip(put(_valueDouble_,16.6));
    end;
    if ˆmissing(_upperLimit_) then do;
        _valueDouble_ = putn(_value,16.6);
        if _valueDouble_ > _upperLimit_ then
            _valueDouble_ = _upperLimit_;
            _value_ = strip(put(_valueDouble_,16.6));
    end;
    _outOpcode = 'insert';
end;
else
    _outOpcode = 'delete';
end;
``` where measurementSubset.find determines whether the measurement received in the event stream matches a customer GUID, location GUID, device type, and measurement ID of a measurement added as part of execution of the initialization method. If found, the operation code is set to insert; otherwise, the operation code is set to delete. When an upper limit and/or a lower limit is stored for the measurement, the limits are applied to the measurement value.

In general, the subset measurements method will be used in a "subset" window to identify measurements for continued processing. The same source measurement may be used by multiple device type-level analyses (modeling areas). The subset window subsets the measurements in to just those needed for each device type and applies the upper and lower limits for the values.

In an operation 1126, an add trigger macro is executed to create add trigger code using an add trigger template dataset included in the templates dataset. A distinct add trigger template dataset is created for each modeling area defined in data processing configuration file 1014. To create unique package names, a macro is used to name the package in the form "package ˆ$@MYDEVTYPE@$ˆ_add_trigger" where the value for each modelAreaId replaces the macro ˆ$@MYDEVTYPE@$ˆ.

The add trigger macro includes add trigger macro code to execute with the created configuration dataset and the created mapping dataset to define internal macros defined in the add trigger template dataset for each modeling area. Execution of the add trigger macro creates add trigger code included as code or as a reference to a code file between mas-module start and end tags in data processing model 714 for execution in a derived window having the procedural type by ESPE 400 as described further below. The add trigger template dataset defines code, for example, written as a DS2 package with one or more methods, that is configured to create a trigger for each modeling area that triggers subsequent analysis such as updating measurement historical values, lag measurement calculations, aggregation measurement calculations, and device-level output records when data processing model 714 is used to define ESPE 400 execution.

For example, the created add trigger code creates and sends a "trigger record" to a transpose procedural window as described further below. There may be several types of trigger records that each result in a different action being performed by the transpose procedural window. For example, an update history trigger record triggers addition of a current measurement value to a historical measurements list for the associated measurement ID and removes, if necessary, the oldest value when historical tracking has been indicated for the associated measurement ID using the historicalMeasurementCount attribute value. As another example, a lag trigger record triggers an update to each lag measurement from the target measurement value associated with the lagTargetMeasurementId attribute value based on the associated lagValueIndex attribute value. As yet another example, an aggregation trigger record triggers an update to each aggregation measurement from the target measurement value associated with the aggregationTargetMeasurementId attribute value from historical values for a temporal aggregation selected as the aggregationType attribute value or from measurement values of connected devices for a relational aggregation selected as the aggregationType attribute value. As still another example, an output trigger record triggers a transpose of the streamed data. There is one output trigger record for each device for which measurements are to be output. As a result, the add trigger template dataset includes a macro ^$@INITIALIZEDEVICEMEASUREMENTS@$^. When the add trigger macro is executed, it replaces the macro ^$@INITIALIZEDEVICEMEASUREMENTS@$^ with the variable list created as part of the mapping dataset that includes measurements associated with each modeling area.

For illustration, the created add trigger code includes an initialization method (referred to as "init") and an add trigger method (referred to as "addTrigger") defined from the add trigger template dataset. An illustrative initialization method is provided below where a "_deviceGuid_=" to "deviceList.add( );" is created for each measurement defined by the macro ^$@INITIALIZEDEVICEMEASUREMENTS@$^:

method ink);
  deviceList=_new_ hash(8,'');
  deviceList.multidata('no');
  deviceList.defineKey('_deviceGuid_');
  deviceList.defineKey('_customerGuid_');
  deviceList.defineKey('_locationGuid_');
  deviceList.defineKey('_deviceType_');
  deviceList.defineKey('_deviceValue_');
  deviceList.defineData('_deviceGuid_');
  deviceList.defineData('_customerGuid_');
  deviceList.defineData('_locationGuid_');
  deviceList.defineData('_deviceType_');
  deviceList.defineData('_deviceValue_');
  deviceList.defineDone( );
  _deviceGuid_='SAS+C+HR_01+AH_1A';
    _customerGuid_='customer_GUID_inserted';
    _locationGuid_='location_GUID_inserted';
    _deviceType_='ahu';
    _deviceValue_='AH_1A';
    deviceList.add( );
  _deviceGuid_='SAS+C+HR_01+AH_1B';
    customerGuid_='customer_GUID_inserted';
    _locationGuid_='location_GUID_inserted';
    _deviceType_='ahu';
    _deviceValue_='AH_1B';
    deviceList.add( );
  _deviceGuid_='SAS+C+HR_01+AH_2A';
    customerGuid_='customer_GUID_inserted';
    _locationGuid_='location_GUID_inserted';
    _deviceType_='ahu';
    _deviceValue_='AH_2A';
    deviceList.add( );
  . . .
  end;

An illustrative add trigger method is provided at the end of the detailed description and is labeled addTrigger method where ^$@OUTPUTARRAYSIZE@$^ is a number of trigger records created each time based on the number of devices (e.g., ^$@OUTPUTARRAYSIZE@$^=3+number of devices) and ^$@MYHISTORYINTERVAL@$^)*^ is a history update time value that may be defined as an input (e.g., myoutputinterval_historical defined on the command line) and ^$@MYOUTPUTINTERVAL@$^ is an output update time value that may be defined as an input (e.g., myoutputinterval_realtime defined on the command line). A unique value may be defined for each "value" array entry to indicate the type of trigger record created. For example, in the illustrative addTrigger method, a "100" record is for a historical update, a "200" record is for calculating a lag variable using the historical measurements, a "300" record is for calculating aggregations, and a "500" record is for outputting transposed records. The MYHISTORYINTERVAL placeholder defines when to update historical measurements in an in-memory data store (IDS) described further below. The MYOUTPUTINTERVAL placeholder defines when to output a transposed record. The MYHISTORYINTERVAL placeholder value and the MYOUTPUTINTERVAL placeholder value may be the same or different. For example, we historical values may be updated every 5 minutes, while a transpose data vector may be output every 15 minutes.

In an operation 1128, a transpose macro is executed to create transpose code using a transpose template dataset included in the templates dataset. A distinct transpose template dataset is created for each modeling area defined in data processing configuration file 1014. To create unique package names, a macro is used to name the package in the form "package ^$@MYDEVTYPE@$^_transpose" where the value for each modelAreaId replaces the macro ^$@-MYDEVTYPE@$^.

The transpose macro includes transpose macro code to execute with the created configuration dataset and the created mapping dataset to define internal macros defined in the transpose template dataset for each modeling area. Execution of the transpose macro creates transpose code included as code or as a reference to a code file between mas-module start and end tags in data processing model 714 for execution in a derived window having the procedural type by ESPE 400 as described further below. The transpose template dataset defines transpose code, for example, written as a DS2 package with one or more methods, that is configured to compute a transposed value for each measurement for each modeling area when data processing model 714 is used to define ESPE 400 execution. The created transpose code updates measurement historical values, computes transform measurement values, updates lag measurement values, updates aggregation measurement values, computes calculation values, and updates device-level output records for each trigger record received based on the type of trigger record.

Again, the update history trigger record triggers addition of a current measurement value to a historical measurements list for the associated measurement ID and removes, if necessary, the oldest value when historical tracking has been indicated for the associated measurement ID using the historicalMeasurementCount attribute value. The update history trigger record also triggers computation of a transform measurement value for each transform measurement from the target measurement value associated with the transformTargetMeasurementId attribute value. The lag trigger record triggers the update to each lag measurement from the target measurement value associated with the lagTargetMeasurementId attribute value based on the associated lagValueIndex attribute value. The trigger record triggers an update to each aggregation measurement from the target measurement value associated with the aggregationTargetMeasurementId attribute value from historical values for a temporal aggregation selected as the aggregationType attribute value or from measurement values of connected devices for a relational aggregation selected as the aggregationType attribute value. The output trigger record triggers selection of any raw measurements, computed transform measurements, computed lag measurements, and computed aggregation measurements and computes calculation measurement values from those and prepares the device-level output records from the raw measurements, computed transform measurements, computed lag measurements, computed aggregation measurements, and computed calculation measurement values.

When raw measurements arrive from the event stream, the transpose code is configured to continually update an in-memory device object with the measurement's current value. Each measurement has a measurement value, timestamp value, and possibly historical values of the measurement to support additional variable creation such as a lag measurement or a temporal aggregation derived from the historical measurements. Transform measurements are also computed and stored as a device measurement. The created transpose code "transposes" the received individual raw measurements and outputs a single record for each device with multiple measurements on the record also referred to as a device state vector.

To support the collection and transpose of the streaming data, an in-memory data store (IDS) is created that provides retention of current sensor measurements, historical sensor measurements, and transformed sensor measurements and methods for updating and extracting data to perform processing tasks such as calculating lag variable measurements, aggregation variable measurements, and calculation variable measurements, and extracting raw measurements when outputting the device state vector to subsequent ESP derived windows such as for scoring and/or for alerting as described further below. In addition to tracking the raw measurements flowing in from the event stream, reference data is loaded into the IDS to support the various lag computations, aggregation computations, and calculation computations. The IDS combines both the storage of sensor measurement data as well as leveraging of the hierarchical relationships among the connected devices to support advanced data manipulation and variable (measurement value) creation. The code for implementing the IDS may be stored in measurement template dataset, device template dataset, and hierarchical data store template dataset. For illustration, measurement template dataset, device template dataset, and hierarchical data store (HDS) template dataset are written using the DS2 language though other programming languages, scripting languages, assembly languages, etc. may be used. Unlike the other templates, none of measurement template dataset, device template dataset, or HDS template dataset include any macros or macro code. Measurement template dataset, device template dataset, and HDS template dataset are configured to instantiate an instance of the IDS in the derived window of the procedural type created when data processing model 714 is used to define ESPE 400 execution. Measurement template dataset, device template dataset, and HDS template dataset are further configured to initialize the IDS instance with the reference data and to interact with the IDS instance as streaming data is processed.

The IDS may include three files stored on disk that are nested in terms of how they are used: 1) a measurement data store, 2) a device data store, and 3) the HDS. The measurement data store includes the lowest level object definition, a measurement object. A measurement object is defined for each raw measurement. Each measurement object includes the measurement ID, the measurement data type, the measurement value, a timestamp value, a list of historical measurements, a list of lag measurements, and a list of aggregation measurements. A number of historical measurements included in each list of historical measurements is based on the value defined between the historicalMeasurementCount start and end tags for the raw measurement. As defined in the measurement template dataset, the measurement data store includes public methods for interacting with the measurements and for updating the historical value list as described further below.

When received for processing by the transpose code, the following items may be defined for each measurement:
Window Key 1 (Key)
Window Key 2 (Key2)
Window Key 3 (Key3)
Unique Device ID (deviceGuid)
Unique Customer ID (customerGuid)
Unique Location ID (locationGuid)
Device Type (deviceType)
Device Label (deviceValue)
Measurement ID (measurementID)
Measurement Timestamp (msr_dttm)
Measurement Date (msr_date)
Measurement Time (msr_time)
Measurement Value (value)
Type of Record (record_type)

Each unique raw sensor measurement has its own measurement package instance. For example, when a discharge air temperature sensor measurement for an air handler AH_1A is received, the transpose code determines if a measurement package instance has been created for that measurement. If the measurement package instance has not been created for that measurement, a new measurement package instance is instantiated for tracking the air handler AH_1A's discharge air temperature measurement and the newly created measurement package instance is initialized with the new record values. If the measurement package instance has been created for that measurement, the existing measurement object is updated with the new record values.

The following data elements may be defined for each measurement object in the measurement template dataset:

TABLE II

| Data Element | Type | Description |
| --- | --- | --- |
| measurementId | Character | The measurement id of the sensor measurement |
| measurementDataType | Character | The data type of the sensor measurement value |
| measurementDttm | Numeric | The timestamp of the most recent sensor measurement update |
| measurementHistCount | Numeric | The number of historical measurements to retain for lag or temporal aggregation computations |
| measurementCharValue | Character | The sensor measurement value, if it is a character-valued measurement |
| measurementDoubleValue | Numeric | The sensor measurement value, if it is a double-valued measurement |
| head | Numeric | The current head index pointer for the list of historical measurements being retained |
| measurementHistValues | Hash Package | Hash table used for retaining the historical measurements for the sensor measurement. |

The measurementHistValues hash table maintains a current index, the sensor measurement value, if it is a character-valued measurement, the sensor measurement value, if it is a double-valued measurement, and the timestamp for each historical measurement. The following methods may be defined in the measurement template dataset to facilitate interaction with the measurement object:

TABLE III

| Method List ID | Method Name | Description |
| --- | --- | --- |
| 1 | measurement | Constructor method for instantiating a new measurement package instance |
| 2 | updateValue | Method for updating the measurement instance with the current sensor measurement value and datetime |
| 3 | validateRecency | Method for determining if the most recent measurement update datetime is within a specified time window with respect to the specified reference datetime. If not, the measurement value is set to missing. |
| 4 | updateHistoricalValues | Method for adding the current measurement value to the list of historical measurements and removing the oldest measurement if necessary |
| 5 | getHistoricalValue | Method for retrieving the historical measurement value at the specified historical index |
| 6 | getHistoricalDttm | Method for retrieving the historical measurement datetime at the specified historical index |

TABLE III-continued

| Method List ID | Method Name | Description |
| --- | --- | --- |
| 7 | getMeasurementId | Returns the measurement ID for the current measurement package instance |
| 8 | getDataType | Returns the measurement data type for the current measurement package instance |
| 9 | getValue | Returns the current sensor measurement value for the current measurement package instance |
| 10 | getDttm | Returns the current sensor measurement datetime for the current measurement package instance |
| 11 | getConfiguredMeasurementCount | Returns the configured number of historical measurements to be retained |
| 12 | getHistoricalMeasurementCount | Returns the current number of historical measurements that are present in the measurementHistValues hash package instance |

The Method List ID column is a number assigned to the package method listing to aid in referring to previous package methods in the method descriptions.

The device data store includes the next higher-level object definition, a device object. A device object is defined for each device. Each device object includes the device ID, the device type, the device label, and a list of one or more measurement objects that "belong" to the device because the device ID defined in measurements file 1016 for the measurement indicates that device ID. As defined in the device template dataset, the device data store includes methods for interacting with the device attributes as well as pass-through methods that act on the underlying measurement objects included in the measurement objects list of the device. Each device defined in devices file 1018 has its own device package instance created when the IDS is initialized at ESP project startup.

The following data elements may be defined for each device object in the device template dataset:

TABLE IV

| Data Element | Type | Description |
| --- | --- | --- |
| deviceId | Character | The device GUID of the device |
| deviceType | Character | The type of device |
| deviceLabel | Character | A label for naming the device |
| measurements | Hash Package | Hash table used to collect references to the measurement package instances for sensor measurements coming from the device |

The following methods may be defined in the device template dataset to facilitate interaction with the device object:

TABLE V

| Method List ID | Method Name | Description |
| --- | --- | --- |
| 13 | device | Constructor method for instantiating a new device package instance |

TABLE V-continued

| Method List ID | Method Name | Description |
|---|---|---|
| 14 | getId | Returns device id value |
| 15 | getType | Returns device type value |
| 16 | setType | Sets device type value |
| 17 | getLabel | Returns device label value |
| 18 | setLabel | Sets device label value |
| 19 | addMeasurement | Determines if the current device already has a measurement package instance for the current measurement and creates one if not |
| 20 | updateMeasurement | Pass-through to method (2) for updating the sensor measurement value and timestamp |
| 21 | updateMeasurementHistory | Pass-through to method (4) for updating sensor measurement historical values |
| 22 | validateMeasurementRecency | Pass-through to method (3) for validating the recency of the sensor measurement |
| 23 | getMeasurementValue | Pass-through to method (9) for getting the sensor measurement value |
| 24 | getHistoricalMeasurementValue | Pass-through to method (5) for getting historical measurement value |
| 25 | getHistoricalMeasurementCount | Pass-through to method (12) for getting the number of historical measurements in the measurementHistValues hash package instance |
| 26 | getConfiguredMeasurementCount | Pass-through to method (11) for getting the configured number of historical measurements to be retained |
| 27 | getMeasurementCount | Returns the number of measurements in the current device's measurements hash package instance |
| 28 | hasMeasurement | Determines if the current device contains a measurement in the measurements hash package instance |
| 29 | updateLagMeasurement | Method for updating the value of a lag measurement from the source measurement |

The HDS is the highest-level object definition and is the main data store of the IDS. The HDS includes a list of all the devices identified from devices file 1018 and a definition of the connectivity between devices (links) defined from links files 1020 and the hierarchies specified in data processing configuration file 1014. Multiple hierarchies can be defined to characterize interconnections in multiple ways, and the hierarchy name is specified when used to perform calculations or scoring. The data elements for the links includes the hierarchy name, the parent node ID, and the child node ID. As defined in the HDS template dataset, the HDS includes methods for interacting with the devices, the links, and the measurements, to compute aggregations, to traverse the hierarchies, etc.

The following data elements may be defined for the HDS object in the HDS template dataset:

TABLE VI

| Data Element | Type | Description |
|---|---|---|
| devices | Hash Package | Hash table used to collect references to the device package instances |
| downlinks | Hash Package | Hash table containing directional parent to child hierarchy links between devices |
| uplinks | Hash Package | Hash table containing directional child to parent hierarchy links between devices |

The following methods may be defined in the HDS template dataset to facilitate interaction with the HDS object:

TABLE VII

| Method List ID | Method Name | Description |
|---|---|---|
| 30 | hierarchicalDataStore | Constructor method for instantiating a new HDS package instance |
| 31 | add Device | Method for creating new device package instances and adding it to the device's hash package instance |
| 32 | addUpLink | Method for adding links to the uplinks hash package instance |
| 33 | addDownLink | Method for adding links to the downlinks hash package instance |
| 34 | addLink | Method for adding add up and down links simultaneously to the uplinks hash package instance and to the downlinks hash package instance, respectively |
| 35 | updateDeviceAggMeasurement | Method for calculating aggregation measurements using the specified hierarchy and aggregation definition. |
| 36 | hasDevice | Method for determining if the device's hash package instance contains a device instance for the specified deviceID |
| 37 | getDeviceCount | Returns the current number of device package instance references in the device's hash package instance |
| 38 | getParentDeviceId | Method for identifying the parent device of the current device with respect to the specified hierarchy |
| 39 | getUpLinkCount | Returns the number of links in the uplinks hash package instance |
| 40 | getDownLinkCount | Returns the number of links in the downlinks hash package instance |
| 41 | setDeviceType | Pass-through to method (16) for setting device type |
| 42 | getDeviceType | Pass-through to method (15) for getting device type |
| 43 | setDeviceLabel | Pass-through to method (18) for setting device label |

TABLE VII-continued

| Method List ID | Method Name | Description |
| --- | --- | --- |
| 44 | getDeviceLabel | Pass-through to method (17) for getting device label |
| 45 | updateDeviceMeasurementHistory | Pass-through to method (21) for updating sensor measurement historical values |
| 46 | updateDeviceLagMeasurement | Pass-through to method (29) for updating lag measurement value |
| 47 | hasDeviceMeasurement | Pass-through to method (28) for determining if the current device contains the specified measurement in its measurements hash package instance |
| 48 | getDeviceMeasurementValue | Pass-through to method (23) for getting sensor measurement value |
| 49 | addDeviceMeasurement | Pass-through to method (19) for adding a sensor measurement to the device's measurements hash package instance |
| 50 | updateDeviceMeasurement | Pass-through to method (20) for updating a sensor measurement's value and timestamp |
| 51 | validateDeviceMeasurementRecency | Pass-through to method (22) for validating recency of the sensor measurement |

Measurement template dataset, device template dataset, and HDS template dataset are configured to instantiate an instance of the IDS in the derived window of the procedural type created when data processing model 714 is used to define ESPE 400 execution. Measurement template dataset, device template dataset, and HDS template dataset are further configured to load reference data, create instances of the device package for each device in the reference data, and create instances of the measurement package for each sensor measurement that is tracked as defined by data processing model 714. Measurement template dataset, device template dataset, and HDS template dataset are further configured to create, read, update, and manipulate data for data retention as well as to compute any transform computation, lag computation, aggregation computation, and calculation computation to output device-level state vectors for subsequent scoring, alerting, and/or output.

The transpose macro includes transpose macro code to execute with the created configuration dataset and the created mapping dataset to define internal macros defined in the transpose template dataset for each modeling area. Execution of the transpose macro creates transpose code included as code or as a reference to a code file between mas-module start and end tags in data processing model 714 for execution in a derived window having the procedural type by ESPE 400 as described further below. The transpose template dataset defines code, for example, written as a DS2 package with one or more methods, that is configured to transpose (transform, compute lag, compute aggregation, compute calculation) measurements when data processing model 714 is used to define ESPE 400 execution. The created transpose code creates and sends a record to a scoring procedural window as described further below.

The transpose macro code writes code to the transpose code to add measurements to the measurements hash table in the rename derived window, to create a lag variable, to create an aggregation variable, to initialize the variables to be output from the transpose window, to populate the output variables based on the current values, to compute transform measurements, and to compute calculation measurements. As a result, the transpose template dataset, for example, includes macros ˆ$@MYMSRMNTDATATYPE@$ˆ, ˆ$@MYRAWVARDCL@$ˆ, ˆ$@MYLAGVARDCL@$ˆ, ˆ$@MYAGGVARDCL@$ˆ, ˆ$@MYDEVICESLINKSDCL@$ˆ, etc. as discussed below. When the transpose macro is executed, it replaces the macro ˆ$@MYMSRMNTDATATYPE@$ˆ with the measurement data type for each measurement. When the transpose macro is executed, it replaces the macro ˆ$@MYRAWVARDCL@$ˆ with a list of the raw measurements. When the transpose macro is executed, it replaces the macro ˆ$@MYLAGVARDCL@$ˆ with a list of the lag measurements. When the transpose macro is executed, it replaces the macro ˆ$@MYAGGVARDCL@$ˆ with a list of the aggregation measurements. When the transpose macro is executed, it replaces the macro ˆ$@MYDEVICESLINKSDCL@$ˆ with a list of the devices and hierarchy links.

For illustration, the created transpose code includes a lag and aggregation initialization method, an initialization method (referred to as "init"), and a transpose measurements method (referred to as "runMain") defined from the transpose template dataset. An illustrative initialization method is provided below where a "dataTypeMeasurementId=" to "measurementDataTypes.add( )" is created for each measurement defined by the macro ˆ$@MYMSRMNTDATATYPE@$ˆ, a "historicalDeviceType=" to "measurementHistoryDefinitions.addQ" is created for each raw measurement defined by the macro ˆ$@MYRAWVARDCL@$ˆ, a "lagDeviceType=" to "lagDeviceTypeDefinitions.add( )" is created for each lag measurement defined by the macro ˆ$@MYLAGVARDCL@$ˆ, a "aggregationDeviceType=" to "aggDeviceTypeDefinitions.add( )" is created for each aggregation measurement defined by the macro ˆ$@MYAGGVARDCL@$ˆ, and a "deviceId=" to "initializeLagsAndAggregations(deviceId, deviceType)" is created for each device defined by the macro ˆ$@MYDEVICESLINKSDCL@$ˆ:

```
method init( );
/*INSTANTIATE HIERARCHICAL DATA STORE*/
dataModel=_new_ hierarchicalDataStore( );
/*MEASUREMENT DATA TYPE HASH OBJECT*/
measurementDataTypes=_new_ hash(3,");
measurementDataTypes.defineKey('dataTypeMeasure-
    mentId');
measurementDataTypes.defineData('dataTypeMeasure-
    mentDataType');
measurementDataTypes.defineDone( );
/*MEASUREMENT HISTORY DEFINITION HASH
    OBJECT*/
. . .
/*LAG VARIABLE DEFINITION HASH OBJECTS
    FOR DEVICE AND VARIABLE LEVEL*/
. . .
/*AGGREGATION VARIABLE DEFINITION HASH
    OBJECTS FOR DEVICE AND VARIABLE LEVEL*/
. . .
/*STORE MEASUREMENT DATA TYPES FOR REF-
    ERENCE*/
```

```
dataTypeMeasurementId='ahu_area_htg';
dataTypeMeasurementDataType='double'; measurementDataTypes.add( );
dataTypeMeasurementId='ahu_bldg_expctd_stpt';
dataTypeMeasurementDataType='double'; measurementDataTypes.add( );
...
/*DEFINE HISTORICAL MEASUREMENT RETENTION*/
historicalNodeType='fpb';
   historicalMeasurementId='fpb_zot_act';
   historicalMeasurementCount=1;
   measurementHistoryDefinitions.add( );
...
/*DEFINE LAG MEASUREMENTS*/
lagDeviceType='fpb';
   lagMeasurementId='I15_fpb_zot_act';
   lagMeasurementDataType='double'; lagTargetMeasurementId=
      'fpb_zot_act'; lagValueIndex=1; lagDeviceTypeDefinitions.add( );
/*DEFINE AGGREGATION MEASUREMENTS*/
aggregationDeviceType='ahu';
   aggregationTargetMeasurementId='ahu_zohum_act';
   aggregationMeasurementId='ahu_zohum_act_Id8';
   aggregationHierarchyName='air',
      aggregationType='temporal';
   aggregationDefinition='leading|8|avg';
   aggDeviceTypeDefinitions.add( );
   /*INITIALIZE NODES AND HIERARCHY LINKS*/
   deviceId='SAS+C+HR_01+AH_1A';
      deviceType='ahu';
      deviceLabel='AH_1A', dataModel.addDevice (deviceId, deviceType,
         deviceLabel); initializeLagsAndAggregations(deviceId, deviceType);
end;
```

An illustrative transpose measurements method is provided below:

```
method runMain(
   double key,
   double key2,
   double key3,
   char(250) deviceGuid,
   char(50) customerGuid,
   char(50) locationGuid,
   char(75) nodeType,
   char(100) nodeValue,
   char(32) measurementId,
   double msr_dttm,
   double msr_date,
   double msr_time,
   char(50) value,
   char(50) record_type,
   char_inOpcode,
   in_out double msr_year,
   in_out double msr month,
   in_out double msr_hour,
   in_out double msr_dayofweek,
   in_out double msr_weekofyear,
   in_out double msr_quarter,
   in_out char level_1,
   in_out char level_2,
   in_out char level_3,
   in_out char level_4,
   ^$@MYINOUTVARDCL@$^
   in_out char_outOpcode
);
   /*START TIMER*/
   ...
   /*CALCULATE DATE AND TIME MEASUREMENTS*/
   ...
   /*SAVE INPUT MEASUREMENT RECORD VALUES*/
   ...
   /*PROCESS TRIGGER RECORD BASED ON TYPE OF TRIGGER RECORD*/
      /*UPDATE HISTORICAL MEASUREMENTS TYPE 1*/
      /*UPDATE LAG VARIABLES TYPE 2*/
         /*APPLY LAG DEFINITION AND UPDATE VALUE*/
      /*UPDATE AGGREGATION VARIABLES TYPE 3*/
         /*APPLY AGGREGATION DEFINITION AND UPDATE VALUE
         */
      /*UPDATE OUTPUT VARIABLES TYPE 4*/
         ^$@MYMISSVAR@$^
         $@MYVARDEFDCL@$^
         /*BEGIN CREATED VARIABLE CODE, IF ANY*/
         ^$@MYCVARCODE@$^
         /*APPLY LIMITS TO CREATED VARIABLES, IF ANY*/
         ^$@MYLIMITS@$^
         /*RETAIN VARIABLES, IF ANY*/
         ^$@MYRETAINPOST@$^
      else
      /*PROCESS CURRENT MEASUREMENT*/
      /*PROCESS MEASUREMENT TRANSFORMS*/
      ^$@MYTRNSFRMVAR@$^
   ...
   end;
``` where an "in_out measurementType measurementId" is created for each measurement defined by the macro ^$@MYINOUTVARDCL@$^.

When the transpose macro is executed, it further generates the following block of code for each hierarchy to replace the macro ^$@MYVARDEFDCL@$^.

```
hierarchyName='air';
childNodeId = _nodeId_;
dataModel.hasNode(childNodeId,_rcHasNode_);
if _rcHasNode_ = 0 then
   hasParentNode = 1;
do while (hasParentNode = 1);
   /* BLDG: WTH_TEMPF */
   tempMeasurementId = 'wth_tempf';
   dataModel.hasNodeMeasurement(childNodeId, tempMeasurementId,
      _rcHasNodeMeasurement_);
   if _rcHasNodeMeasurement_ = 0 then do;
      dataModel.validateNodeMeasurementRecency(childNodeId,
         tempMeasurementId, measurementDttm, 3600);
      dataModel.getNodeMeasurementValue(childNodeId,
         tempMeasurementId, tempMeasurementDataType,
         tempMeasurementCharValue, tempMeasurementDoubleValue);
      select (tempMeasurementDataType);
         when ('char') wth_tempf = strip(tempMeasurementCharValue);
         when ('double') wth_tempf = tempMeasurementDoubleValue;
      end;
   ...
   end;
where
   /* BLDG: MEASUREMENTID */
   tempMeasurementId = 'measurementId';
   dataModel.hasNodeMeasurement(childNodeId, tempMeasurementId,
      _rcHasNodeMeasurement_);
```

-continued

```
    if _rcHasNodeMeasurement_ = 0 then do;
       dataModel.validateNodeMeasurementRecency(childNodeId,
          tempMeasurementId, measurementDttm, 3600);
       dataModel.getNodeMeasurementValue(childNodeId,
          tempMeasurementId, tempMeasurementDataType,
          tempMeasurementCharValue, tempMeasurementDoubleValue);
       select (tempMeasurementDataType);
          when ('char') wth_tempf = strip(tempMeasurementCharValue);
          when ('double') wth_tempf = tempMeasurementDoubleValue;
       end;
MEASUREMENTID is defined for each measurement defined by the
macro ^$@MYINOUTVARDCL@$^.
```

When the transpose macro is executed, it further generates the following block of code for each calculation measurement to replace the macro ^$@MYCVARCODE@$^.

```
_customerGuid_='customer_GUID_inserted';
_locationGuid_='location_GUID_inserted';
if customerGuid='customer_GUID_inserted' and locationGuid in
   ('location_GUID_inserted') then do;
   /* Created Variable: ahu_type */
   if locationGuid='first_location_GUID_inserted' then do;
      if level_2 in ('AH_1C' 'AH_1D' 'AH_1F' 'AH_1G'
         'AH_GA' 'AH_GB' 'AH_GG') then
         ahu_type = 'Single Zone';
      else
         ahu_type = 'Multi Zone';
      end;
   else if locationGuid='second_location_GUID_inserted' then do;
      ahu_type = 'Multi Zone';
   end;
   else do;
      ahu_type='Unknown';
   end;
   /* Created Variable: weekday */
   weekday=0;
   if weekday(datepart(msr_dttm)) in (2,3,4,5,6) then weekday=1;
   . . .
``` where
/*Created Variable: calculated variable name*/
Calculation code read from calculated variable name calculate code file
is defined for each calculation measurement defined by the macro ^$@MYCVARCODE@$^. Thus, the transpose macro reads the calculate file named ahu_type from calculate code files 1030 and writes the code below the ahu_type comment, reads the calculate file named weekday from calculate code files 1030 and writes the code below the weekday comment, etc.

When the transpose macro is executed, it further generates the following block of code for each calculated variable for which acceptableMax and/or acceptableMin attribute values were defined to replace the macro ^$@MYLIMITS@$^ in a manner similar to the defined for the subset code:

```
   if ^missing(_lowerLimit_) then do;
      _valueDouble_=putn(_value,16.6);
      if _valueDouble_<_lowerLimit_ then
         _valueDouble_=_lowerLimit_,
         _value_=strip(put(_valueDouble_,16.6));
   end;
   if ^missing(_upperLimit_) then do;
      _valueDouble_=putn(_value,16.6);
      if _valueDouble_>_upperLimit_ then
         _valueDouble_=_upperLimit_;
         _value_=strip(put(_valueDouble_,16.6));
   end;
   _outOpcode='insert';
   end;
else
   _outOpcode='delete';
```

When the transpose macro is executed, it further generates the following block of code for each calculated variable to replace the macro ^$@MYRETAINPOST@$^. The MYRETAINPOST placeholder specifies the variables that need to be retained in the IDS after the calculation is performed for use in a subsequent calculation until a next measurement is received. This is specified in the calculation measurement entry using attribute retain="true". The generated code to store the calculation value back as a measurement is:

```
/*---RETAIN (STORE)---BLDG: TOT_ENERGY_USE_
   TODAY*/
   _measurementId_='tot_energy_use_today';
   measurementDataTypes.find([_measurementId_],[temp-
      MeasurementDataTyp e]);
   select (tempMeasurementDataType);
   when ('double')    processNodeMeasurement(nodeId,
      nodeType,
   _measurementId_, 'double', measurementDttm, '', tot_en-
      ergy_use_today);
   when ('char') processNodeMeasurement(nodeId, node-
      Type,
   _measurementId_, 'char', measurementDttm, tot_en-
      ergy_ use_today, .);
```

When the transpose macro is executed, it further generates the following block of code for each transform measurement to replace the macro ^$@MYTRNSFRMVAR@$^.

```
   select (measurementId);
   when ('ahu_occ_act') do;
   /*ahu: ahu_occ_active*/
   transformMeasurementId='ahu_occ_active';
   measurementDataTypes.find([transformMeasurementId],
      [transformMeasurementDataType]);
   transformMeasurementDoubleValue=.;
   if measurementDoubleValue=1 then
      transformMeasurementCharValue='true';
   else
      transformMeasurementCharValue='false';
   processNodeMeasurement(nodeId, nodeType,
   transformMeasurementId,    transformMeasurementData
      Type,
   measurementDttm, transformMeasurementCharValue,
   transformMeasurementDoubleValue);
   end;
where
   when ('transformTargetMeasurementId') do;
   /*hierarchyName: transformMeasurementId*/
   transformMeasurementId='transformMeasurementId';
   measurementDataTypes.find([transformMeasurementId],
      [transformMeasurementDataType]);
   transformMeasurementDoubleValue=.;
   Transform code read from transform variable name trans-
      form code file
   processNodeMeasurement(nodeId, nodeType,
   transformMeasurementId,    transformMeasurementData
      Type,
   measurementDttm, transformMeasurementCharValue,
   transform MeasurementDoubleValue);
   end;
``` is defined for each transform measurement. Thus, the transpose macro reads the transform file named ahu_occ_active from transform code files 1028 and inserts the read code as shown above for each transform measurement. The transform measurements are grouped by the value defined between the transform TargetMeasurementId start and end tags for the transform measurement.

In an operation 1130, an alerting macro is executed to create alerting code using an alerting template dataset included in the templates dataset. A distinct alerting template dataset is created for each modeling area defined in data processing configuration file 1014. To create unique package names, a macro is used to name the package in the form "package ^$@MYDEVTYPE@$^_alerting", where the value for each modelAreaId replaces the macro ^$@MYDEVTYPE@$^.

The alerting macro includes alerting macro code to execute with the created configuration dataset and the created mapping dataset to define internal macros defined in the alerting template dataset for each modeling area. Execution of the alerting macro creates alerting code included as code or as a reference to a code file between mas-module start and end tags in data processing model 714 for execution in a derived window having the procedural type by ESPE 400 as described further below. The alerting template dataset defines alerting code, for example, written as a DS2 package with one or more methods, that is configured to determine when an alert is triggered when data processing model 714 is used to define ESPE 400 execution. The alerting code uses the output measurement from an analytic model or a calculate measurement (business rules) to generate alert events. The created alerting code creates and sends a record to a scoring procedural window. When alerting is not selected in data processing configuration file 1014, the created alerting code may act as a pass-through to the scoring procedural window.

For illustration, the created alerting code includes an initialization method (referred to as "init") and a create alerts method (referred to as "createAlerts") defined from the alerting template dataset. An illustrative initialization method is provided below where a "_predictionMeasurementId=" to "outputThresholds.add( );" is created for each alert record defined by the macro ^$@OUTPUTTHRESHOLDS@$^, where an alert record is defined for each alert whether it is defined for a calculation measurement or for an analytical model:

```
method init( );
outputThresholds=_new_ hash(4,'');
outputThresholds.defineKey('_predictionMeasurementId');
outputThresholds.defineData('_predictionMeasurementId');
outputThresholds.defineData('_modelAlertOutputThreshold');
outputThresholds.defineDone( );
devlist=_new_ hash(8, '');
devlist.defineKey('_device');
devlist.defineKey('_predictionMeasurementId');
devlist.defineData('_device');
devlist.defineData('_predictionMeasurementId');
devlist.defineData('_outlierDirection');
devlist.defineData('_outlierCount');
devlist.defineData('_alertEpisode');
devlist.defineData('_alertStartDttm');
devlist.defineDone( );
/*POPULATE THRESHOLD LIST FROM XML*/
^$@OUTPUTTHRESHOLDS@$^
end;
``` where the alerting macro code replaces the macro ^$@OUTPUTTHRESHOLDS@$^ included in the alerting template dataset with the following for each alert record based on the parameters defined for each alert

```
_predictionMeasurementId='P_ahu_sply_fan_kw';
_modelAlertOutputThreshold=4;     outputThresholds.add( );
_predictionMeasurementId='ahu_std_cmfrt_alert';
_modelAlertOutputThreshold=8;     outputThresholds.add( );
```

For example, "P_ahu_sply_fan_kw" is defined from the following in data processing configuration file 1014

```
<analyticalModelMeasurement
modelMeasurementRole="target"
modelMeasurementType="interval"
>
ahu_sply_fan_kw
``` where "P_" is prepended automatically for predictive measurements.

For example, "ahu_std_cmfrt_alert" is defined from the following in data processing configuration file 1014

```
<measurement measurementType="calculation" nodeType="ahu"
measurementId="ahu_std_cmftalert"
measurementDataType="char"
measurementIdLabel="Outside Standard of Comfort Alert"
ruleAlertType="Comfort"
ruleAlertSubtype="Outside Standard of Comfort"
ruleAlertOutputThreshold="8"
ruleAlertPlusDesc="Avg zone temp setpoint has been outside standard of comfort for 2 hours"
ruleAlertMinusDesc="Avg zone temp setpoint has been outside standard of comfort for 2 hours">
<calculationOrder>10</calculationOrder>
</measurement>
```

An illustrative create alerts method is provided below:

```
method createAlerts (
double msr_dttm,
varchar(250) deviceGuid,
varchar(75) nodeType,
^$@INPUTMETHODVARS@$^
in_out double key4[^$@OUTPUTARRAYSIZE@$^],
in_out varchar alertedMeasurementId[^$@OUTPUTARRAYSIZE@$^],
in_out varchar alertType[^$@OUTPUTARRAYSIZE@$^],
in_out varchar alertSubtype[^$@OUTPUTARRAYSIZE@$^],
in_out varchar alertEpisode[^$@OUTPUTARRAYSIZE@$^],
in_out double alertInstance[^$@OUTPUTARRAYSIZE@$^],
in_out double alertPersistence[^$@OUTPUTARRAYSIZE@$^],
in_out double alertStartDttm[^$@OUTPUTARRAYSIZE@$^],
in_out double alertStartDate[^$@OUTPUTARRAYSIZE@$^],
in_out double alertStartTime[^$@OUTPUTARRAYSIZE@$^],
in_out varchar alertMessage[^$@OUTPUTARRAYSIZE@$^],
in_out double actualMeasurementValue[^$@OUTPUTARRAYSIZE@$^],
in_out double predictedMeasurementValue[^$@OUTPUTARRAYSIZE@$^],
in_out double lowerPredictionLimit[^$@OUTPUTARRAYSIZE@$^],
in_out double upperPredictionLimit[^$@OUTPUTARRAYSIZE@$^],
```

```
    in_out   double   predictionResidual[^$@OUTPUTAR-
       RAYSIZE@$^],
    in_out   varchar_outOpcodeArray[^$@OUTPUTARR-
       AYSIZE@$^]
  );
  . . .
  ^$@ALERTRULELOGIC@$^
  end;
``` where `^$@OUTPUTARRAYSIZE@$^` is replaced with a number of alert records created, `^$@INPUTMET- HODVARS @$^` is replaced with a declaration for each measurement used by an alert as an input measurement, and `^$@ALERTRULELOGIC @$^` is replaced with the following block of code for each alert record to create:

```
/*** PROCESSING PREDICTION: ahu_sply_fan_kw ***/
   /* SET ALERT VALUES */
   _key4 = _key4 + 1;
   key4[_key4] = _key4;
   _targetVariable ='ahu_sply_fan_kw';
   _thisAlertName ='ahu_sply_fan_kw';
   _predictionMeasurementId ='P_ahu_sply_fan_kw';
   _alertedMeasurementId = substr(_predictionMeasurementId,3);
   _actualMeasurementValue = ahu_sply_fan_kw;
   _predictedMeasurementValue = P_ahu_sply_fan_kw;
   _upperPredictionLimit = U_ahu_sply_fan_kw;
   _lowerPredictionLimit = L_ahu_sply_fan_kw;
   _predictionResidual = R_ahu_sply_fan_kw;
   _alertMessage = '';
   _alertType = '';
   _alertSubtype = '';
      /* UPDATE ALERT HISTORY HASH */
      . . .
      /* DETERMINE IF ALERT COUNT EXCEEDS THRESHOLD */
      if outputThresholds.find( ) = 0 then do;
         if _outlierCount ge _modelAlertOutputThreshold then do;
            arrayIndex + 1;
             _alertMessage = catx(' ','Measurement value
 for',_targetVariable,'has been out of the acceptable range
('round(_lowerPredictionLimit,0.01),'-
',round(_upperPredictionLimit,0.01),') for',_outlierCount,'consecutive
reading(s).');
               _alertType = 'Energy Use';
               _alertSubtype = 'Supply Fan';
               _ alertPersistence = _outlierCount;
               _alertInstance = _alertPersistence -
                 _modelAlertOutputThreshold + 1;
               _alertStartDate = datepart(_alertStartDttm);
               _alertStartTime = timepart(_alertStartDttm);
               /* SET OUTPUT ARRAY VALUES */
               alertedMeasurementId[arrayIndex] = _alertedMeasurementId;
               alertType[arrayIndex] = _alertType;
               alertSubtype[arrayIndex] = _alertSubtype;
               alertEpisode[arrayIndex] = _alertEpisode;
               alertInstance[arrayIndex] = _alertInstance;
               alertPersistence[arrayIndex] = _alertPersistence;
               alertStartDttm[arrayIndex] = _alertStartDttm;
               alertStartDate[arrayIndex] = _alertStartDate;
               alertStartTime[arrayIndex] = _alertStartTime;
               alertMessage[arrayIndex] = _alertMessage;
               actualMeasurementValue[arrayIndex] =
                 _actualMeasurementValue;
               predictedMeasurementValue[arrayIndex] =
                 _predictedMeasurementValue;
               lowerPredictionLimit[arrayIndex] = lowerPredictionLimit;
               upperPredictionLimit[arrayIndex] = _upperPredictionLimit;
               predictionResidual[arrayIndex] = _predictionResidual;
               _outOpcodeArray[arrayIndex] = 'insert';
            end,
/* PROCESSING PREDICTION: ahu_std_cmfrt_alert*/
   /* SET ALERT VALUES */
   _key4 = _key4 + 1;
   key4[_key4] = _ key4;
   targetVariable = 'ahu_std_cmfrt_alert';
   thisAlertName = 'ahu_std_cmfrt_alert';
   _predictionMeasurementId = 'ahu_std_cmfrt_alert';
   alertedMeasurementId = 'ahu_std_cmfrt_alert';
   _actualMeasurementValue = .;
   _predictedMeasurementValue = .;
   _upperPredictionLimit = .;
   _lowerPredictionLimit = .;
   _predictionResidual = .;
   _alertMessage = '';
   _alertType = '';
   _alertSubtype = '';
      /* UPDATE ALERT HISTORY HASH */
      . . .
      /* DETERMINE IF ALERT COUNT EXCEEDS THRESHOLD */
      if outputThresholds.find( ) = 0 then do;
         if _outlierCount ge _modelAlertOutputThreshold then do;
            arrayIndex + 1;
            if outlierDirection='+' then
               _alertMessage=catx(' ','Avg zone temp setpoint has been
outside
                  standard of comfort for 2 hours
                     (',_outlierCount,'consecutive ).');
            if outlierDirection='-' then
               _alertMessage=catx(' ','Avg zone temp setpoint has been
outside
                  standard of comfort for 2 hours
                     (',_outlierCount,'consecutive ).');
               _alertType = 'Comfort';
               _alertSubtype = 'Outside Standard of Comfort';
               . . . Same as above
      end;
```

In an operation 1132, a scoring macro is executed to create scoring code using the created configuration dataset and created mapping dataset without use of a scoring template. The scoring code includes the model code read from model code files 1032 for the associated analytic model. Execution of the scoring macro creates scoring code included as code or as a reference to a code file between mas-module start and end tags in data processing model 714 for execution in a derived window having the procedural type by ESPE 400 as described further below. The scoring code uses raw, transform, lag, aggregation, and/or calculation measurements as one or more inputs to the analytic model scoring code read from model code files 1032 for the associated analytic model. The created scoring code creates and sends a record for output, for example, to event subscribing system 106. When scoring is not selected in data processing configuration file 1014, the created scoring code may act as a pass-through to the output. The scoring code is created for each modeling area.

The scoring macro creates a dataset with unique measurement IDs for the measurements for which the value for the retainForScoring attribute is true. The scoring macro declares the analytic model input variables that include one or more keys, the device GUID, the customer GUID, the location GUID, the device type, the device value, a timestamp, etc. The scoring macro also declares the analytic model output variables using the measurement ID of each measurement included between the analyticalModelMeasurement start and stop tags and having the target measurement role. The measurement type is used to declare each variable associated with each analytic model.

The scoring macro creates a package name for each modeling area. For example, an illustrative name is smc_modelingAreaId. The scoring macro creates output written to the scoring code that includes the package name for each modeling area. The scoring macro creates a list of the devices of the device type associated with the modelOutputMeasurementId attribute value of the analytic model for each analytic model and for each modeling area and defines the values for each analytic model defined between the analyticModel start and end tags. The scoring macro identifies a model code file of model code files 1032 for each device of the device type for each analytic model and for each modeling area. The naming convention may be based on "deviceType---measurementName---deviceID". The content of the model code file defines a trained analytic model though training of the analytic model may be included as part of defining data processing model 714 in alternative embodiments. The code stored in the model code file may include macro values replaced with values defined using the created configuration dataset and created mapping dataset by the scoring macro.

Execution of the scoring macro creates scoring code included as code or as a reference to a code file between mas-module start and end tags in data processing model 714 for execution in a derived window having the procedural type by ESPE 400 as described further below. The scoring code, for example, written as a DS2 package with one or more methods, is configured to determine a predicted, forecast, optimized, classification, etc. value of a target variable indicated as having the target role for the analytic model when data processing model 714 is used to define ESPE 400 execution.

The scoring macro creates a method for each modeling area and device. For example, an illustrative method is named score_modelingAreaId_block_devnumber. The scoring macro also creates a method for each modeling area. For example, an illustrative method is named score_modelingAreaId. The created methods are included within the package defined for each modeling area. The method named score_modelingAreaId_block_devnumber may declare the variables for each device of the device type for each analytic model and include the model code read from the associated model code file of model code files 1032. The method named score_modelingAreaId may include a series of nested "if" statements that control which method of the methods named score_modelingAreaId_block_devnumber is executed to ensure that the scoring code is executed only for the appropriate device and to ensure the process is efficient and that the fewest possible lines of code is running for each streaming data record. For example, the following scoring code may be written to data processing model 714 to perform scoring by ESPE 400 for modeling area ahu and for each of four devices defined in devices file 1018 of the ahu device type:

```
ds2_options sas;
package smc_ahu / overwrite=yes;
  method score_ahu_block_1 (
    double key;
    double key2;
    double key3;
    char deviceGuid;
    char customerGuid;
    ...
  );
    dcl double _badval_;
    dcl double _dropinput_;
    dcl double _drop_;
    dcl double _tval_;
    dcl double _sumval_;
    dcl double _numval_;
    dcl double _bias_;
    dcl double _nval_;
    dcl char(12) _strfmt_;
    dcl double _node_val_0_1;
    dcl double _node_val_0_2;
    ...
    P_ahu_sply_fan_kw=.;
    R_ahu_sply_fan_kw=.;
    S_ahu_sply_fan_kw=.;
    L_ahu_sply_fan_kw=.;
    U_ahu_sply_fan_kw=.;
    A_ahu_sply_fan_kw=' ';
    Insert Model code for device number of the devices of the ahu device type
  end;
repeat for each method score_ahu block_2, score_ahu block_3 and score_ahu_block_4
method score_ahu (
    same calling list and declarations
    if customerGuid = 'customer_GUID_inserted' then do;
      if locationGuid = 'first_location_GUID_inserted' then do;
        if level _ 1 = 'HR _01' then do;
          if level _ 2 ='AH _1A' then do;
            score_ahu_block_1 (. . .);
          end;
          else if level _ 2 = 'AH_2A' then do;
            score_ahu_block_2 (. . .);
          end;
        end;
      end;
      else if locationGuid = 'second_location_GUID_inserted' then do;
        if level_1 = 'HR_1' then do;
          if level_2 = 'AHU_1_1' then do;
            score_ahu_block_3 (. . .);
          end;
          else if level_2 = 'AH_2A' then do;
            score_ahu_block_4 (. . .);
          end;
        end;
      end;
    end;
  end;
endpackage;
```

In an operation 1134, the created code and project data is written to data processing model 714. In an alternative embodiment, the created code may be compiled and executed to create data processing model 714. Adapters and/or connectors may be identified and written to data processing model 714 to output results from the ESP windows to a variety of data storage destinations. The output destinations may be read from data processing configuration file 1014.

To create data processing model 714, the ESP project modeling area XML macro further may be used to gather the created code and write it to data processing model 714, for example, in the form:

```
<project name="qa_realtime" pubsub="auto" threads="20">
  <mas-modules>
    <mas-module language="ds2" func-names= "updateValue"
      module="P001_measurement">
      <code><![CDATA[device template dataset code]]></code>
    </mas-module>
    <mas-module language="ds2" func-names="add Measurement"
      module="P002_device">
      <code><![CDATA[measurement template dataset code]]></code>
    </mas-module>
    <mas-module language="ds2" func-names= "getDeviceType"
      module="P003_hierarchicalDataStore">
      <code><![CDATA[HDS template dataset code]]></code>
    </mas-module>
```

```
<mas-module language="ds2" func-names ="rename
   Points"
   module="P200_rename">
   <code><![CDATA[rename code]]></code>
</mas-module>
<mas-module language="ds2" func-names= "update-
   Weather"
   module="P010_weather update">
   <code><![CDATA[weather update code]]></code>
</mas-module>
<mas-module language="ds2" func-names="update"
   module="P020_ update">
   <code><![CDATA[update code]]></code>
</mas-module>
<mas-module language="ds2" func-names="runMain"
   module="P100_ahu_transpose">
   <code><![CDATA[transpose code]]></code>
</mas-module>
<mas-module language="ds2" func-names= "score_
   ahu"
   module="smc_ahu">
   <code><![CDATA[scoring code ahu modeling
      area]]></code>
</mas-module>
<mas-module language="ds2" func-names= "subset-
   Points"
   module="P300_ahu_subset">
   <code><![CDATA[subset code ahu modeling
      area]]> </code>
</mas-module>
<mas-module language="ds2" func-names= "addTrig-
   ger"
   module="P400_ahu_add_trigger">
   <code><![CDATA[add trigger code ahu modeling
      area]]></code>
</mas-module>
<mas-module language="ds2" func-names="create
   Alerts"
   module="P500_ahu_alerting">
   <code><![CDATA[alerting code ahu modeling
      area]]></code>
</mas-module>
<mas-module language="ds2" func-names="runMain"
   module="P100_fpb_transpose">
   <code><![CDATA[transpose code fpb modeling
      area]]></code>
</mas-module>
<mas-module language="ds2" func-names="score_
   fpb"
   module="smc_fpb">
   <code><![CDATA[scoring code fpb modeling
      area]]> </code>
</mas-module>
<mas-module language="ds2" func-names="subset
   Points"
   module="P300_fpb_subset">
   <code><![CDATA[subset code fpb modeling
      area]]> </code>
</mas-module>
<mas-module language="ds2" func-names="add Trig-
   ger"
   module="P400_fpb_add_trigger">
   <code><![CDATA[add trigger code fpb modeling
      area]]></code>
</mas-module>
<mas-module language="ds2" func-names="create
   Alerts"
   module="P500_fpb_alerting">
   <code><![CDATA[alerting code fpb modeling
      area]]></code>
</mas-module>
</mas-modules>
```

To create data processing model 714, the ESP project modeling area XML macro further may be used to create the continuous query and write it to data processing model 714, for example, in the form provided at the end of the detailed description and labeled In the illustrative embodiment, connectors are used to output the alert and scoring results though other output mechanisms can be used such as adapters and/or connectivity to event subscribing device 500.

Data processing model 714 includes the code to create the IDS and receive the events from event publishing system 102 into source windows. In the provided example, an additional data source is weather data and data processing model 714 further includes the code to support the weather source and update that may be used to define local temperatures, humidity levels, etc. As a result, the illustrative continuous query includes two source windows for events, a weather source window that sends weather events to a weather update window and an HVAC source window that sends HVAC events to an HVAC update window. Both the weather update window and the HVAC update window send their events to the window named union_data_sources that combines the events. The combined events are sent to a rename window that uses the rename code to perform the rename processing described previously. From the rename window events are processed through the subset window, the add trigger window, the transpose window, the scoring window, and the alerting window based on the modeling area of the events. The scoring window and the alerting window may each generate output using the defined connectors and a copy window type.

The transpose window continually updates the in-memory device object with each measurement's current value as raw measurements are received by ESPE 400 according to data processing model 714. Every predefined number of seconds (e.g., 900 seconds), "trigger records" are sent through the transpose window that result in a different action being performed as discussed previously.

Data processing configuration file 1014 may optionally stream raw measurements instead of transposing stream data. For example, the rawpts_only command line option may indicate yes to stream raw measurements. When this option is selected, operations 1122 to 1132 may be skipped. The raw measurements may be supplemented with the customer GUID, the location GUID, the device type, the device label, and other hierarchy definition data by ESPE 400 and streamed to event subscribing system 106 using a connector or an adapter.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

The addTrigger method pseudo code is reproduced below:

```
method addTrigger (
   varchar(250) _deviceGuid_,
   varchar(50) _customerGuid_,
   varchar(50) _locationGuid_,
   varchar(20) _deviceType_,
   varchar(50) _deviceValue_,
   varchar(32) _measurementId_,
   double    _msr_dttm_,
   double    _msr_date_,
   double    _msr_time_,
   varchar(50) _value_,
   varchar(32) _record_type_,
   in_out double key3[ $@OUTPUTARRAYSIZE@$ ],
   in_out varchar deviceGuid[ $@OUTPUTARRAYSIZE@$ ],
   in_out varchar customerGuid[ $@OUTPUTARRAYSIZE@$ ],
   in_out varchar locationGuid[ $@OUTPUTARRAYSIZE@$ ],
   in_out varchar deviceType[ $@OUTPUTARRAYSIZE@$ ],
   in_out varchar deviceValue[ $@OUTPUTARRAYSIZE@$ ],
   in_out varchar measurementId[ $@OUTPUTARRAYSIZE@$ ],
   in_out double msr_dttm[ $@OUTPUTARRAYSIZE@$ ],
   in_out double msr_date[ $@OUTPUTARRAYSIZE@$ ],
   in_out double msr_time[ $@OUTPUTARRAYSIZE@$ ],
   in_out varchar record_type[ $@OUTPUTARRAYSIZE@$ ],
   in_out varchar value[ $@OUTPUTARRAYSIZE@$ ],
   in_out varchar _outOpcodeArray[ $@OUTPUTARRAYSIZE@$ ]);
);
/* DETERMINE IF TRIGGER RECORDS NEED TO BE GENERATED */
if missing(expected_next_dttm_hist) and missing(_msr_dttm_) and
   _msr_dttm_ > expected_next_dttm_hist then
      is_trigger_hist=1;
else
      is_trigger_hist = 0;
if missing(expected_next_dttm_output) and missing(_msr_dttm_) and
   _msr_dttm_ > expected_next_dttm_output then
      is_trigger_output =1,
else
      is_trigger_output = 0,
/* WRITE CURRENT RECORD TO ARRAY */
currentOutputIndex = 1,
deviceGuid[currentOutputIndex]              = _deviceGuid_;
customerGuid[currentOutputIndex]            = _custornerGuid_;
locationGuid[currentOutputIndex]            = _locationGuid_;
deviceType[currentOutputIndex]              = _deviceType_;
deviceValue[currentOutputIndex]                 = _deviceValue_;
measurementId[currentOutputIndex]           = _measurementId_;
msr_dttm[currentOutputIndex]                = _msr_dttm_;
msr_date[currentOutputIndex]                = _msr_date_;
msr_time[currentOutputIndex]                = _msr_time_;
value[currentOutputIndex]                   = _value_;
record_type[currentOutputIndex]             = _record_type_;
key3[currentOutputIndex]                    = 1.0 * currentOutputIndex;
_outOpcodeArray[currentOutputIndex] = 'insert';
if is_trigger_hist or is_trigger_output then do;
   if is_trigger_hist then do;
      /* WRITE HISTORICAL RECORD TO ARRAY */
      currentOutputIndex + 1;
      deviceGuid[currentOutputIndex]         = 'NULL';
      customerGuid[currentOutputIndex]       = ' ';
      locationGuid[currentOutputIndex]       = ' ';
      deviceType[currentOutputIndex]         = 'cust';
      deviceValue[currentOutputIndex]        = ' ';
      measurementId[currentOutputIndex]      = 'TriggerRecord';
      msr_dttm[currentOutputIndex]           =
         expected_next_dttm_hist;
      msr_date[currentOutputIndex]           =
         datepart(msr_dttm[currentOutputIndex]);
      msr_time[currentOutputIndex]           =
         timepart(msr_dttm[currentOutputIndex]);
      value[currentOutputIndex]              = '100';
      record_type[currentOutputIndex]        = 'Raw';
      key3[currentOutputIndex]               = 1.0 *
```

```
        currentOutputIndex;
        _outOpcodeArray[currentOutputIndex] = 'insert';
    end;
    if is_trigger_output then do;
        /* WRITE LAG TRIGGER RECORD */
        currentOutputIndex + 1;
        ...
        value[currentOutputIndex]            = '200';
        ...
        /* WRITE AGGREGATION TRIGGER RECORD */
        currentOutputIndex + 1;
        ...
        value[currentOutputIndex]            = '300';
        ...
        /* WRITE OUTPUT TRIGGER RECORDS */
        rc = hiDeviceList.first( );
        do while(rc = 0);
            currentOutputIndex + 1;
            deviceGuid[currentOutputIndex]       = _deviceGuid;
            customerGuid[currentOutputIndex]     = _customerGuid;
            locationGuid[currentOutputIndex]     = _locationGuid;
            deviceType[currentOutputIndex]       = _deviceType;
            deviceValue[currentOutputIndex]      = _deviceValue;
            measurementId[currentOutputIndex]    = 'TriggerRecord';
            msr_dttm[currentOutputIndex]         =
                expected_next_dttm_hist;
            msr_date[currentOutputIndex]         =
                datepart(msr_dttm[currentOutputIndex]);
            msr_time[currentOutputIndex]         =
                timepart(msr_dttm[currentOutputIndex]);
            value[currentOutputIndex]            = '500';
            record_type[currentOutputIndex]      = 'Model';
            ...
        end;
    end;
end;
/* UPDATE NEXT DTTM VALUES */
expected_next_dttm_hist=max(expected_next_dttm_hist,ceil(_msr_dttm_/
    $@MYHISTORYINTERVAL@$^)*^$@MYHISTORYINTERVAL@$^);
expected_next_dttm_output=max(expected_next_dttm_
    output,ceil(_msr_dttm_/^$@MYOUTPUTINTERVAL@$^)*^$@MYOUT
    PUTINTERVAL@$^);
end;
```

The continuousQuery XML is reproduced below:

```xml
<contqueries>
    <contquery name="cq1" index="pi_EMPTY">
        <windows>
            <window-source name="weather_source" index="pi_EMPTY" collapse-updates="true" insert-only="true" autogen-key="true">
                ... </window-source>
            <window-procedural name="weather_update" index="pi_EMPTY" produces-only-inserts="true" collapse-updates="true">
                ...
                <mas-map>
                    <window-map module="P010_weather_update" function="updateWeather" revision="0" source="weather_source"/>
                </mas-map>
            </window-procedural>
            <window-source name="hvac_source" index="pi_EMPTY" collapse-updates="true" insert-only="true" autogen-key="true">
                ...
                <connectors>
                    <connector name="New_Connector_1" class="mqtt">
                        <properties> .... </properties>
                    </connector>
                </connectors>
            </window-source>
            <window-procedural name="hvac_update" index="pi_EMPTY" produces-only-inserts="true" collapse-updates="true">
                ...
                <mas-map>
                    <window-map module="P020_update" function="update" revision="0" source="hvac_source"/>
                </mas-map>
```

-continued

```
        </window-procedural>
        <window-union name="union_data_sources" index="pi_EMPTY" collapse-
updates="true" strict="true"/>
        <window-procedural name="rename" index="pi_EMPTY" produces-only-
inserts="true" collapse-updates="true">
            . . .
            <mas-map>
                <window-map module="P200_rename" function="renamePoints"
revision="0" source="union_data_sources"/>
            </mas-map>
        </window-procedural>
        <window-procedural name="ahu_subset" index="pi_EMPTY" output-
insert-only="true" collapse-updates="true">
            <mas-map>
                <window-map module="P300_ahu_subset" function="subsetPoints"
    revision="0" source="rename"/>
            </mas-map>
        </window-procedural>
        <window-procedural name="ahu_add_trigger" index="pi_EMPTY"
produces-only-inserts="true" collapse-updates="true">
            . . .
            <mas-map>
                <window-map module="P400_ahu_add_trigger"
function="addTrigger" revision="0" source="ahu_subset"/>
            </mas-map>
        </window-procedural>
        <window-procedural name="ahu_transpose" index="pi_EMPTY" output-
insert-only="true" collapse-updates="false">
            <mas-map>
                <window-map module="P100_ahu_transpose" function="runMain"
revision="0" source="ahu_add_trigger"/>
            </mas-map>
        </window-procedural>
        <window-procedural name="ahu_scoring" index="pi_EMPTY" produces-
only-inserts="true" collapse-updates="true">
            <mas-map>
                <window-map module="smc_ahu" revision="0"
source="ahu_transpose" function="score_ahu"/>
        </window-procedural>
        <window-copy name="ahu_copy_scoredata_to_csv" index="pi_EMPTY"
output-insert-only="true" collapse-updates="true">
            <connectors>
                <connector name="ahu_outputscore_to_csv" class="fs">
                    <properties> . . . . </properties>
                </connector>
            </connectors>
        </window-copy>
        <window-procedural name="ahu_alerting" index="pi_EMPTY" produces-
only-inserts="true" collapse-updates="true">
            <mas-map>
                <window-map module="P500_ahu_alerting" revision="0"
source="ahu_scoring" function="createAlerts"/>
            </mas-map>
        </window-procedural>
        <window-copy name="ahu_copy_alerts_to_csv" index="pi_EMPTY"
output-insert-only="true" collapse-updates="true">
            <connectors>
                <connector name="ahu_outputalerts_to_csv" class="fs">
                    <properties>. . . . </properties>
                </connector>
            </connectors>
        </window-copy>
        <window-procedural name="fpb_subset" index="pi_EMPTY" output-insert-
only="true" collapse-updates="true">
            <mas-map>
                <window-map module="P300_fpb_subset" function="subsetPoints"
revision="0" source="rename"/>
            </mas-map>
        </window-procedural>
        <window-procedural name="fpb_add_trigger" index="pi_EMPTY"
produces-only-inserts="true" collapse-updates="true">
            <mas-map>
                <window-map module="P400_fpb_add_trigger"
function="addTrigger" revision="0" source="fpb_subset"/>
            </mas-map>
        </window-procedural>
        <window-procedural name="fpb_transpose" index="pi_EMPTY" output-
insert-only="true" collapse-updates="false">
            <mas-map>
```

```
            <window-map module="P100_fpb_transpose" function="runMain"
revision="0" source="fpb_add_trigger"/>
        </mas-map>
    </window-procedural>
    <window-procedural name="fpb_scoring" index="pi_EMPTY" produces-
only-inserts="true" collapse-updates="true">
        <mas-map>
            <window-map module="smc_fpb" revision="0"
source="fpb_transpose" function="score_fpb"/>
        </mas-map>
    </window-procedural>
    <window-copy name="fpb_copy_scoredata_to_csv" index="pi_EMPTY"
output-insert-only="true" collapse-updates="true">
        <connectors>
            <connector name="fpb_outputscore_to_csv" class="fs">
                <properties>. . . . </properties>
            </connector>
        </connectors>
    </window-copy>
    <window-procedural name="fpb_alerting" index="pi_EMPTY" produces-
only-inserts="true" collapse-updates="true">
        <mas-map>
            <window-map module="P500_fpb_alerting" revision="0"
source="fpb_scoring" function="createAlerts"/>
        </mas-map>
    </window-procedural>
    <window-copy name="fpb_copy_alerts_to_csv" index="pi_EMPTY" output-
insert-only="true" collapse-updates="true">
        <connectors>
            <connector name="fpb_outputalerts_to_csv" class="fs">
                <properties> . . . . </properties>
            </connector>
        </connectors>
    </window-copy>
</windows>
<edges>
    <edge source="weather_source" target="weather update"/>
    <edge source="weather_update" target="union_data_sources"/>
    <edge source="hvac_source" target="update"/>
    <edge source="update" target="union_data_sources"/>
    <edge source="union_data_sources" target="rename"/>
    <edge source="rename" target="ahu_subset"/>
    <edge source="ahu_subset" target="ahu_add_trigger"/>
    <edge source="ahu_add_trigger" target="ahu_transpose"/>
    <edge source="ahu_transpose" target="ahu_scoring"/>
    <edge source="ahu_scoring" target="ahu_copy_scoredata_to_csv"/>
    <edge source="ahu_scoring" target="ahu_alerting"/>
    <edge source="ahu_alerting" target="ahu_copy_alerts_to_csv"/>
    <edge source="rename" target="fpb_subset"/>
    <edge source="fpb_subset" target="fpb_add_trigger"/>
    <edge source="fpb_add_trigger" target="fpb_transpose"/>
    <edge source="fpb_transpose" target="fpb_scoring"/>
    <edge source="fpb_scoring" target="fpb_copy_scoredata_to_csv"/>
    <edge source="fpb_scoring" target="fpb_alerting"/>
    <edge source="fpb_alerting" target="fpb_copy_alerts_to_csv"/>
</edges>
</contquery>
</contqueries>
</project>
```

What is claimed is:

1. A non-transitory computer-readable medium having stored thereon computer-readable instructions that when executed by a first computing device cause the first computing device to:

create a mapping dataset from predefined configuration information and predefined device information, wherein the predefined configuration information includes a measurement processing description for a measurement, wherein the measurement processing description describes a computational process to be performed by an event stream processing (ESP) window on one or more fields of an event block object when the event block object is received by a second computing device from a third computing device, wherein the predefined device information includes a measurement identifier that uniquely identifies a sensor and a device to which the sensor is associated for a plurality of measurements, wherein the measurement is one of the plurality of measurements;

execute an update macro with an update template to create update code, wherein the update template defines a first template for the created update code and the update macro replaces an update code placeholder included in the update template with first code specific to the created mapping dataset, wherein the created update code is configured to parse the measurement identifier and a measurement value from the event block object when the event block object is received by the second computing device;

execute a transpose macro with a transpose template to create transpose code, wherein the transpose template defines a second template for the created transpose code and the transpose macro replaces a transpose code placeholder included in the transpose template with second code specific to the created mapping dataset, wherein the created transpose code is configured to perform the described computational process on the parsed measurement value to define a transposed event record; and create an ESP model that includes the created update code, a source window defined to execute the created update code, the created transpose code, a transpose window defined to execute the created transpose code, connection information to connect the second computing device and the third computing device, and a connectivity definition, wherein the connectivity definition defines a connectivity between the source window and the transpose window for processing the event block object when the event block object is received by the second computing device from the third computing device.

2. The non-transitory computer-readable medium of claim 1, wherein the measurement identifier uniquely identifies the sensor and the device to which the sensor is associated.

3. The non-transitory computer-readable medium of claim 1, wherein the measurement identifier and the device identifier in combination uniquely identify the sensor and the device to which the sensor is associated.

4. The non-transitory computer-readable medium of claim 1, wherein the created update code is further configured to be executed in a source window that receives the event block object from the third computing device.

5. The non-transitory computer-readable medium of claim 4, wherein the created update code is further configured to create a second record from the parsed, received event block object and to send the created second record to a second window.

6. The non-transitory computer-readable medium of claim 5, wherein, after executing the update macro and before executing the transpose macro, the computer-readable instructions further cause the first computing device to:
execute a rename macro with a rename template to create rename code, wherein the rename template defines a third template for the created rename code and the rename macro replaces a rename code placeholder included in the rename template with third code specific to the created mapping dataset, wherein the created rename code is configured to supplement the event block object with a device identifier that uniquely identifies the device to which the measurement value is associated, to create a third record with the supplemented event block object, and to send the created third record to a third window, wherein the created rename code is further configured to be executed in a rename window that receives the parsed event block object from the source window and sends the created third record to the third window, wherein the rename window is the second window.

7. The non-transitory computer-readable medium of claim 6, wherein the created rename code is further configured to compare a time received in the event block object with a predefined earliest useable time or a predefined last useable time, wherein the predefined earliest useable time and the predefined last useable time are included in the predefined device information for the measurement.

8. The non-transitory computer-readable medium of claim 6, wherein, after executing the rename macro and before executing the transpose macro, the computer-readable instructions further cause the first computing device to:
execute a subset macro with a subset template to create subset code, wherein the subset template defines a fourth template for the created subset code and the subset macro replaces a subset code placeholder included in the subset template with fourth code specific to the created mapping dataset, wherein the created subset code is configured to determine when the device identifier included in the supplemented event block object is associated with a device for which the computational process is to be performed, and, when the device identifier included in the supplemented event block object is associated with a device for which the computational process is to be performed, to create a fourth record with the supplemented event block object, and to send the created fourth record to a fourth window, wherein the created subset code is further configured to be executed in a subset window that receives the supplemented event block object from the rename window and sends the created fourth record to the fourth window, wherein the subset window is the third window.

9. The non-transitory computer-readable medium of claim 8, wherein the created subset code is further configured to limit the parsed measurement value to a predefined maximum value or a predefined minimum value, wherein the predefined maximum value and the predefined minimum value are included in the predefined configuration information for the measurement.

10. The non-transitory computer-readable medium of claim 8, wherein, after executing the subset macro and before executing the transpose macro, the computer-readable instructions further cause the first computing device to:
execute an add trigger macro with an add trigger template to create add trigger code, wherein the add trigger template defines a fifth template for the created add trigger code and the add trigger macro replaces an add trigger code placeholder included in the add trigger template with fifth code specific to the created mapping dataset, wherein the created add trigger code is configured to create a trigger record that includes the supplemented event block object and to send the created trigger record to a fifth window, wherein the created add trigger code is further configured to be executed in an add trigger window that receives the supplemented event block object from the subset window and sends the created trigger record to the fifth window, wherein the add trigger window is the fourth window.

11. The non-transitory computer-readable medium of claim 10, wherein the trigger record includes a trigger type indicator that identifies a type of analysis to perform on the supplemented event block object.

12. The non-transitory computer-readable medium of claim 11, wherein the trigger type indicator indicates to update a lag computation on the supplemented event block object.

13. The non-transitory computer-readable medium of claim 11, wherein the trigger type indicator indicates to update an aggregation computation on the supplemented event block object.

14. The non-transitory computer-readable medium of claim 11, wherein the trigger type indicator indicates to update a historical measurements record with the supplemented event block object.

15. The non-transitory computer-readable medium of claim 11, wherein the trigger type indicator indicates to perform a transpose computation with the supplemented event block object to define the transposed event block record and to output the transposed event block record.

16. The non-transitory computer-readable medium of claim 15, wherein the transpose computation includes at least one of a transform computation, a lag computation, an aggregation computation, and a calculate computation.

17. The non-transitory computer-readable medium of claim 11, wherein the created transpose code is configured to perform the described computational process on the parsed measurement value when the add trigger record is received based on the trigger type indicator.

18. The non-transitory computer-readable medium of claim 15, wherein, after executing the transpose macro, the computer-readable instructions further cause the first computing device to:
execute an alerting macro with an alerting template to create alerting code, wherein the alerting template defines a sixth template for the created alerting code and the alerting macro replaces an alerting code placeholder included in the alerting template with sixth code specific to the created mapping dataset, wherein the created alerting code is configured to create an alert record based on a comparison between the transposed event block record and alert thresholds defined in the predefined configuration information and to send the created alert record to a sixth window,
wherein the created alerting code is further configured to be executed in an alerting window that receives the transposed event block record from the transpose window and sends the created alert record to the sixth window, wherein the alerting window is the fifth window.

19. The non-transitory computer-readable medium of claim 18, wherein the sixth window outputs the alert.

20. The non-transitory computer-readable medium of claim 5, wherein, after executing the transpose macro, the computer-readable instructions further cause the first computing device to:
execute an alerting macro with an alerting template to create alerting code, wherein the alerting template defines a third template for the created alerting code and the alerting macro replaces an alerting code placeholder included in the alerting template with third code specific to the created mapping dataset, wherein the created alerting code is configured to create an alert record based on a comparison between the supplemented event block object and alert thresholds defined in the predefined configuration information and to send the created alert record to a third window,
wherein the created alerting code is further configured to be executed in an alerting window that receives the supplemented event block object from the transpose window and sends the created alert record to the third window, wherein the alerting window is the second window.

21. The non-transitory computer-readable medium of claim 5, wherein, after executing the transpose macro, the computer-readable instructions further cause the first computing device to:
execute a scoring macro to create scoring code, wherein the scoring macro replaces a scoring code placeholder with third code specific to the created mapping dataset, wherein the created scoring code is configured to create a scoring record by executing an analytic model defined in the predefined configuration information and to send the created scoring record to a third window,
wherein the created scoring code is further configured to be executed in a scoring window that receives the supplemented event block object from the transpose window and sends the created scoring record to the third window, wherein the scoring window is the second window.

22. The non-transitory computer-readable medium of claim 15, wherein, after executing the transpose macro, the computer-readable instructions further cause the first computing device to:
execute a scoring macro to create scoring code, wherein the scoring macro replaces a scoring code placeholder with sixth code specific to the created mapping dataset, wherein the created scoring code is configured to create a scoring record by executing an analytic model defined in the predefined configuration information and to send the created scoring record to a sixth window,
wherein the created scoring code is further configured to be executed in a scoring window that receives the transposed event block record from the transpose window and sends the created scoring record to the sixth window, wherein the scoring window is the fifth window.

23. The non-transitory computer-readable medium of claim 22, wherein the created scoring code is further configured to create an alert record based on a comparison between the scoring record and alert thresholds defined in the predefined configuration information and to send the created alert record to the sixth window.

24. The non-transitory computer-readable medium of claim 22, wherein the sixth window outputs the created scoring record.

25. The non-transitory computer-readable medium of claim 1, wherein the computer-readable instructions further cause the first computing device to:
instantiate an ESP engine (ESPE) on the first computing device based on the created ESP model;
receive the event block object from the third computing device in a first source window of the instantiated ESPE, wherein the first source window is defined by the created ESP model;
process the received event block object based on the created ESP model; and
output the processed event block object.

26. A computing device comprising:
a processor; and
a computer-readable medium operably coupled to the processor, the computer-readable medium having computer-readable instructions stored thereon that, when executed by the processor, cause the computing device to:
create a mapping dataset from predefined configuration information and predefined device information, wherein the predefined configuration information includes a measurement processing description for a measurement, wherein the measurement processing description describes a computational process to be performed by an event stream processing (ESP) window on one or more fields of an event block object when the event block object is received by a second computing device from a third computing device, wherein the predefined device information includes a measurement identifier that uniquely identifies a sensor and a device to which the sensor is associated for a plurality of measurements, wherein the measurement is one of the plurality of measurements;

execute an update macro with an update template to create update code, wherein the update template defines a first template for the created update code and the update macro replaces an update code placeholder included in the update template with first code specific to the created mapping dataset, wherein the created update code is configured to parse the measurement identifier and a measurement value from the event block object when the event block object is received by the second computing device;

execute a transpose macro with a transpose template to create transpose code, wherein the transpose template defines a second template for the created transpose code and the transpose macro replaces a transpose code placeholder included in the transpose template with second code specific to the created mapping dataset, wherein the created transpose code is configured to perform the described computational process on the parsed measurement value to define a transposed event record; and create an ESP model that includes the created update code, a source window defined to execute the created update code, the created transpose code, a transpose window defined to execute the created transpose code, connection information to connect the second computing device and the third computing device, and a connectivity definition, wherein the connectivity definition defines a connectivity between the source window and the transpose window for processing the event block object when the event block object is received by the second computing device from the third computing device.

27. A method of automatically generating an event streaming model configured to receive and process events from a plurality of computing devices, the method comprising:

creating, by a computing device, a mapping dataset from predefined configuration information and predefined device information, wherein the predefined configuration information includes a measurement processing description for a measurement, wherein the measurement processing description describes a computational process to be performed by an event stream processing (ESP) window on one or more fields of an event block object when the event block object is received by a second computing device from a third computing device, wherein the predefined device information includes a measurement identifier that uniquely identifies a sensor and a device to which the sensor is associated for a plurality of measurements, wherein the measurement is one of the plurality of measurements;

executing, by the computing device, an update macro with an update template to create update code, wherein the update template defines a first template for the created update code and the update macro replaces an update code placeholder included in the update template with first code specific to the created mapping dataset, wherein the created update code is configured to parse the measurement identifier and a measurement value from the event block object when the event block object is received by the second computing device;

executing, by the computing device, a transpose macro with a transpose template to create transpose code, wherein the transpose template defines a second template for the created transpose code and the transpose macro replaces a transpose code placeholder included in the transpose template with second code specific to the created mapping dataset, wherein the created transpose code is configured to perform the described computational process on the parsed measurement value to define a transposed event record; and creating, by the computing device, an ESP model that includes the created update code, a source window defined to execute the created update code, the created transpose code, a transpose window defined to execute the created transpose code, connection information to connect the second computing device and the third computing device, and a connectivity definition, wherein the connectivity definition defines a connectivity between the source window and the transpose window for processing the event block object when the event block object is received by the second computing device from the third computing device.

28. The method of claim 27, wherein the created update code is further configured to create a second record from the parsed, received event block object and to send the created second record to a second window.

29. The method of claim 28, further comprising, after executing the transpose macro:

executing, by the computing device, an alerting macro with an alerting template to create alerting code, wherein the alerting template defines a third template for the created alerting code and the alerting macro replaces an alerting code placeholder included in the alerting template with third code specific to the created mapping dataset, wherein the created alerting code is configured to create an alert record based on a comparison between the supplemented event block object and alert thresholds defined in the predefined configuration information and to send the created alert record to a third window, wherein the created alerting code is further configured to be executed in an alerting window that receives the supplemented event block object from the transpose window and sends the created alert record to the third window, wherein the alerting window is the second window.

30. The method of claim 28, further comprising, after executing the transpose macro:

executing, by the computing device, a scoring macro to create scoring code, wherein the scoring macro replaces a scoring code placeholder with third code specific to the created mapping dataset, wherein the created scoring code is configured to create a scoring record by executing an analytic model defined in the predefined configuration information and to send the created scoring record to a third window, wherein the created scoring code is further configured to be executed in a scoring window that receives the supplemented event block object from the transpose window and sends the created scoring record to the third window, wherein the scoring window is the second window.

* * * * *

UNITED STATES PATENT AND TRADEMARK OFFICE
CERTIFICATE OF CORRECTION

PATENT NO. : 10,346,142 B1
APPLICATION NO. : 16/217169
DATED : July 9, 2019
INVENTOR(S) : Charles Michael Cavalier et al.

Page 1 of 2

It is certified that error appears in the above-identified patent and that said Letters Patent is hereby corrected as shown below:

In the Specification

Column 31, Line 62:
Delete the phrase "measurementType="raw|transform|lag|aggregationĸalculation"" and replace with --measurementType="raw|transform|lag|aggregation|calculation"--.

Column 41, Line 28:
Delete the phrase "measurement1d="" and replace with --measurementId=--.

Column 41, Line 29:
Delete the phrase "measurement1dLabel="" and replace with --measurementIdLabel=--.

Column 46, Line 33:
Delete the phrase "measurementId="ahu_std_cmfrtalert"" and replace with --measurementId="ahu_std_cmfrt_alert"--.

Column 52, Line 6:
Delete the phrase "modelAlertValueType="low|highĸonsecutive">" and replace with --modelAlertValueType="low|high|consecutive">--.

Column 70, Lines 36-37:
Delete the phrase ""measurementHistoryDefinitions.addQ"" and replace with --"measurementHistoryDefinitions.add( )"--.

Column 74, Line 20:
Delete the phrase "when ('double') processNodeMeasurement(node1d," and replace with --when ('double') processNodeMeasurement(nodeId,--.

Signed and Sealed this
Fifth Day of November, 2019

Andrei Iancu
*Director of the United States Patent and Trademark Office*

CERTIFICATE OF CORRECTION (continued)
U.S. Pat. No. 10,346,142 B1

Column 74, Lines 24-25:
Delete the phrase "when ('char') processNodeMeasurement(node1d, nodeType," and replace with --when ('char') processNodeMeasurement(nodeId, nodeType,--.

Column 74, Line 42:
Delete the phrase "processNodeMeasurement(node1d, nodeType," and replace with --processNodeMeasurement(nodeId, nodeType,--.

Column 74, Line 57:
Delete the phrase "processNodeMeasurement(node1d, nodeType," and replace with --processNodeMeasurement(nodeId, nodeType,--.

Column 74, Line 61:
Delete the phrase "transform MeasurementDoubleValue);" and replace with --transformMeasurementDoubleValue);--.

Column 76, Line 20:
Delete the phrase "measurementId="ahu_std_cmfrtalert"" and replace with --measurementId="ahu_std_cmfrt_alert"--.

Column 80, Lines 56-57:
Delete the phrase "func-names=" add Measurement "" and replace with --func-names=" addMeasurement "--.